United States Patent
Geens et al.

(10) Patent No.: US 10,830,977 B2
(45) Date of Patent: *Nov. 10, 2020

(54) MOUNTING SYSTEM FOR TELECOMMUNICATIONS DISTRIBUTION ELEMENTS

(71) Applicant: CommScope Connectivity Belgium BVBA, Kessel-Lo (BE)

(72) Inventors: Johan Geens, Bunsbeek (BE); Pieter Vermeulen, Westerlo (BE); Eric Marcel M. Keustermans, Houwaart (BE)

(73) Assignee: CommScope Connectivity Belgium BVBA, Kessel-Lo (BE)

(*) Notice: Subject to any disclaimer, the term of this patent is extended or adjusted under 35 U.S.C. 154(b) by 0 days.

This patent is subject to a terminal disclaimer.

(21) Appl. No.: 16/416,499

(22) Filed: May 20, 2019

(65) Prior Publication Data

US 2019/0339472 A1 Nov. 7, 2019

Related U.S. Application Data

(63) Continuation of application No. 15/822,936, filed on Nov. 27, 2017, now Pat. No. 10,295,774, which is a
(Continued)

(51) Int. Cl.
*G02B 6/44* (2006.01)
*G02B 6/255* (2006.01)
(Continued)

(52) U.S. Cl.
CPC ......... *G02B 6/4455* (2013.01); *G02B 6/2553* (2013.01); *G02B 6/262* (2013.01); *G02B 6/3616* (2013.01)

(58) Field of Classification Search
None
See application file for complete search history.

(56) References Cited

U.S. PATENT DOCUMENTS 6,209,827 B1   4/2001   Kawai
6,438,310 B1 * 8/2002   Lance .................. G02B 6/4455
                                                   385/135
(Continued)

FOREIGN PATENT DOCUMENTS

| CN | 102570357 A | 7/2012 |
| WO | 2010/024842 A1 | 3/2010 |
| WO | 2012/058186 A1 | 5/2012 |

OTHER PUBLICATIONS

International Search Report and Written Opinion for International Application No. PCT/EP2014/071899 dated Mar. 19, 2015 (15 pages).

*Primary Examiner* — Rhonda S Peace
(74) *Attorney, Agent, or Firm* — Merchant & Gould P.C.

(57) ABSTRACT

A mounting system (700/900) for locking two pieces of telecommunications equipment (610/810) to prevent relative sliding therebetween and relative separation therebetween in a direction generally perpendicular to the direction of the relative sliding includes a first locking feature (701/901) defined by a stud (702/902) with a stem portion (708/908) and a flange portion (710/910) having a larger profile than the stem portion (708/908) and a second locking feature (703/903) defined by a slot (704/904) with a receiver portion (712/912) and a retention portion (714/914). The receiver portion (712/912) is sized to accommodate the flange portion (710/910) of the stud (702/902) and the retention portion (714/914) is sized to accommodate the stem portion (708/908) but not the flange portion (710/910) of the stud (702/902). A third locking feature (705/905) prevents relative sliding between the two pieces of telecommunications
(Continued)

equipment (610/810) once the stud stem portion (708/908) has been slid within the slot retention portion (714/914) and the stud flange portion (710/910) is out of alignment with the slot receiver portion (712/912).

12 Claims, 78 Drawing Sheets

Related U.S. Application Data continuation of application No. 15/030,332, filed as application No. PCT/EP2014/071899 on Oct. 13, 2014, now Pat. No. 9,829,642.

(60) Provisional application No. 61/986,629, filed on Apr. 30, 2014, provisional application No. 61/892,860, filed on Oct. 18, 2013.

(51) Int. Cl.
*G02B 6/26* (2006.01)
*G02B 6/36* (2006.01)

(56) References Cited

U.S. PATENT DOCUMENTS

| | | | | |
|---|---|---|---|---|
| 6,504,988 B1 * | 1/2003 | Trebesch | ............ | G02B 6/4452 385/135 |
| 6,640,042 B2 | 10/2003 | Barnes, Jr. et al. | | |
| 6,865,331 B2 * | 3/2005 | Mertesdorf | .......... | G02B 6/4455 385/135 |
| 7,171,099 B2 * | 1/2007 | Barnes | .................. | A47B 88/44 385/135 |
| 7,454,113 B2 | 11/2008 | Barnes | | |
| 7,945,136 B2 | 5/2011 | Cooke et al. | | |
| 8,285,104 B2 | 10/2012 | Davis et al. | | |
| 8,485,479 B2 * | 7/2013 | Chiu | ...................... | H02G 3/32 248/68.1 |
| 8,625,950 B2 | 1/2014 | Beamon et al. | | |
| 9,008,485 B2 | 4/2015 | Ramirez et al. | | |
| 9,116,324 B2 | 8/2015 | Cooke et al. | | |
| 9,829,642 B2 * | 11/2017 | Geens | ................. | G02B 6/4455 |
| 10,433,031 B1 * | 10/2019 | Hudgens | ............... | H04Q 1/066 |
| 10,514,519 B2 * | 12/2019 | Larsson | ............... | G02B 6/4441 |
| 2008/0085094 A1 | 4/2008 | Krampotich | | |
| 2010/0061693 A1 * | 3/2010 | Bran de Leon | ...... | G02B 6/4454 385/135 |
| 2010/0183270 A1 | 7/2010 | Davis et al. | | |
| 2012/0145838 A1 | 6/2012 | Chiu et al. | | |
| 2012/0243845 A1 | 9/2012 | Wright et al. | | |
| 2015/0346450 A1 | 12/2015 | Barnes, Jr. et al. | | |
| 2016/0259129 A1 | 9/2016 | Geens et al. | | |
| 2017/0082814 A1 | 3/2017 | Barnes, Jr. et al. | | |
| 2018/0143379 A1 | 5/2018 | Geens et al. | | |

* cited by examiner

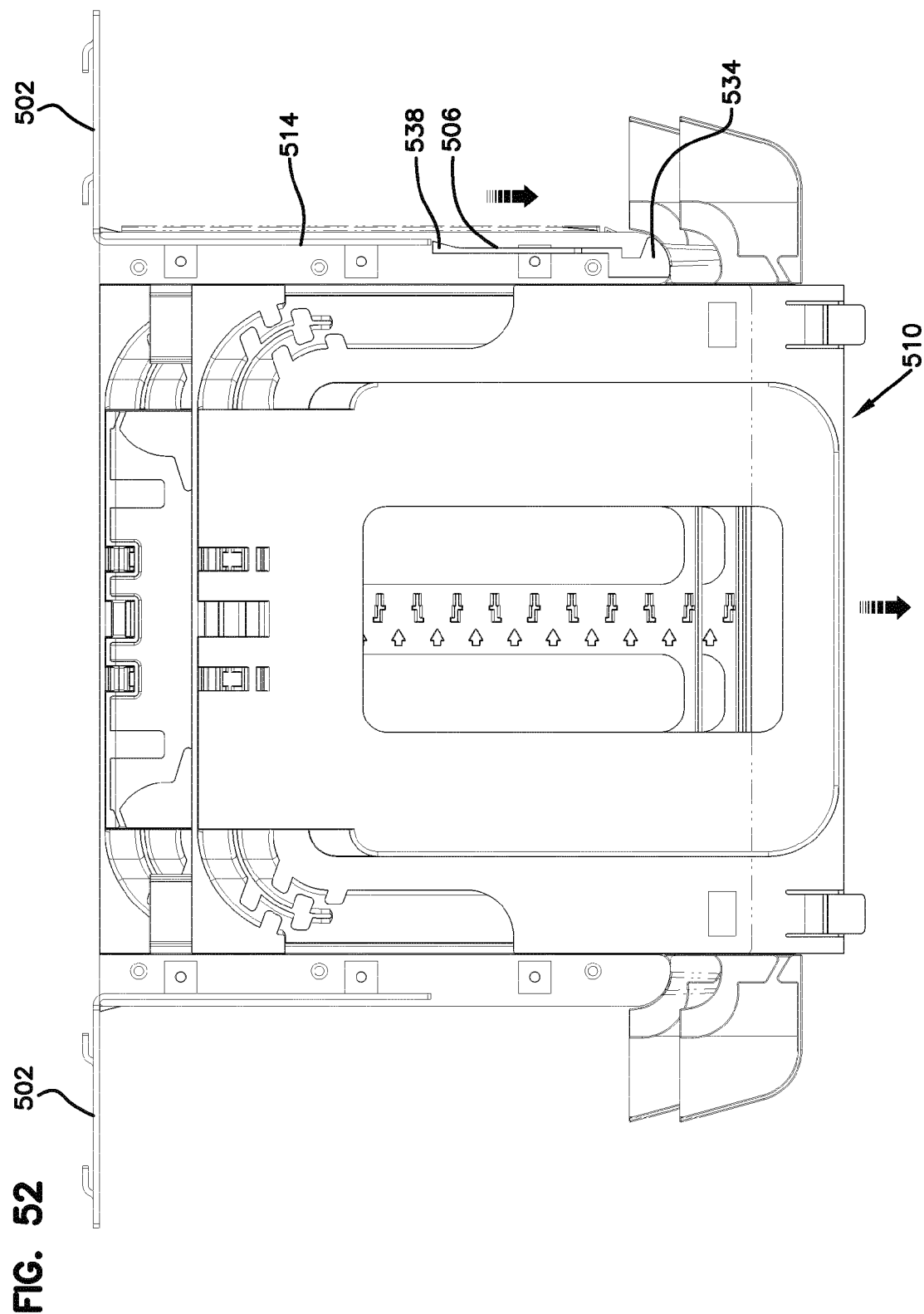

MOUNTING SYSTEM FOR TELECOMMUNICATIONS DISTRIBUTION ELEMENTS

CROSS REFERENCE TO RELATED APPLICATIONS

The present application is a Continuation of U.S. patent application Ser. No. 15/822,936, filed on Nov. 27, 2017, now U.S. Pat. No. 10,295,774, which is a Continuation of U.S. patent application Ser. No. 15/030,332, filed on Apr. 18, 2016, now U.S. Pat. No. 9,829,642, which is a National Stage of PCT/EP2014/071899, filed on Oct. 13, 2014, which claims benefit of U.S. Provisional Application Ser. No. 61/892,860, filed on Oct. 18, 2013, and 61/986,629, filed on Apr. 30, 2014, which applications are incorporated herein by reference in their entirety. To the extent appropriate, a claim of priority is made to each of the above disclosed applications.

FIELD OF THE INVENTION

The present invention relates to telecommunications distribution systems, e.g., optical fiber distribution systems, which may include a rack and elements which populate the rack, wherein such fiber optic elements can include fiber terminations, patching, fiber splitters, and fiber splices. More specifically, the present invention relates to a mounting system for fixedly stacking two or more such telecommunications distribution elements along a vertical column or stack.

BACKGROUND OF THE INVENTION

Optical fiber distribution systems may include fiber terminations and other equipment which is typically rack mounted. Various concerns exist for the optical fiber distribution systems, including density, ease of use and mounting, and cable management. There is a continuing need for improvements in the telecommunications distribution area, especially optical fiber distribution area.

SUMMARY OF THE INVENTION

One implementation of a system in accordance with the examples of the disclosure includes a building block element mountable to a rack or other structure. The element includes a chassis, and a moveable tray. The tray is moveably mounted to chassis with a slide mechanism that allows the tray to slide relative to the chassis, wherein the tray may house equipment for fiber terminations, patching, splitting, and splicing.

The elements can be stacked in a column with each tray slidable in a horizontal direction. In the case of a column of elements, a selected tray is pulled outward to access the desired tray.

In an example embodiment of a fiber optic distribution element, one side of each element can be for patch cables, and the opposite side can be for cable termination of an incoming cable, such as a distribution cable or a feeder cable. The elements can be configured as desired and form building blocks for an optical fiber distribution system (ODF). When the elements are mounted in a column in a rack, the cables can be placed in vertical cable guides to enter and exit the selected element. An example rack may be front accessible. However, the elements shown and described can be used in other racks, frames, cabinets or boxes including in arrangements where rear access is desirable or useful.

According to an aspect of the disclosure, the disclosure is directed to a mounting system for fixedly stacking two or more such telecommunications elements along a vertical column or stack, wherein the stacked elements can then be mounted on further fixtures such as racks, frames, cabinets or boxes.

According to another aspect, the present disclosure relates to a mounting system for locking two pieces of telecommunications equipment so as to prevent relative sliding between the two pieces of telecommunications equipment and relative separation between the two pieces of telecommunications equipment that is in a direction generally perpendicular to the direction of the relative sliding. The mounting system includes a first locking feature in the form of a stud defining a stem portion and a flange portion having a larger profile than the stem portion, a second locking feature in the form of a slot defining a receiver portion and a retention portion, wherein the receiver portion is sized to accommodate the flange portion of the stud and the retention portion is sized to accommodate the stem portion but not the flange portion of the stud, and a third locking feature configured to prevent relative sliding between the two pieces of telecommunications equipment once the stem portion of the stud has been slid through the retention portion of the slot and the flange portion is out of alignment with the receiver portion of the slot. According to one example embodiment, the third locking feature may be provided in the form of a removable, snap-fit structure. According to another example embodiment, the third locking feature may be provided in the form of a cantilever arm that is an integral part of the telecommunications equipment, the cantilever arm having a portion that abuts the stud for preventing sliding movement of the stud.

According to another aspect, the disclosure is directed to a telecommunications distribution element that includes a mounting system that allows the distribution element to be fixedly stacked along a vertical column or stack with another similarly configured element.

According to another aspect, the disclosure is directed to an optical fiber distribution element comprising a top surface, a bottom surface, an interior region defined between the top surface and the bottom surface, the interior region including fiber optic connection locations, a first locking feature in the form of a stud extending from the top surface, the stud defining a stem portion and a flange portion having a larger profile than the stem portion, and a second locking feature in the form of a slot at the bottom surface, the slot defining a receiver portion and a retention portion, wherein the receiver portion is sized to accommodate the flange portion of the stud and the retention portion is sized to accommodate the stem portion but not the flange portion of the stud.

According to another aspect of the disclosure, the disclosure is directed to a method of stacking two or more distribution elements along a vertical column.

According to another aspect, the disclosure is directed to a method of locking two pieces of telecommunications equipment so as to prevent relative sliding between the two pieces of telecommunications equipment and relative separation between the two pieces of telecommunications equipment that is in a direction generally perpendicular to the direction of the relative sliding. The method includes aligning a flange portion of a stud of a first piece of telecommunications equipment with a receiver portion of a slot of a second piece of telecommunications equipment, passing the flange portion of the stud through the receiver portion of the slot, sliding a stem portion of the stud through a retention portion of the slot to bring the flange portion out of alignment with the receiver portion of the slot, and providing a lock that prevents relative sliding between the first and second pieces of telecommunications equipment so as to prevent sliding of the stem portion of the stud through the retention portion of the slot.

BRIEF DESCRIPTION OF THE FIGURES

FIG. 52 is a cross-sectional view of a portion of the universal mounting mechanism of FIG. 48 showing the positional relationship between the universal mounting bracket and the release handle of the mounting mechanism when the mounting mechanism is in a locked state;

DETAILED DESCRIPTION

Figure 1:
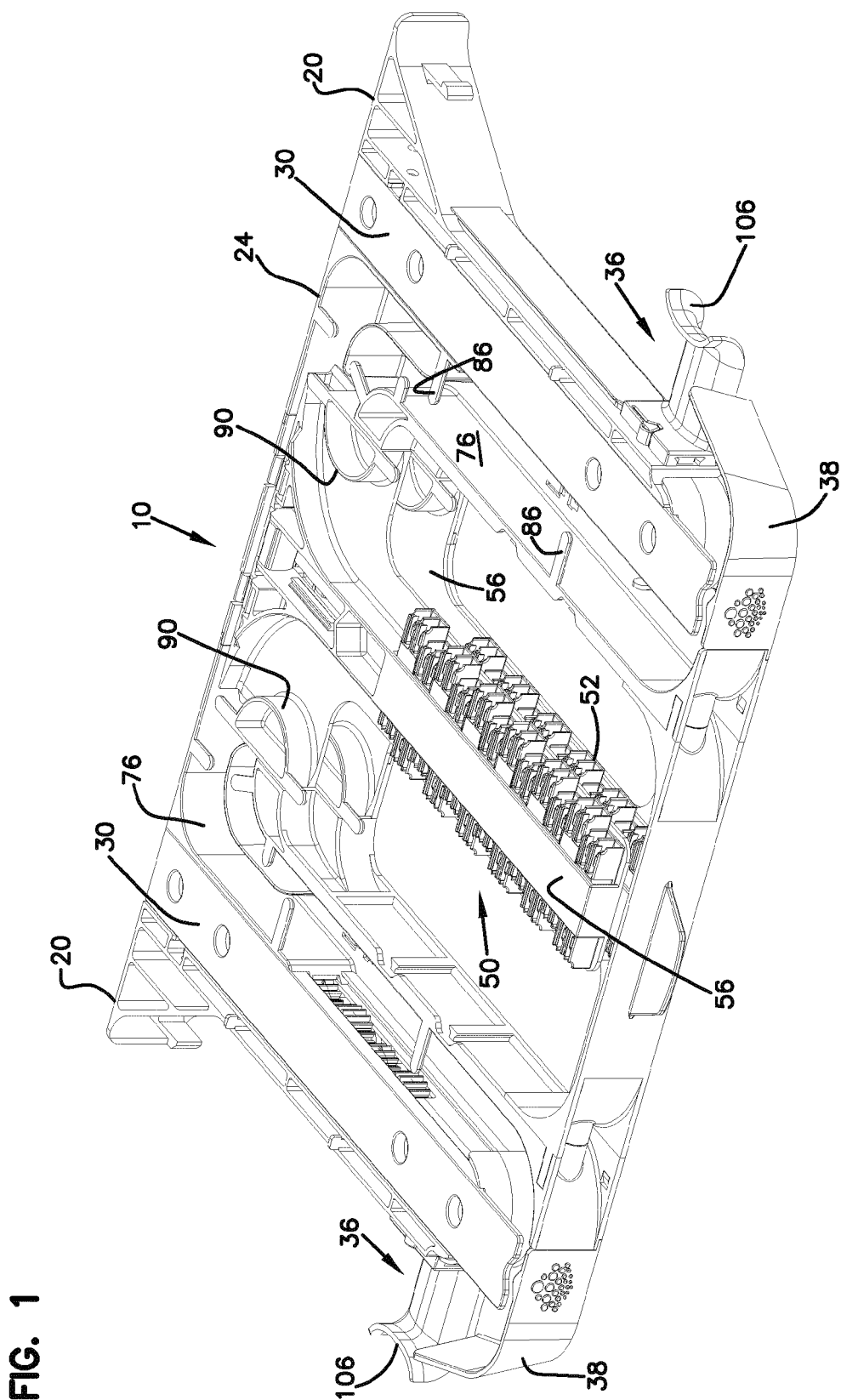
FIG. 1 is an embodiment of an optical fiber distribution element in accordance with the present disclosure.
Figure 2:
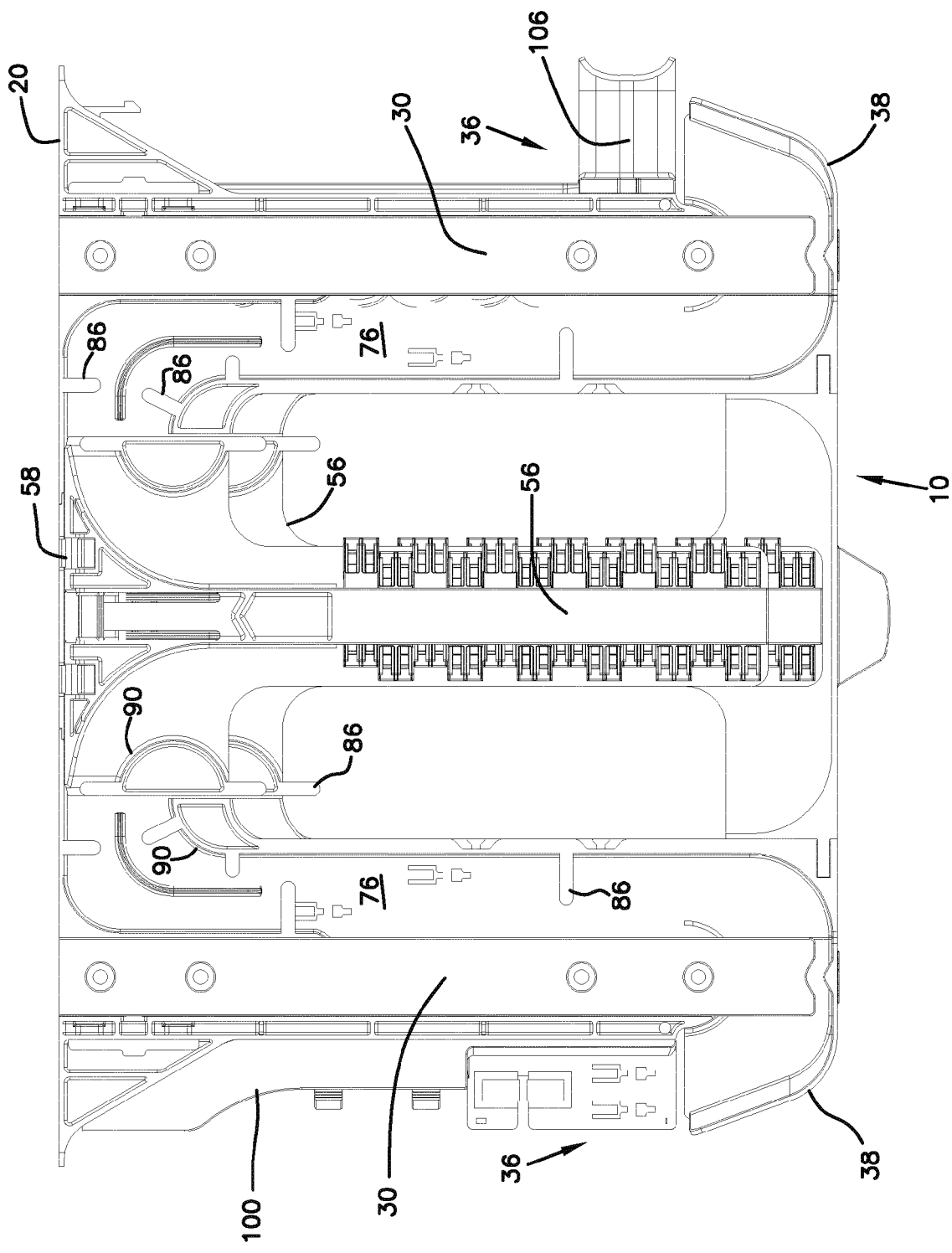
FIG. 2 is a top view of the element of FIG. 1.
Figure 3:
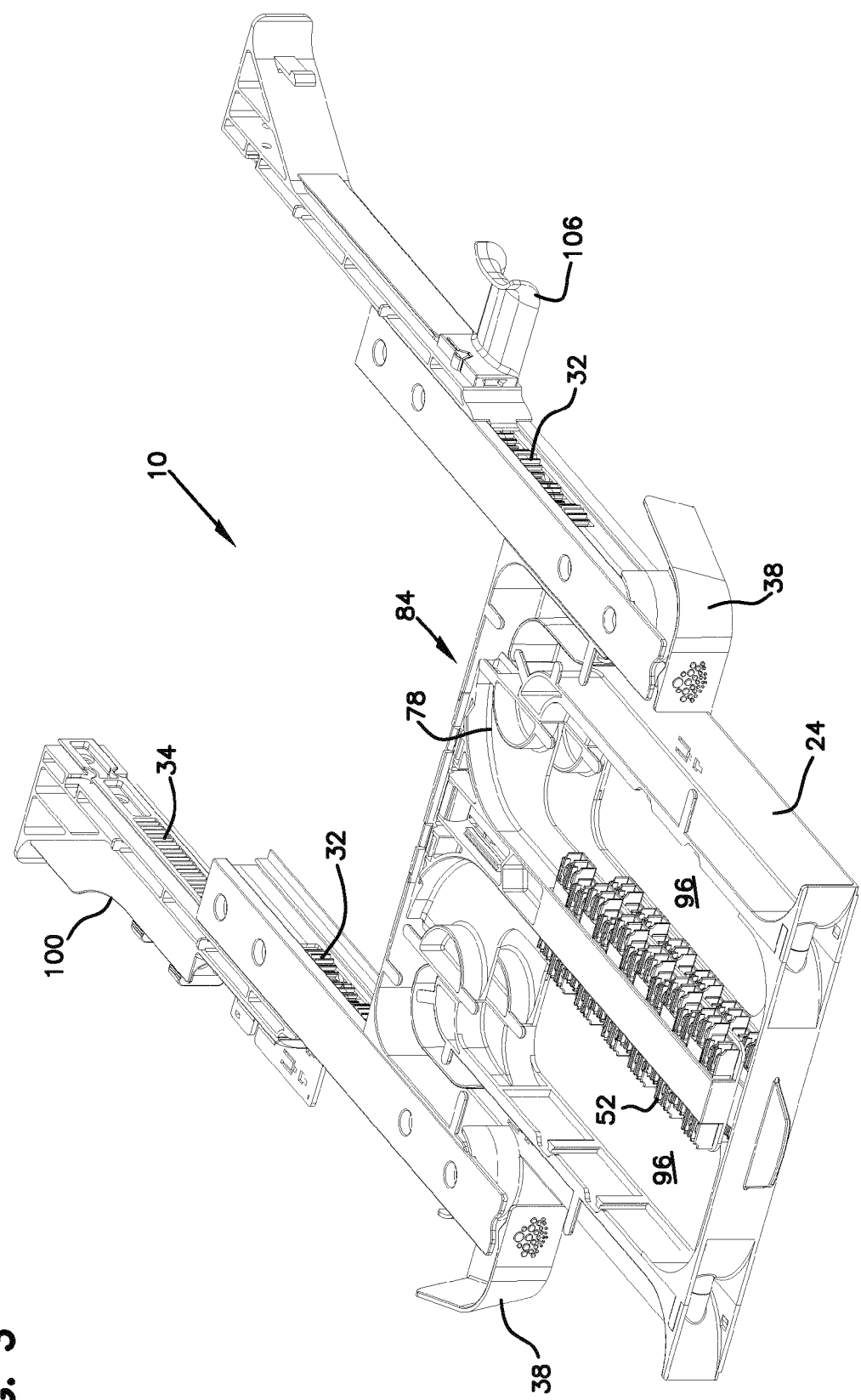
FIG. 3 is a perspective view of the element of FIG. 1 showing the tray pulled forward from the chassis.
Figure 4:
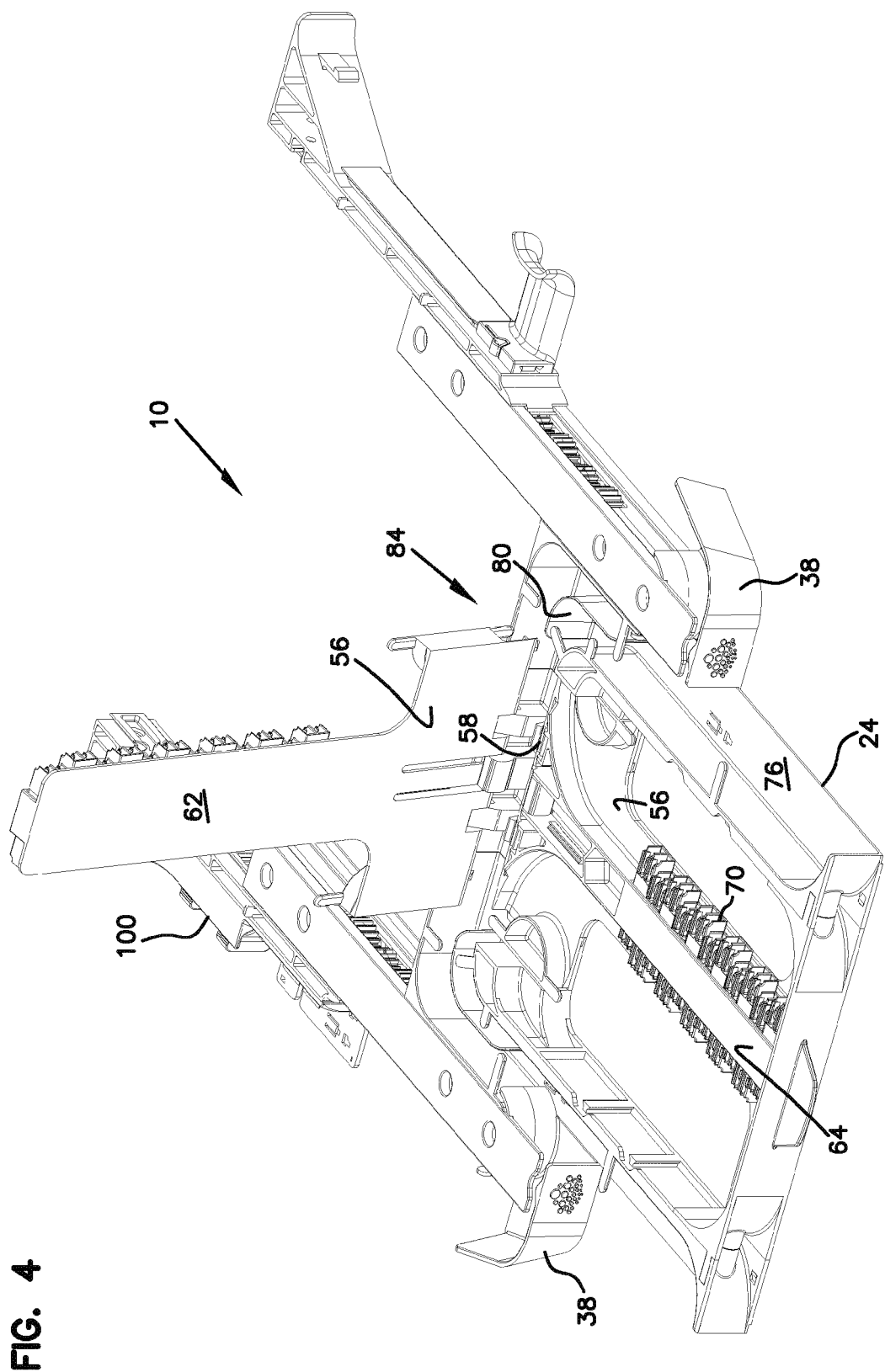
FIG. 4 shows one of tray frame members pivoted upwardly from the tray.
Figure 5:
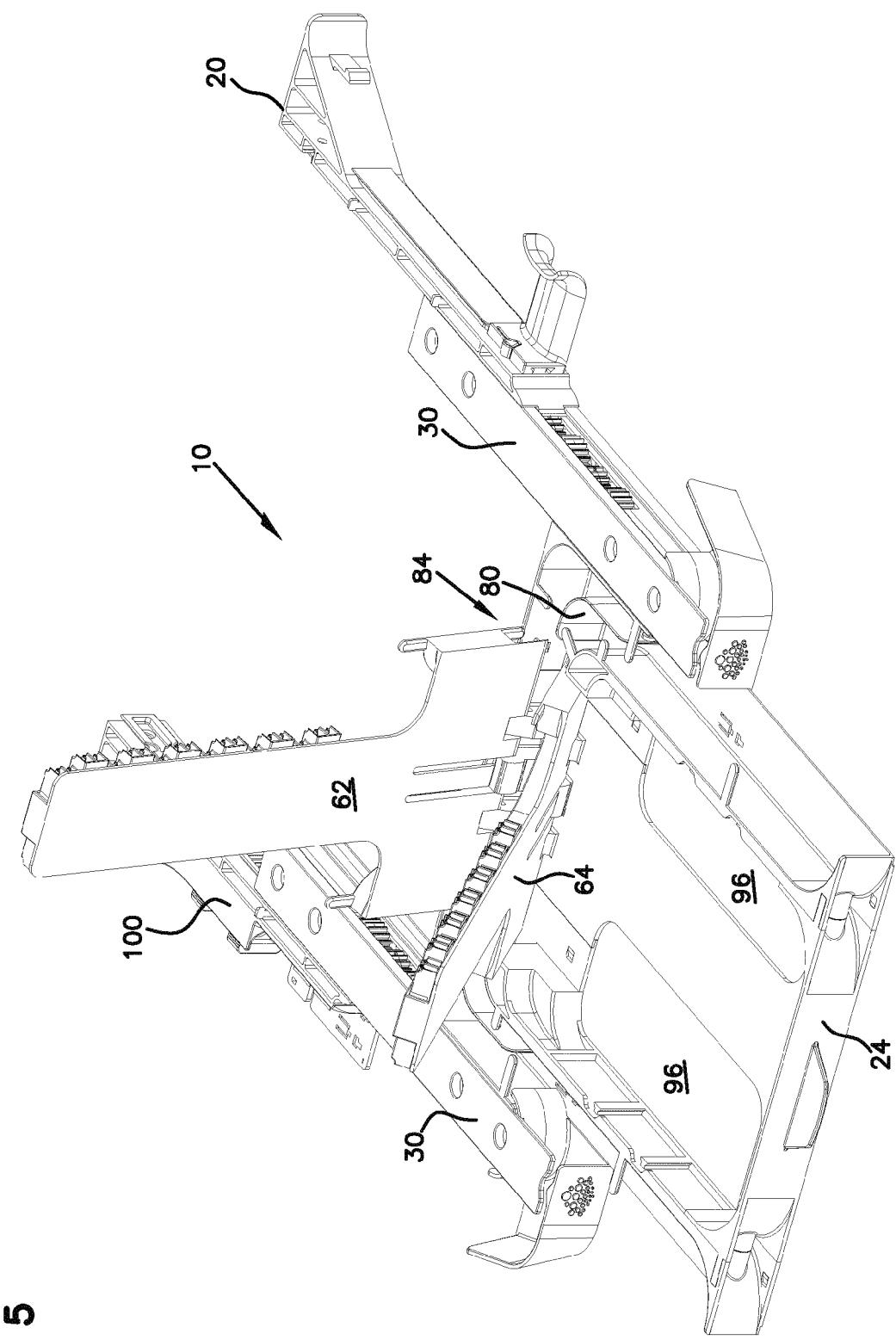
FIG. 5 shows a second frame member pivoted upwardly relative to the tray.
Figure 6:
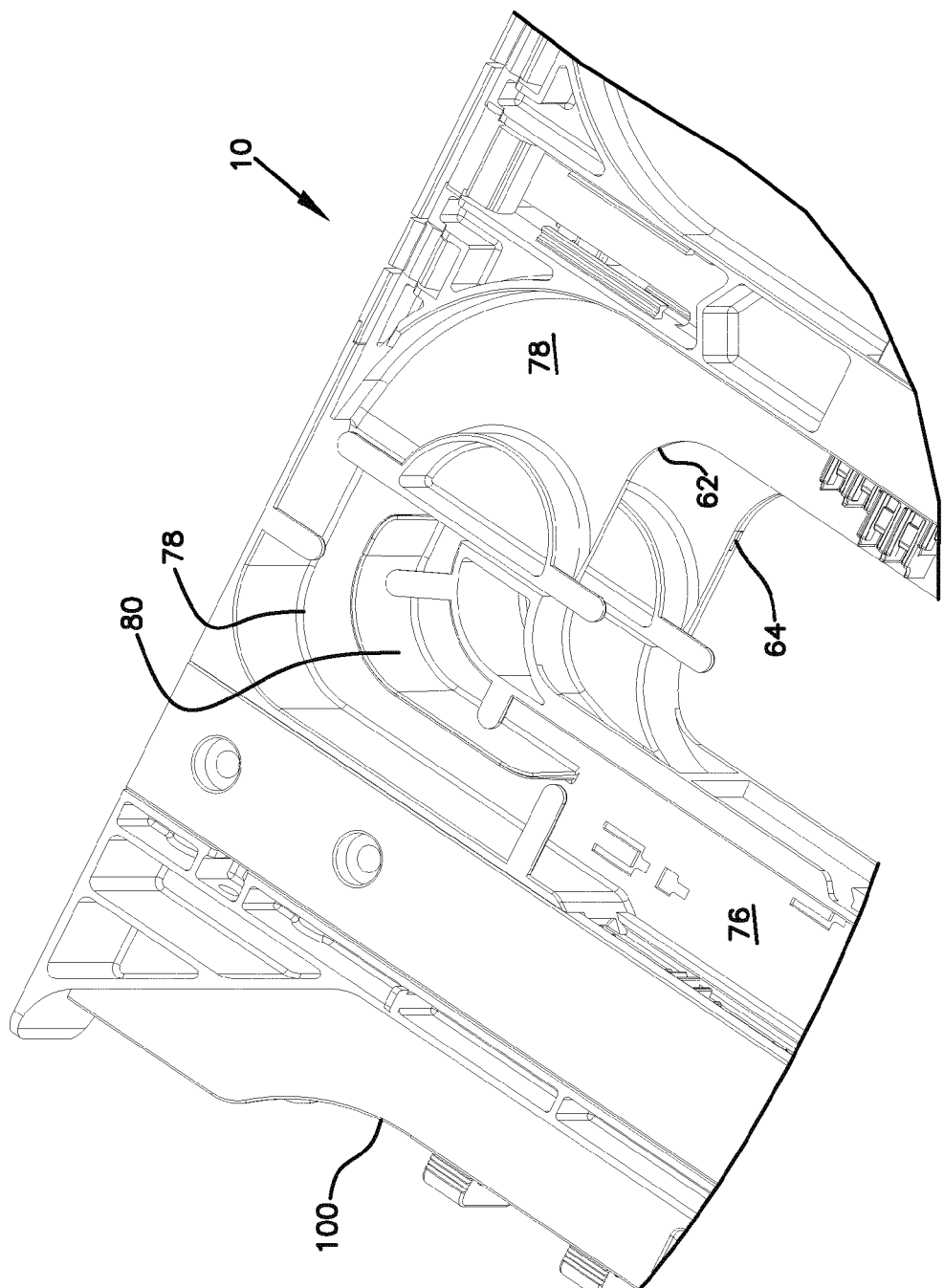
FIG. 6 shows a portion of a cable management area of the element of FIG. 1.
Figure 7:
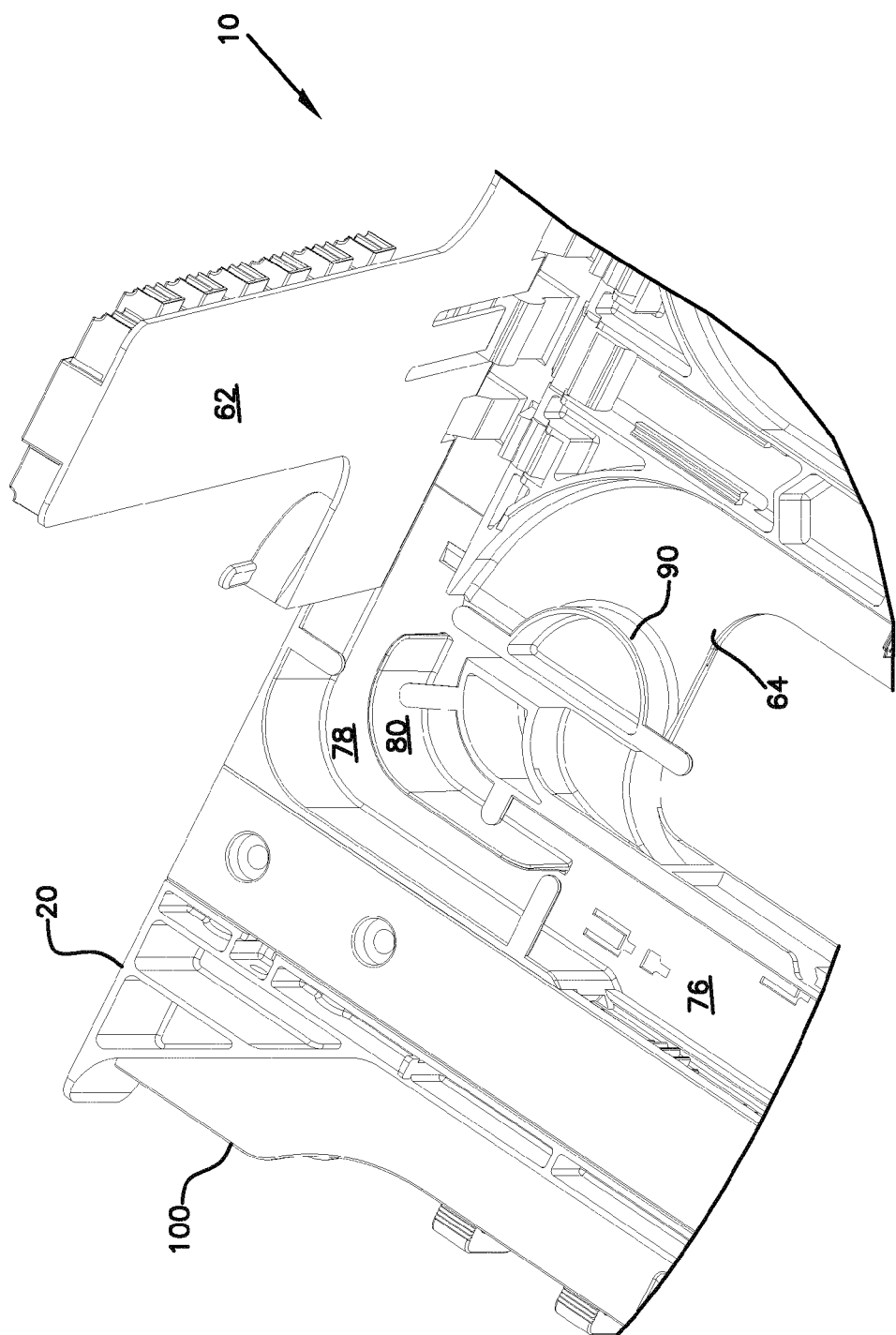
FIG. 7 shows a similar view to FIG. 6, with one of the frame members pivoted upwardly.
Figure 8:
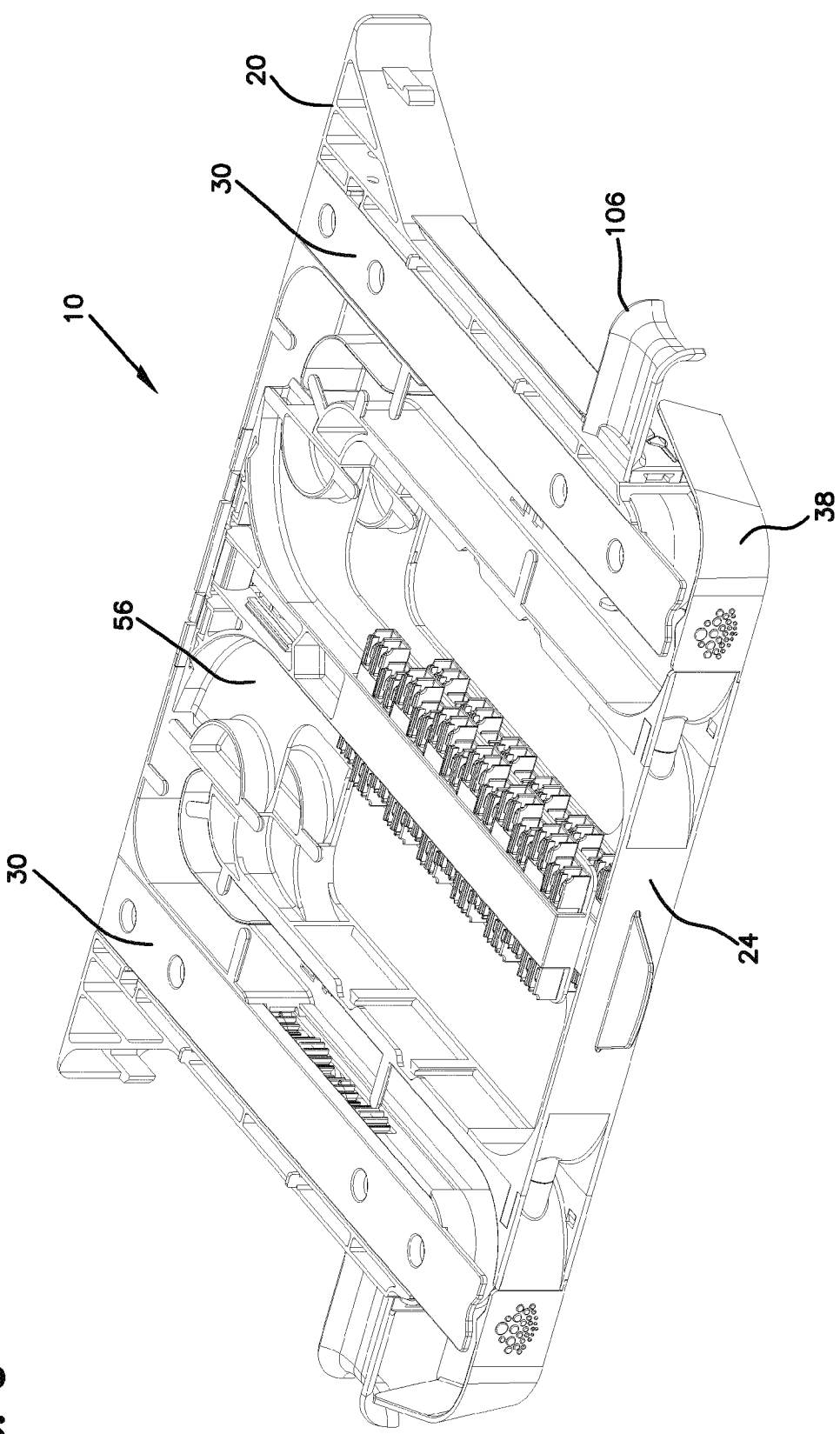
FIG. 8 shows an alternative embodiment of an element with different cable management at the entry points.
Figure 9:
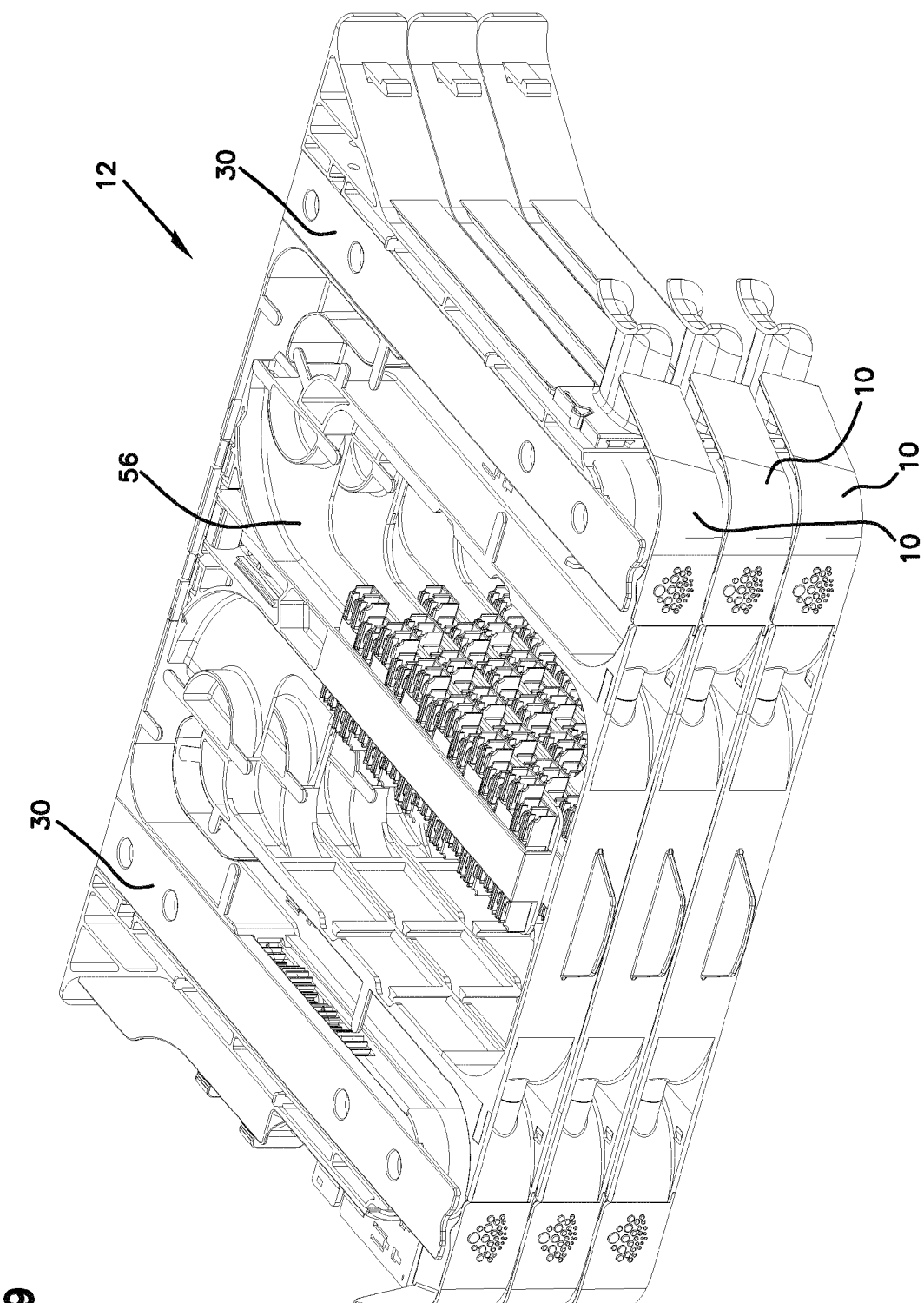
FIG. 9 shows three of the elements of FIG. 8 mounted in a block formation, with cable radius limiters at the entry point mounted in an alternative position.
Figure 10:
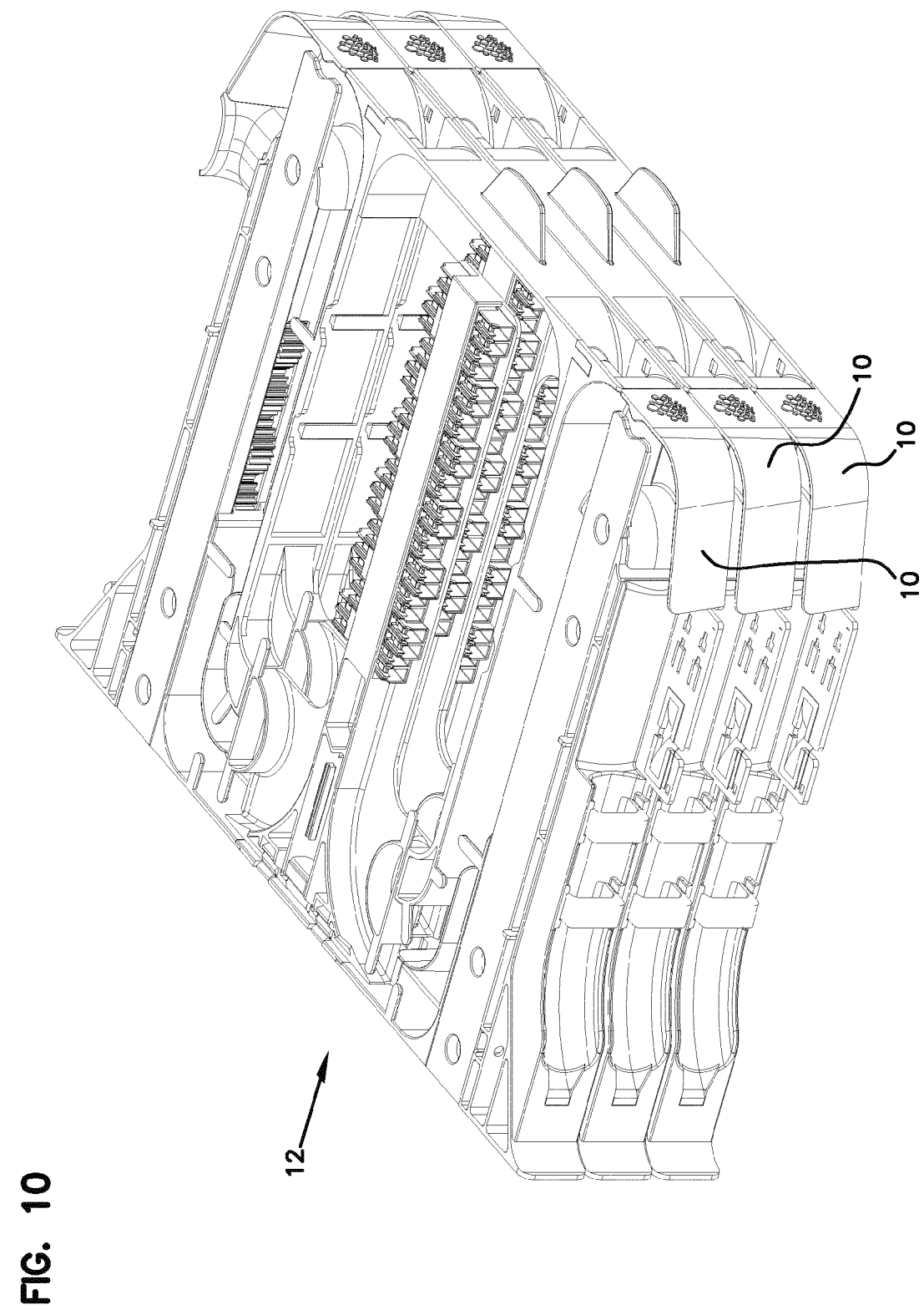
FIG. 10 is a perspective view of the block of FIG. 9.
Figure 11:
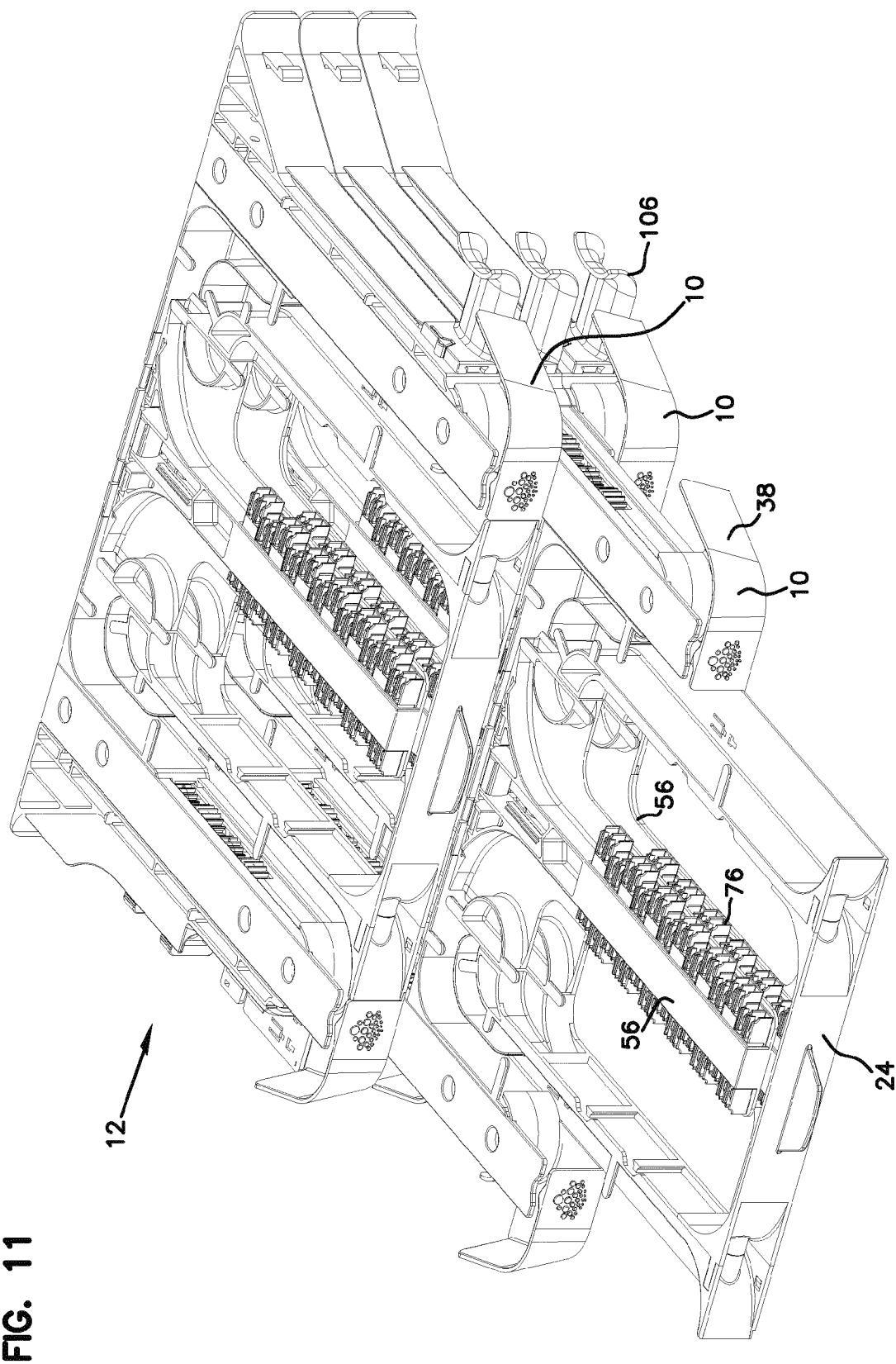
FIG. 11 is a view of the block of FIG. 9, with the tray of the middle element pulled forward for access to the fiber terminations.
Figure 12:
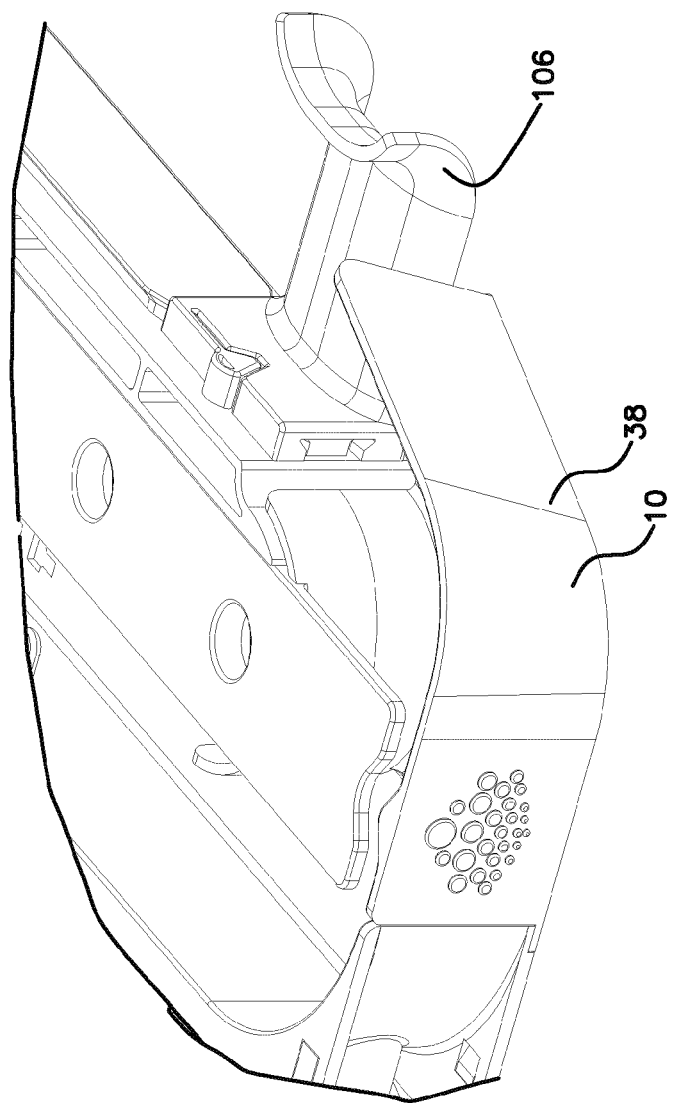
FIG. 12 shows an enlarged portion of an entry point for one of the elements with a cable radius limiter in a first position.
Figure 13:
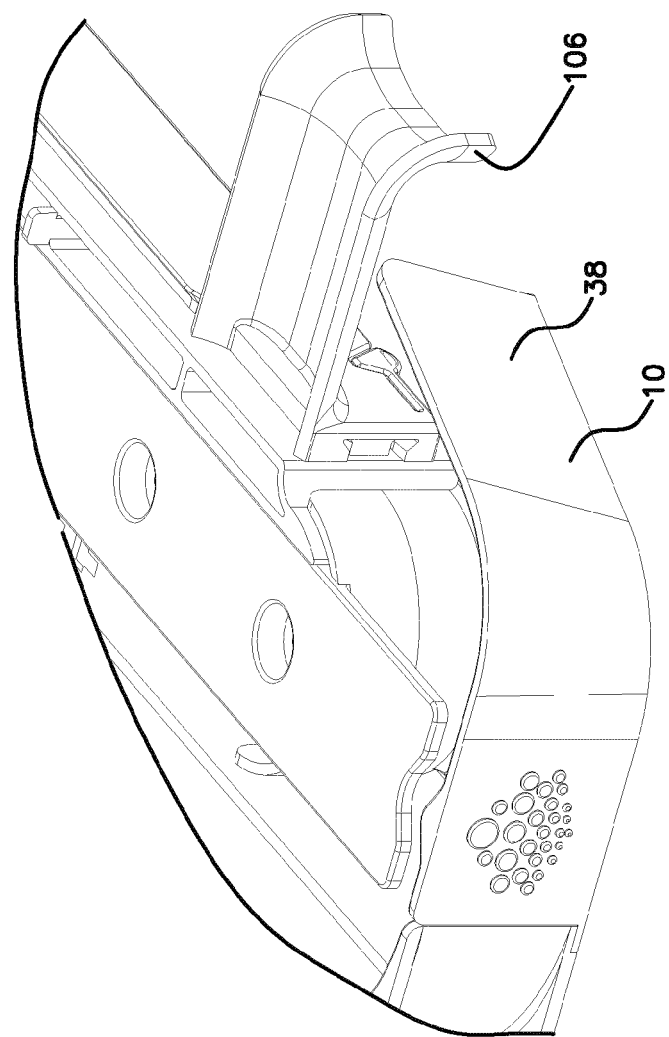
FIG. 13 shows a similar view as in FIG. 12, with the cable radius limiter positioned in an alternate position.
Figure 14:
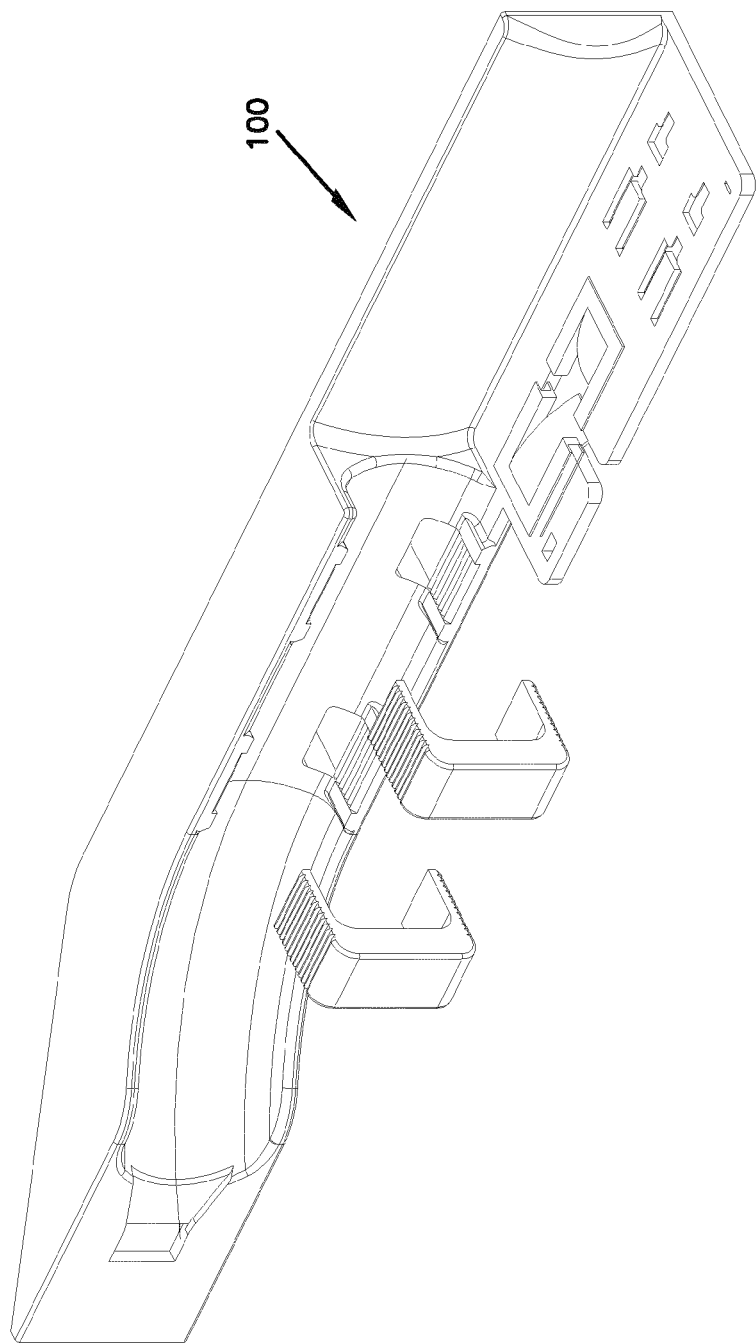
FIG. 14 shows an exploded view of a cable mount.
Figure 15:
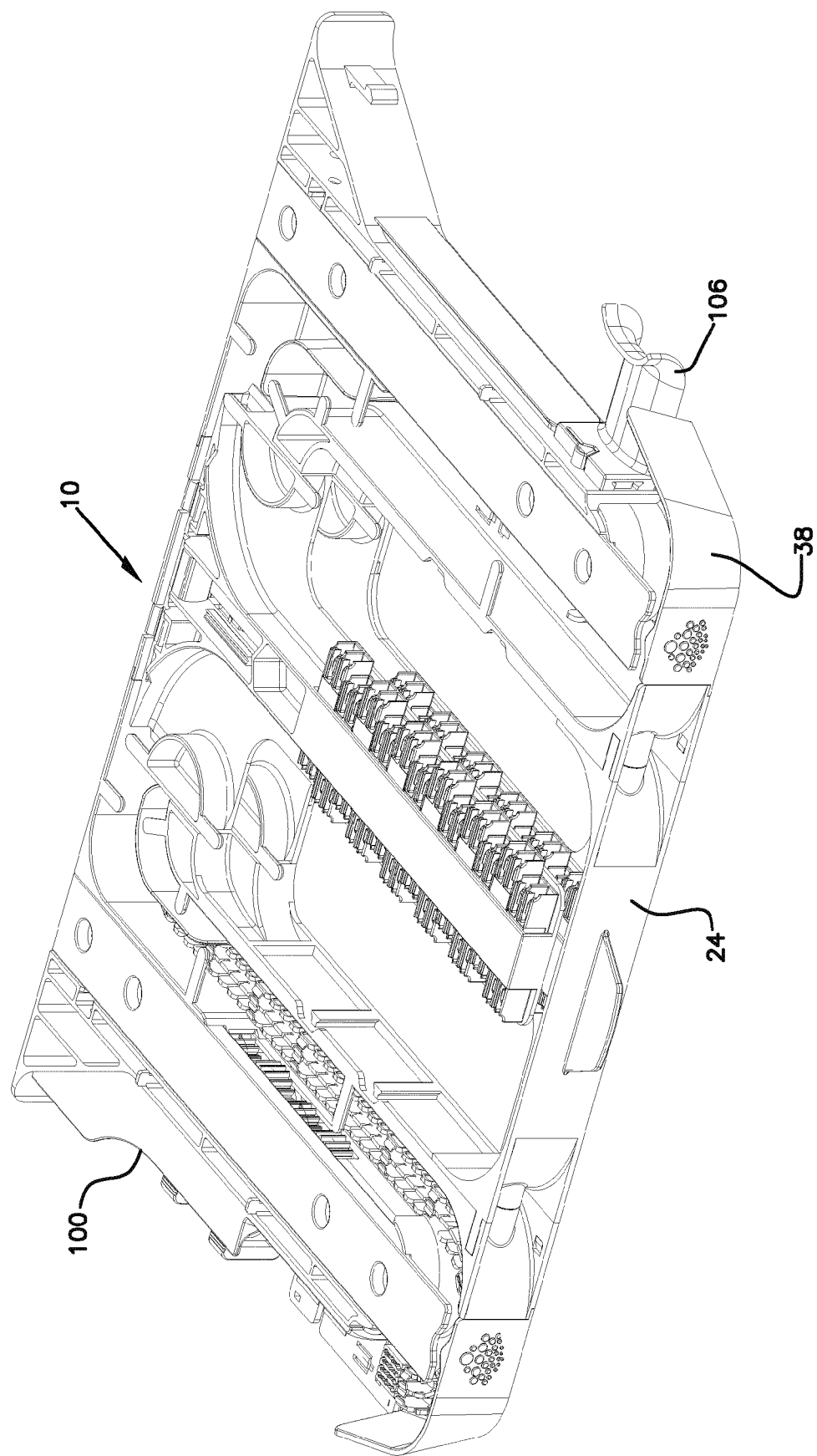
FIG. 15 shows an element with a cable mount on one side, and a cable radius limiter on an opposite side.

Referring now to FIGS. 1-16, various embodiments of an optical fiber distribution element 10, or element 10, are shown. The elements 10 can be individually mounted as desired to telecommunications equipment including racks, frames, or cabinets. The elements 10 can be mounted in groups or blocks 12 which forms a stacked arrangement. In one embodiment, a vertical stack of elements 10 populates an optical fiber distribution rack.

Each element 10 holds fiber terminations, or other fiber components including fiber splitters and/or fiber splices. In the case of fiber terminations, incoming cables are connected to outgoing cables through connectorized cable ends which are connected by adapters, as will be described below.

Each element includes a chassis 20 and a movable tray 24. Tray 24 is movable with a slide mechanism 30 including one or more gears 32 and a set of two toothed racks or linear members 34.

Slide mechanism 30 provides for synchronized movement for managing the cables extending to and from tray 24. Entry points 36 on either side of chassis 20 allow for fixation of the input and output cables associated with each element 10. The radius limiters 38 associated with each slide mechanism 30 move in synchronized movement relative to chassis 20 and tray 24 to maintain fiber slack, without causing fibers to be bent, pinched, or pulled.

Each tray 24 includes mounting structure 50 defining one or more of fiber terminations, fiber splitters, fiber splices, or other fiber components. As shown, mounting structure 50 holds adapters 52 which allow for interconnection of two connectorized ends of cables. Each tray 24 includes one or more frame members 56. In the example shown, two frame members 56 are provided. As illustrated, each frame member 56 is T-shaped. Also, each tray 24 includes two frame members 56 which are hingedly mounted at hinges 58. A top frame member 62 is positioned above a bottom frame member 64. The mounting structure 50 associated with each frame member 62, 64 includes one or more integrally formed adapter blocks 70. Adapter blocks 70 include a plurality of adapter ports for interconnecting to fiber optic connectors. A pathway 76 defines a generally S-shape from radius limiters 38 to adapter blocks 70. As shown, pathway 76 includes an upper level 78 and a lower level 80 in the interior. A portion 84 of pathway 76 is positioned adjacent to hinges 58 to avoid potentially damaging cable pull during pivoting movement of frame members 56. Flanges 86 and radius limiters 90 help maintain cables in pathways 76.

Tray 24 includes openings 96 to allow for technician access to the cable terminations at adapter blocks 70. In addition, the T-shapes of frame members 56 further facilitate technician access to the connectors.

Cables extending to and from element 10 can be affixed with a cable mount 100 as desired. Additional protection of the fiber breakouts can be handled with cable wraps 102. Radius limiters 106 can be additionally used to support and protect the cables.

Figure 16:
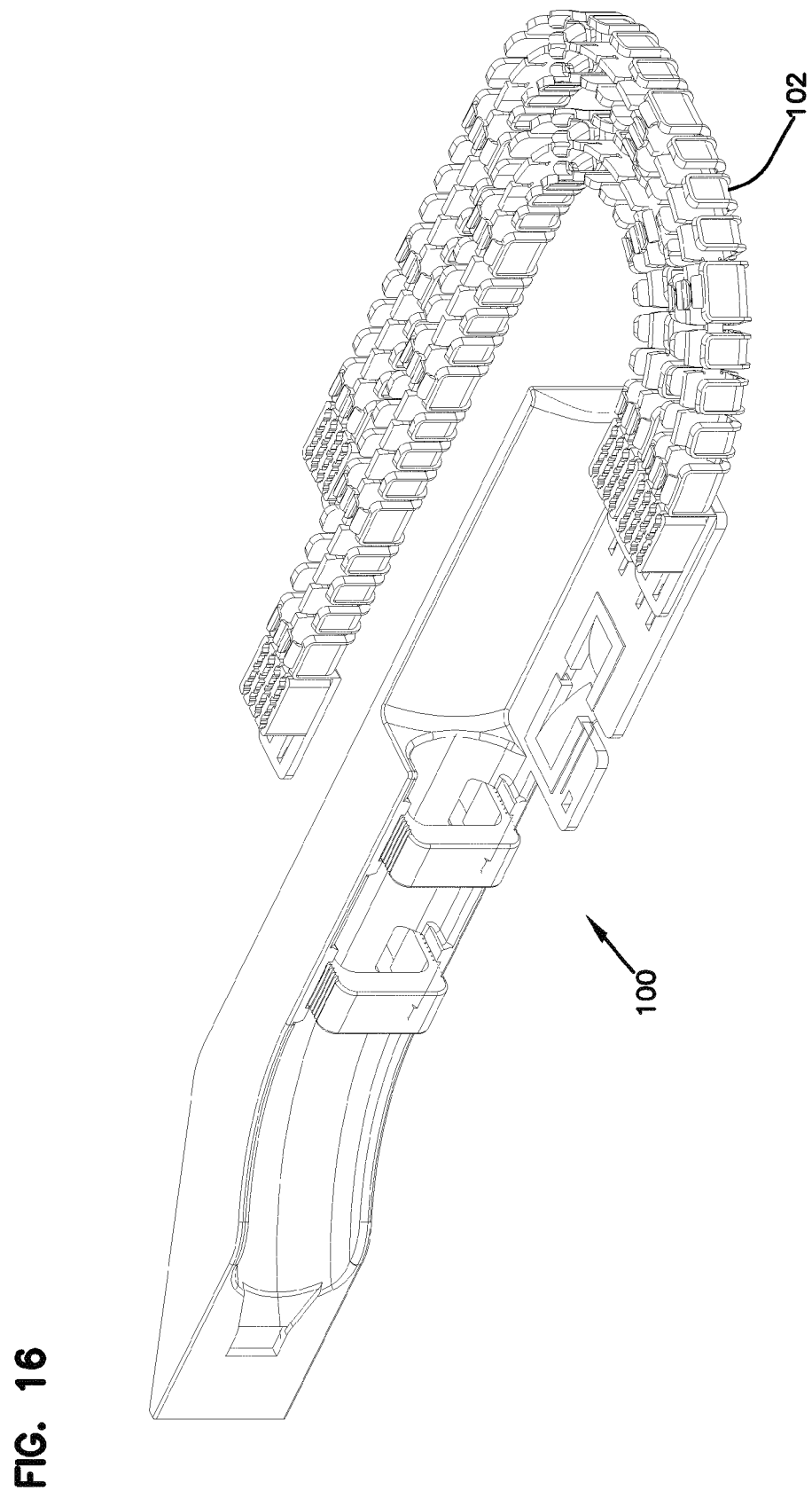
FIG. 16 shows an alternative cable mount.
Figure 17:
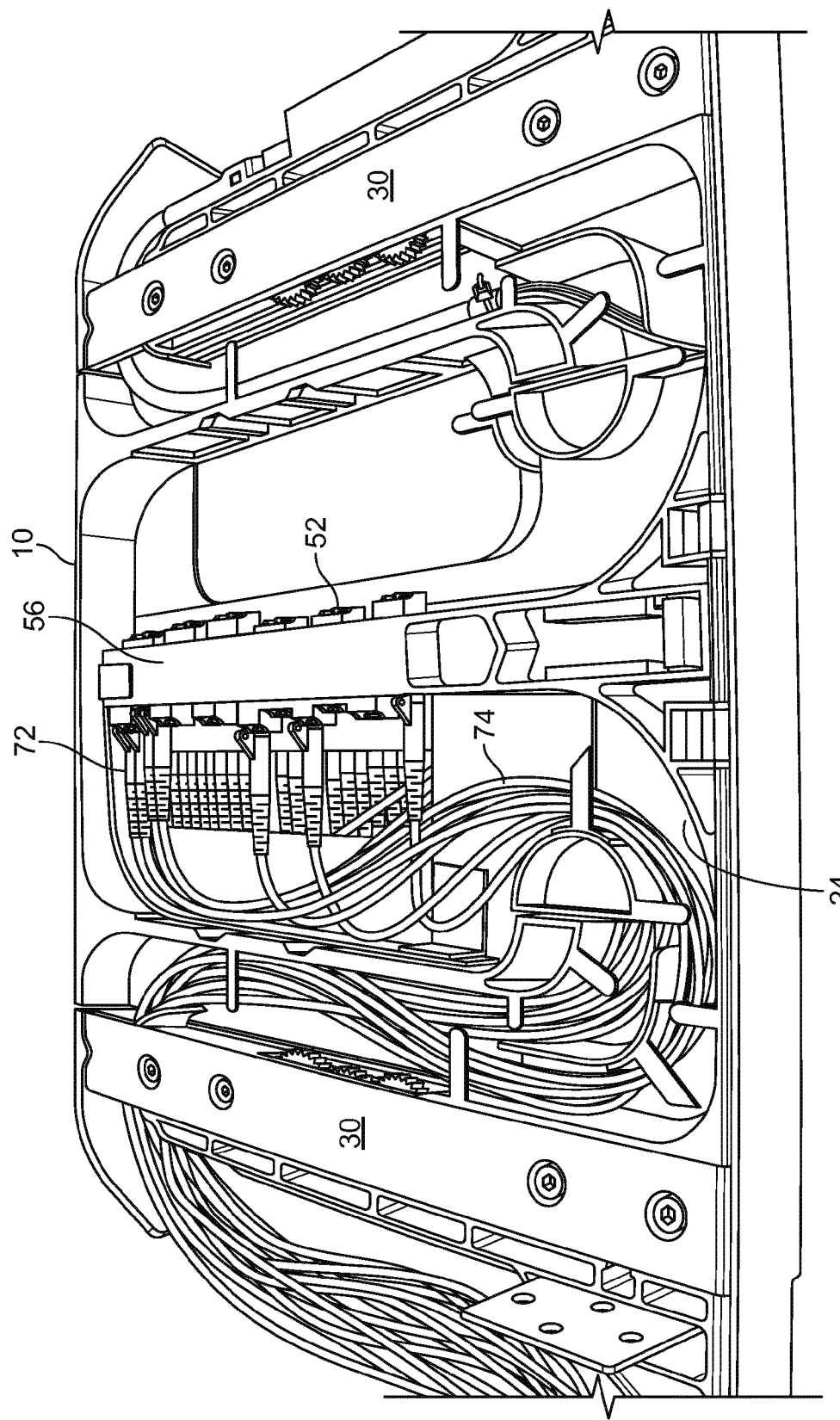
FIGS. 17-29 show various views of the elements shown in FIGS. 1-16 including additional details and cable routings shown for illustration purposes.
Figure 18:
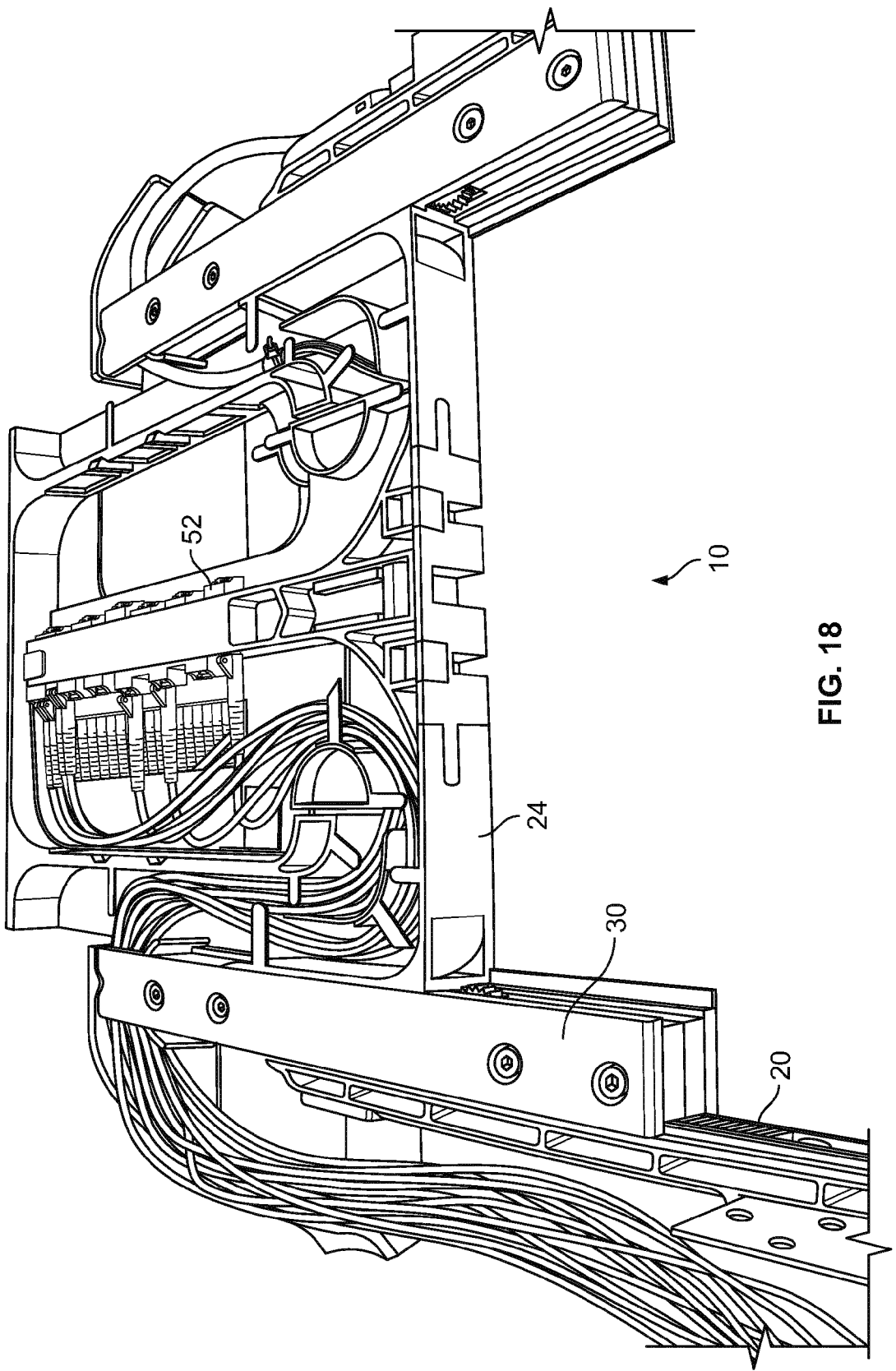
Figure 19:
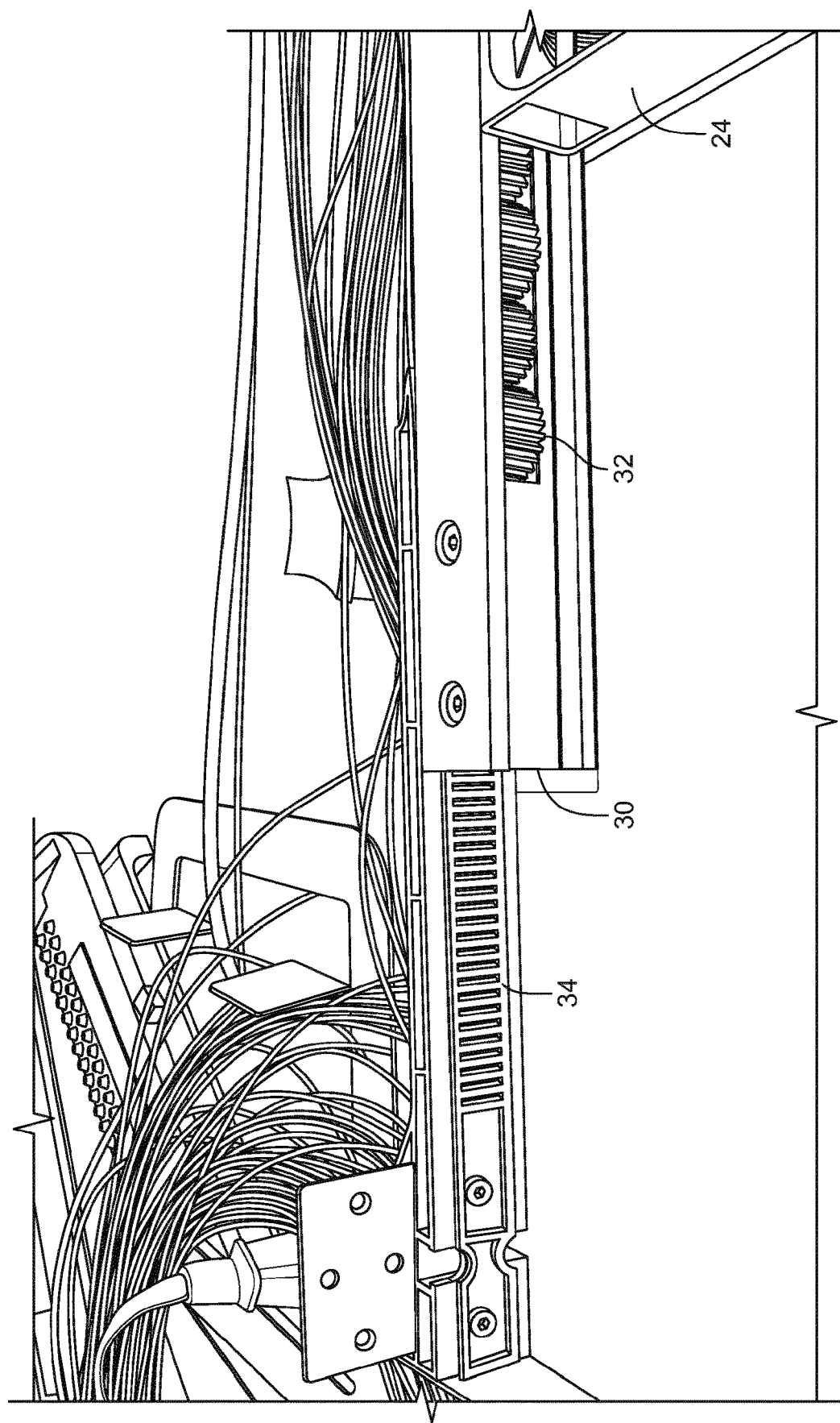
Figure 20:
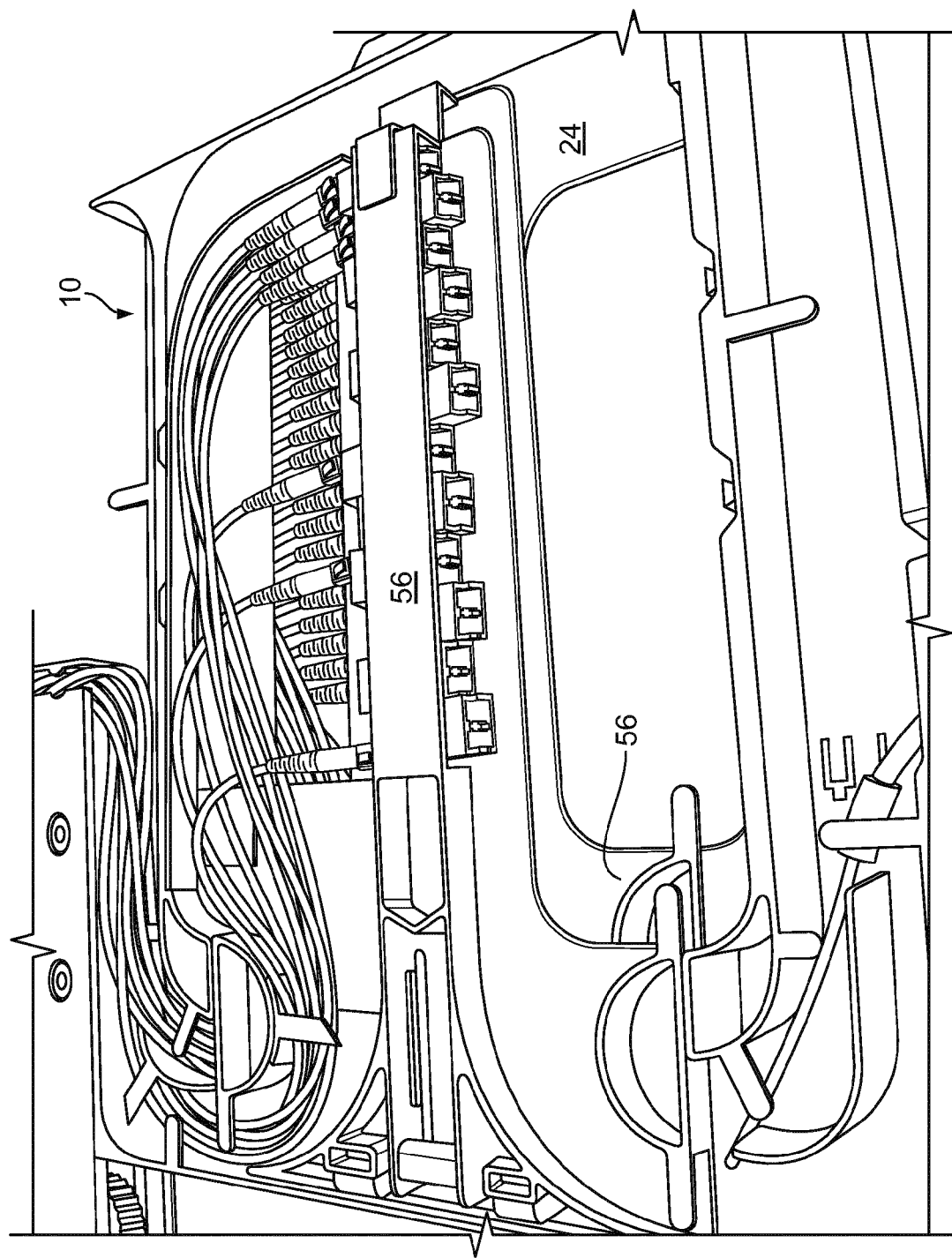
Figure 21:
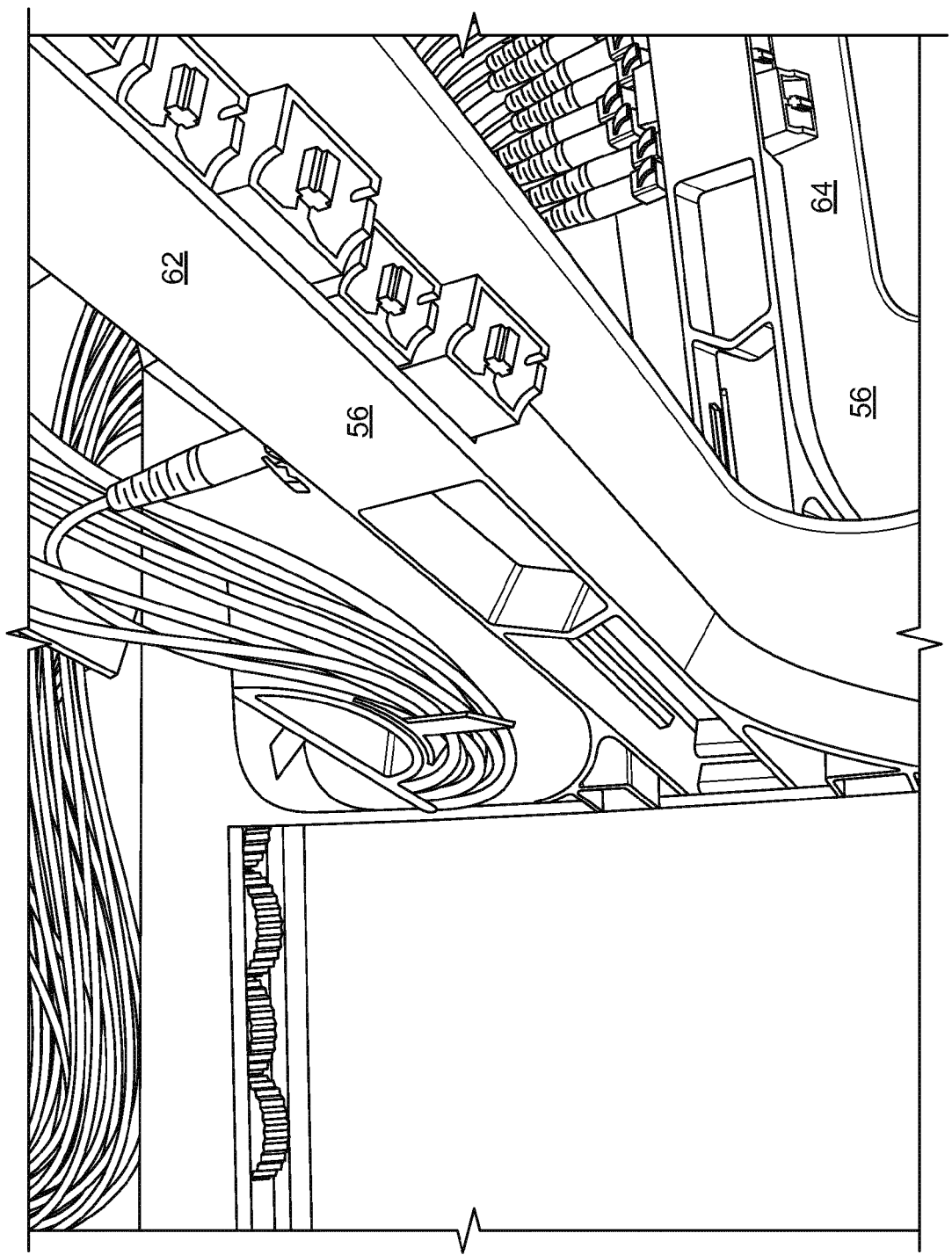
Figure 22:
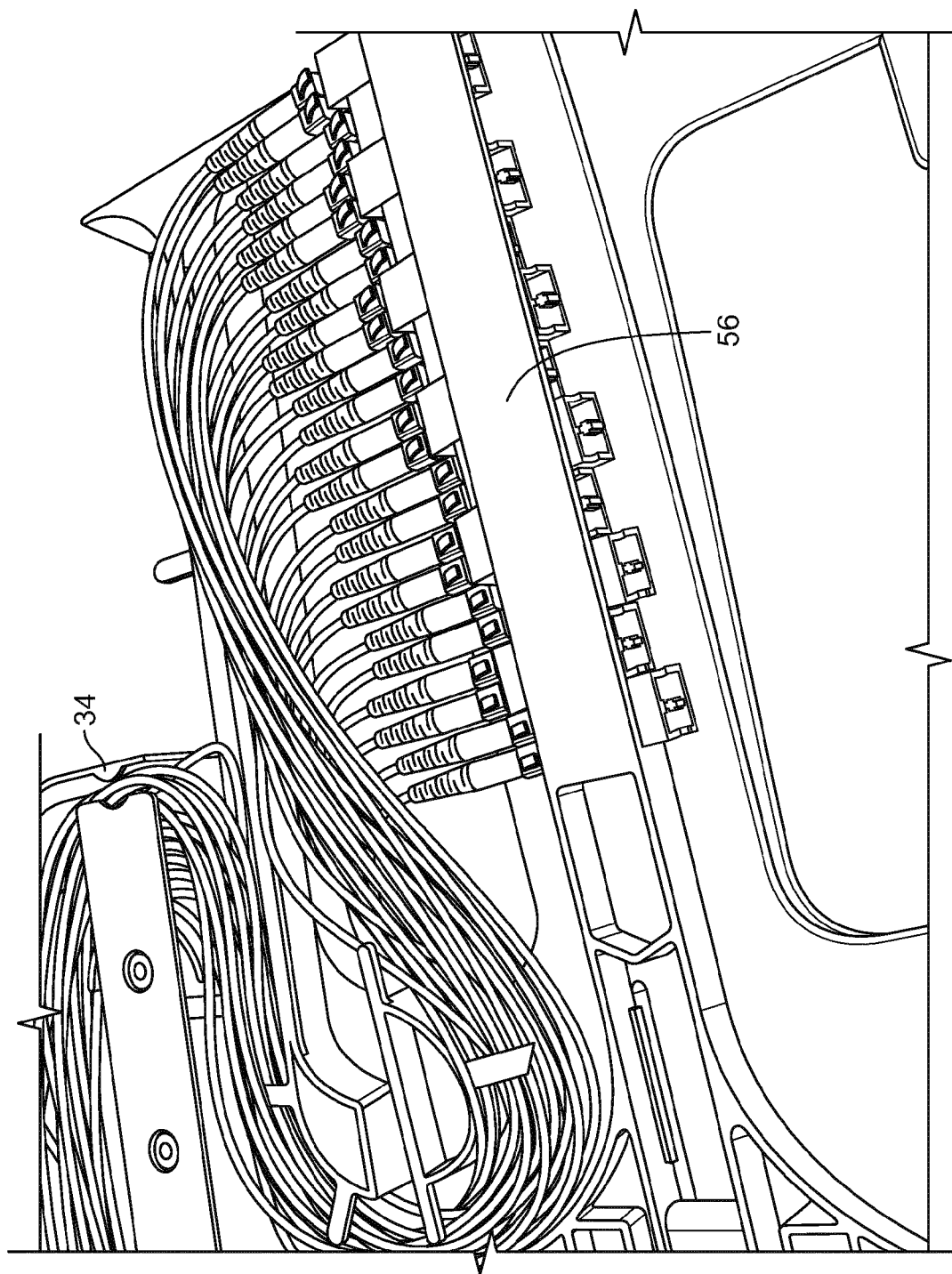
Figure 23:
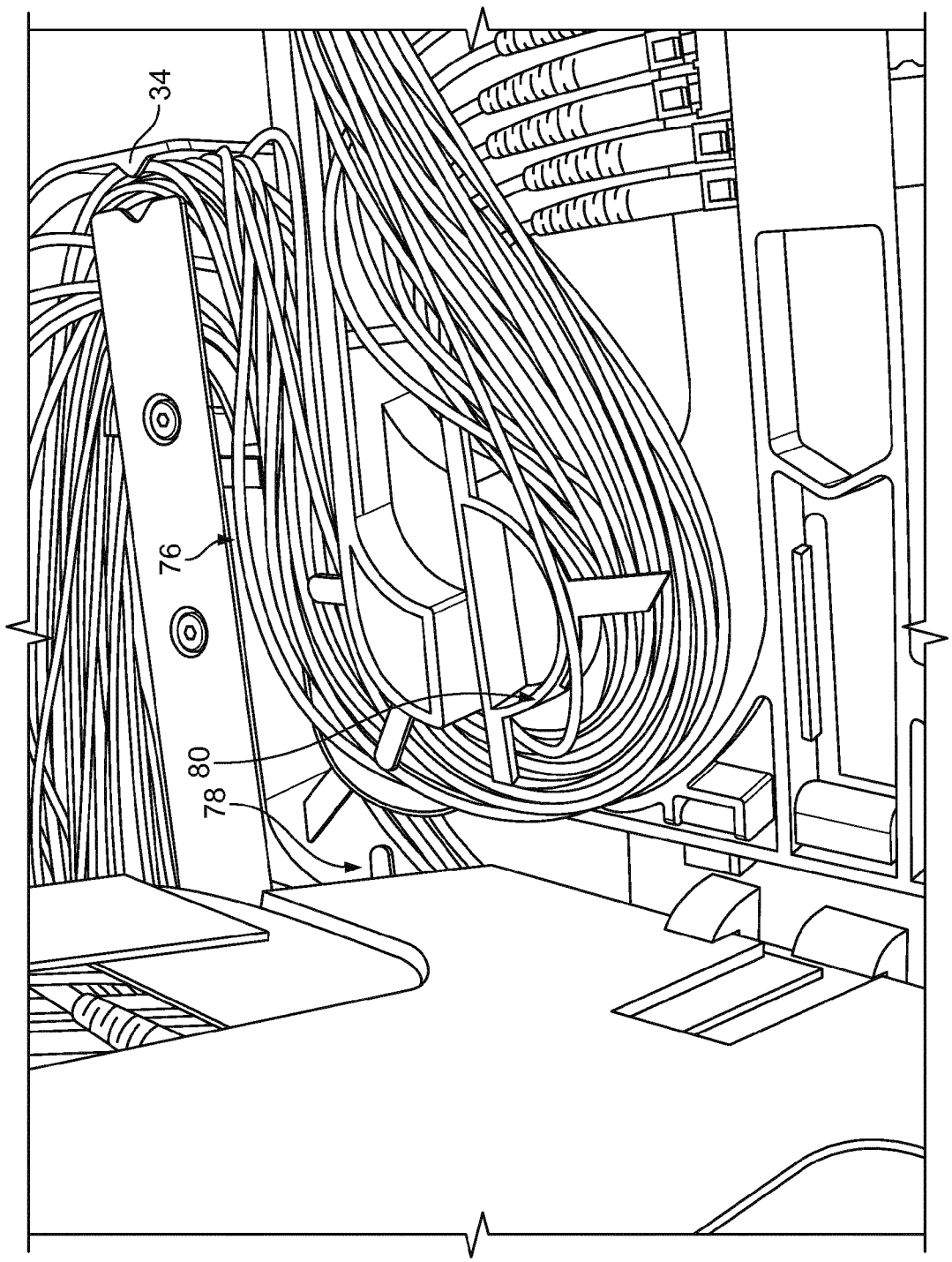
Figure 24:
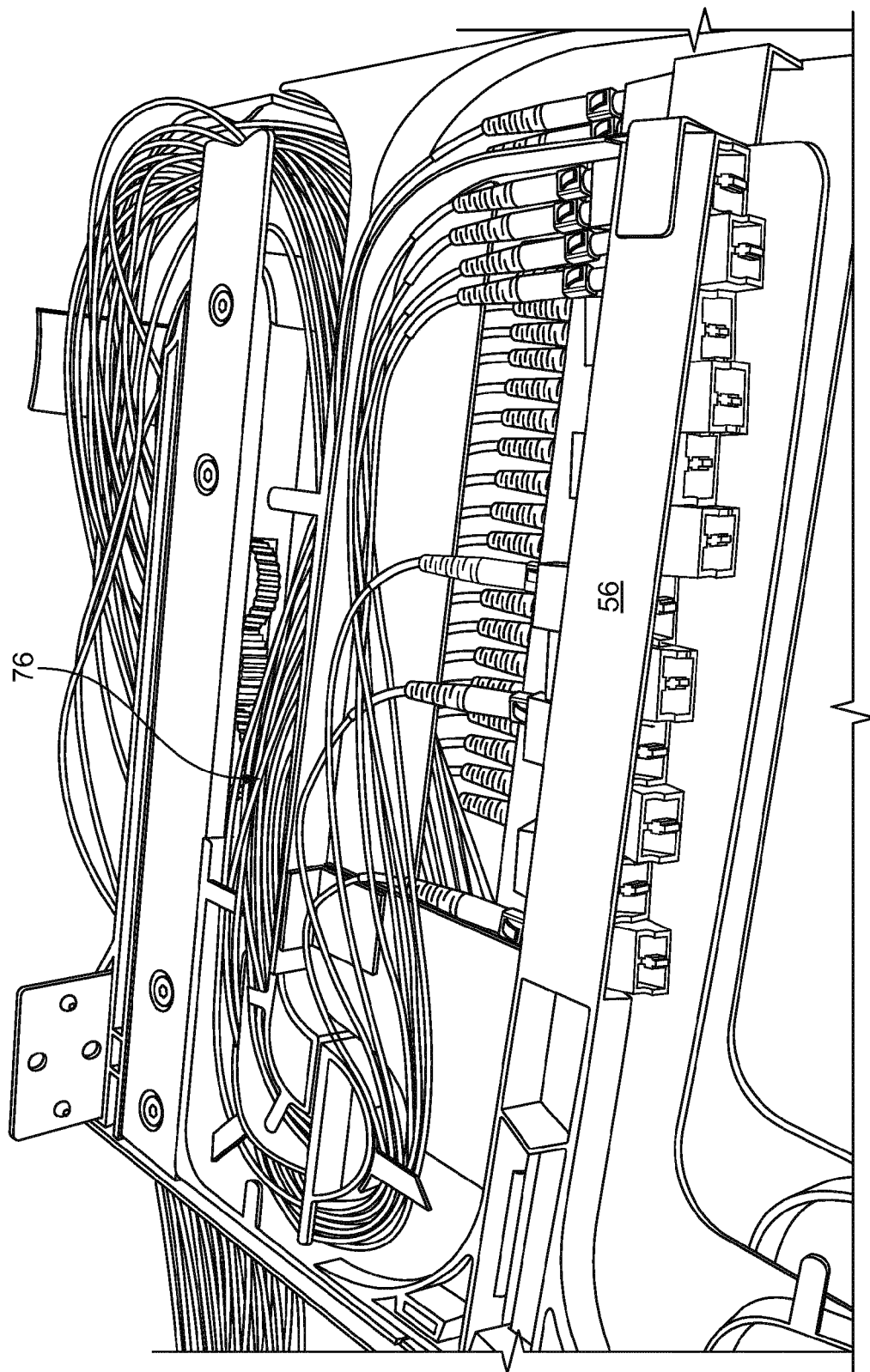
Figure 25:
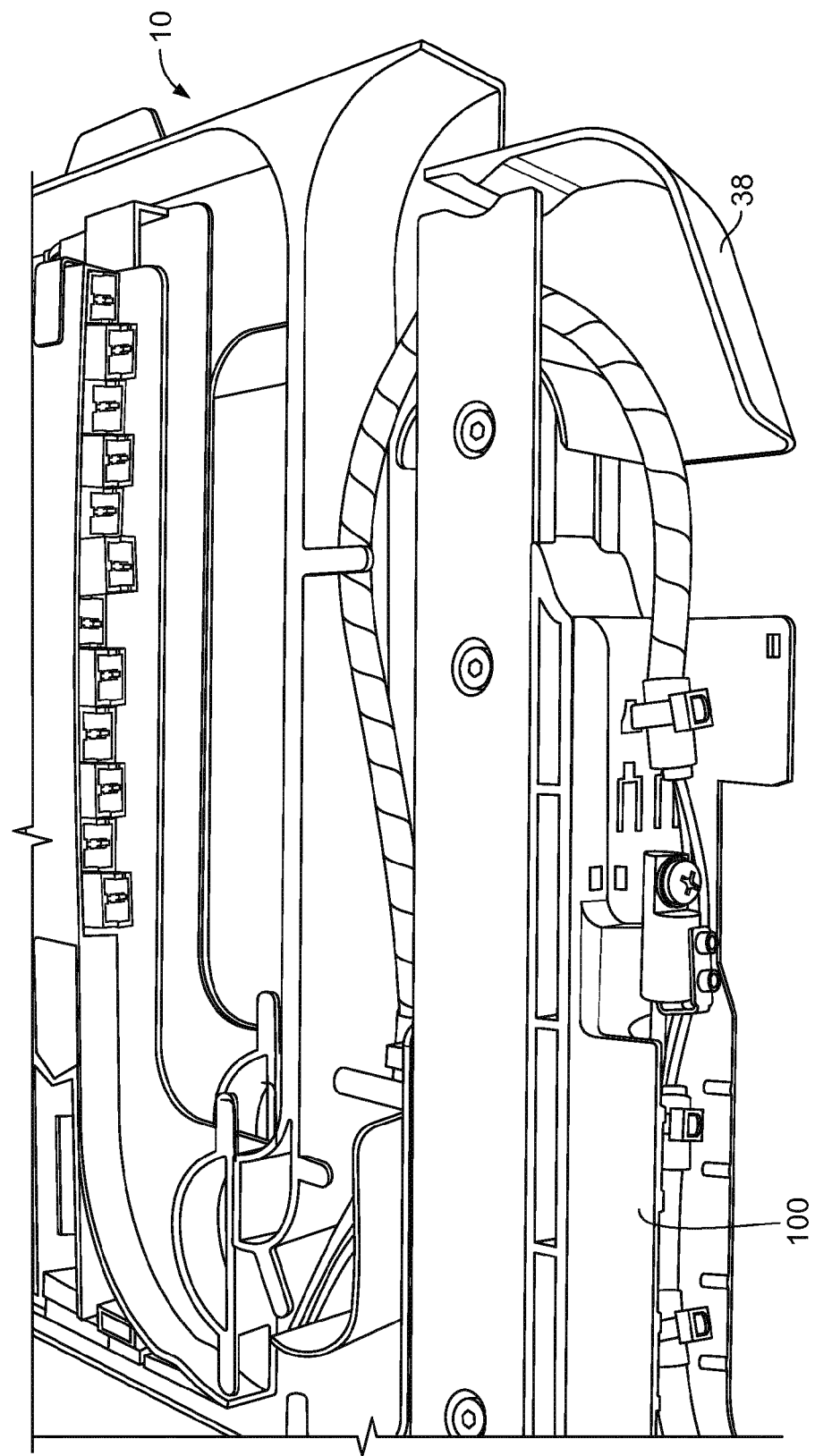
Figure 26:
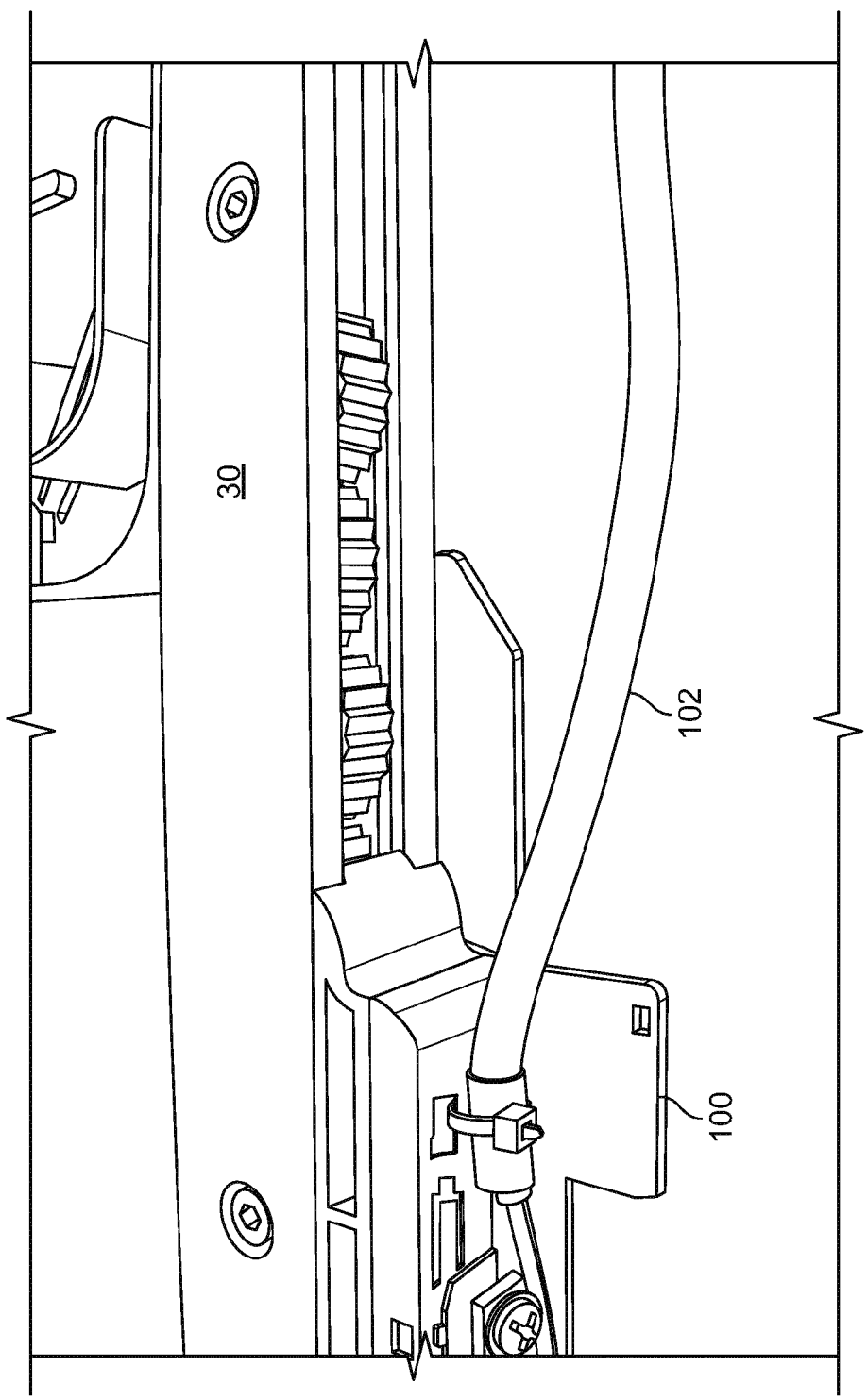
Figure 27:
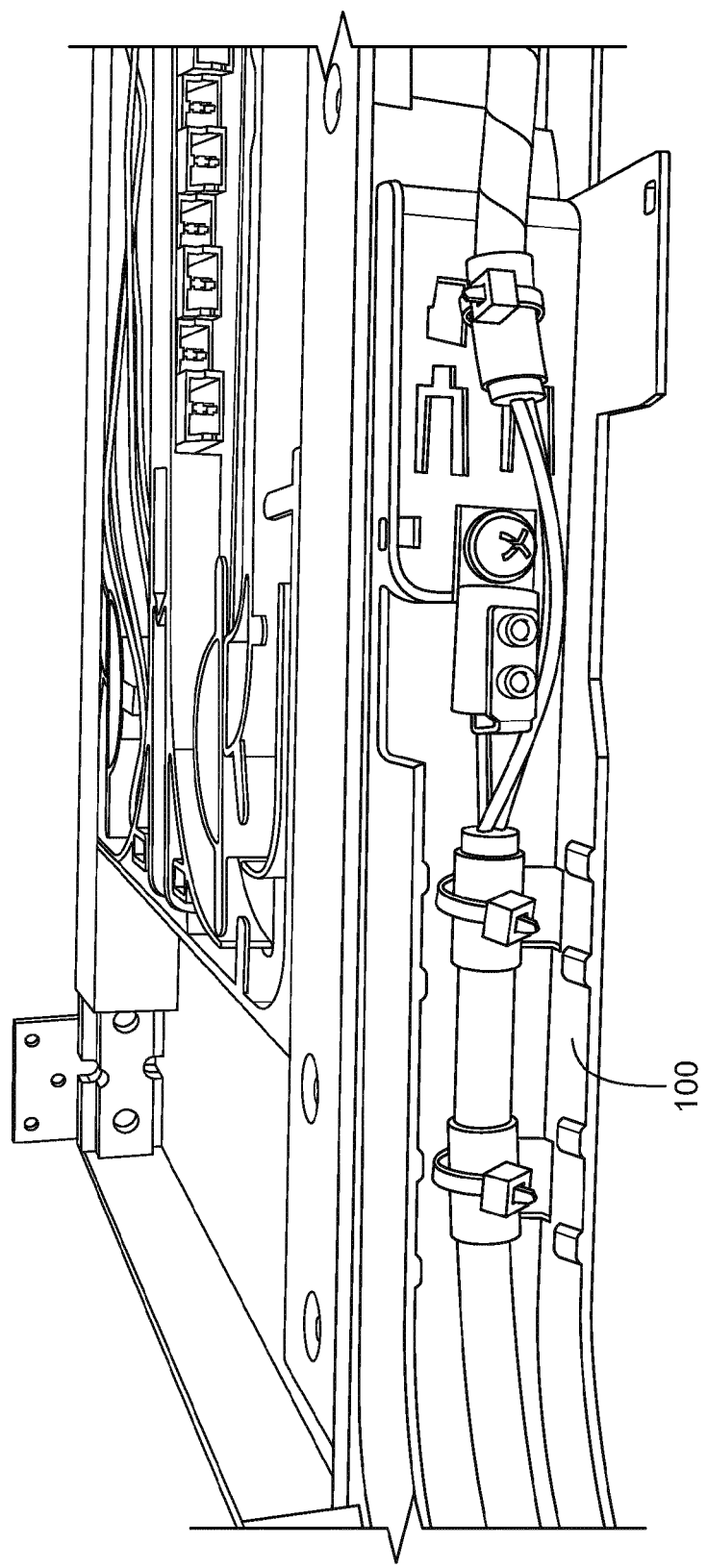
Figure 28:
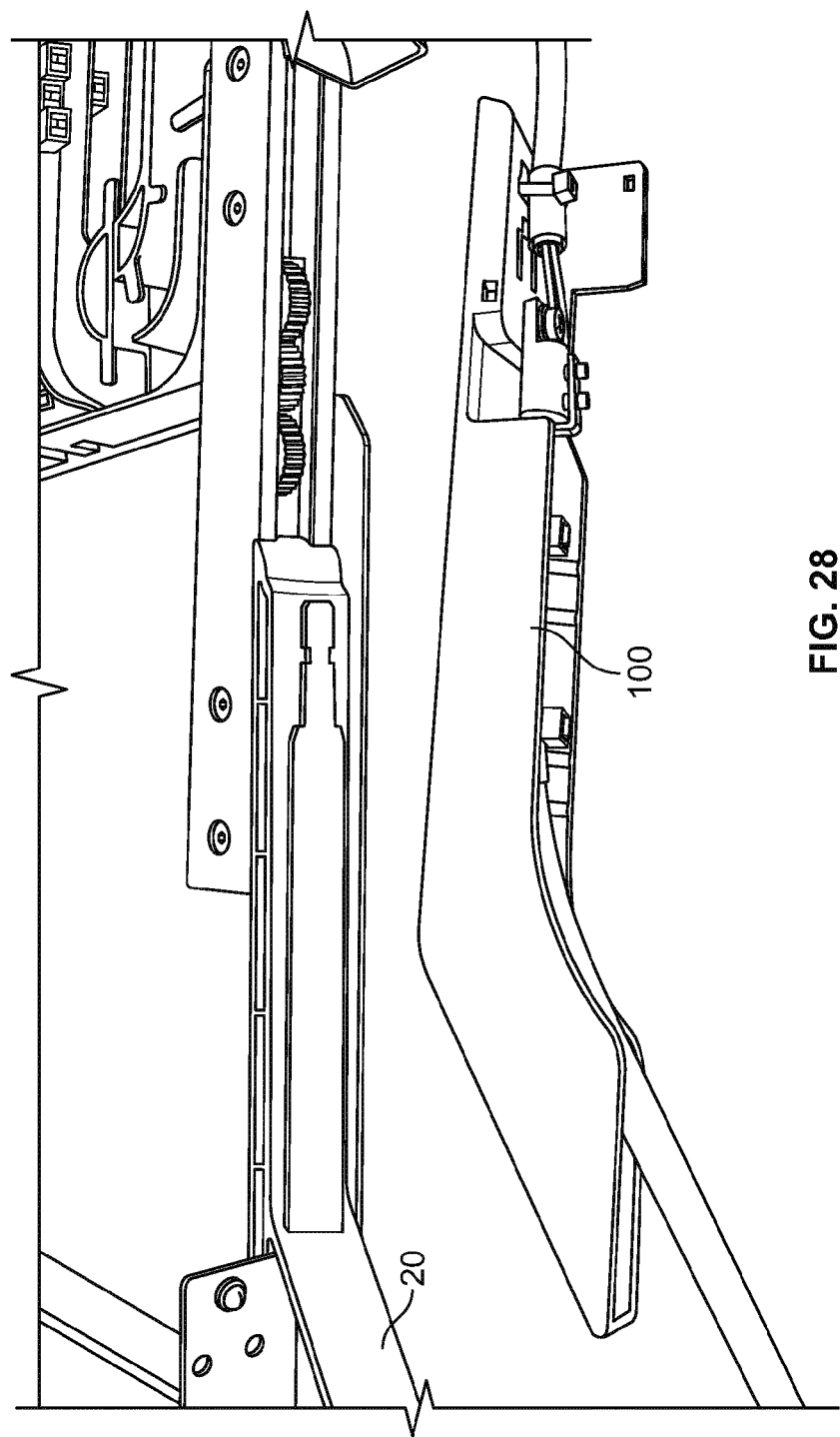
Figure 29:
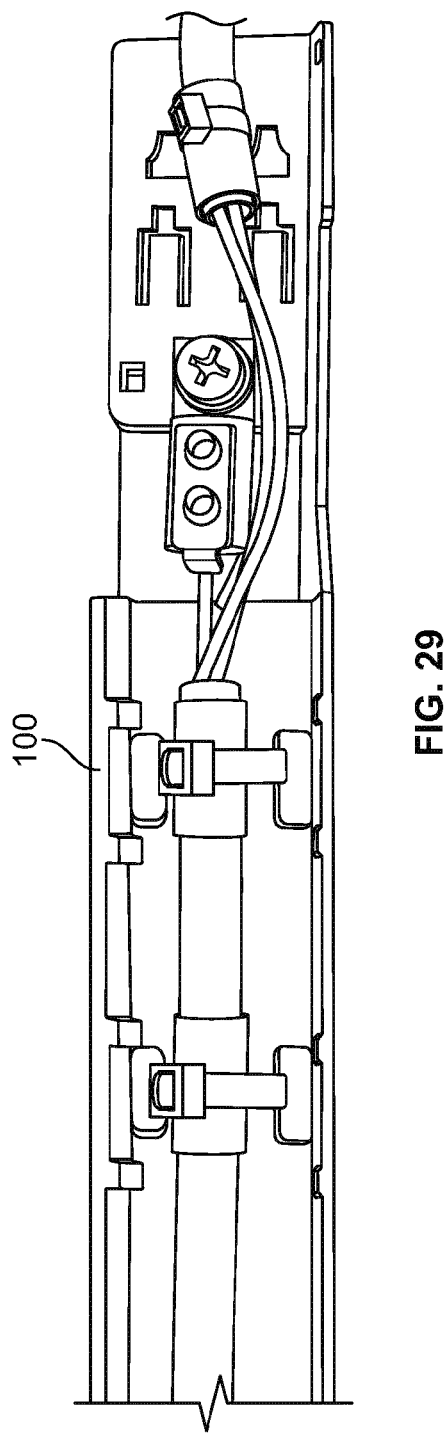
Figure 30:
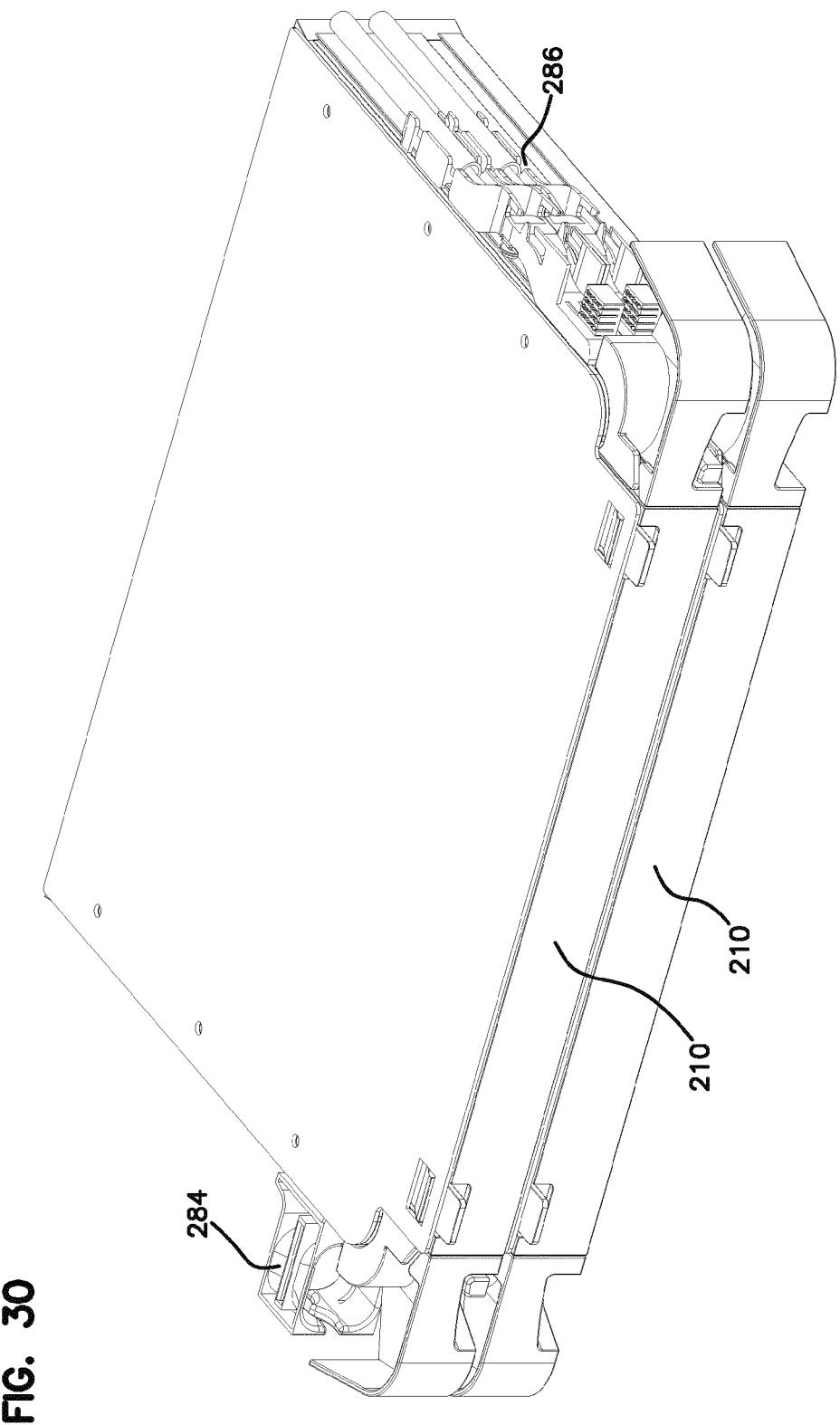
FIG. 30 shows an alternative embodiment of a block of two alternative elements.
Figure 31:
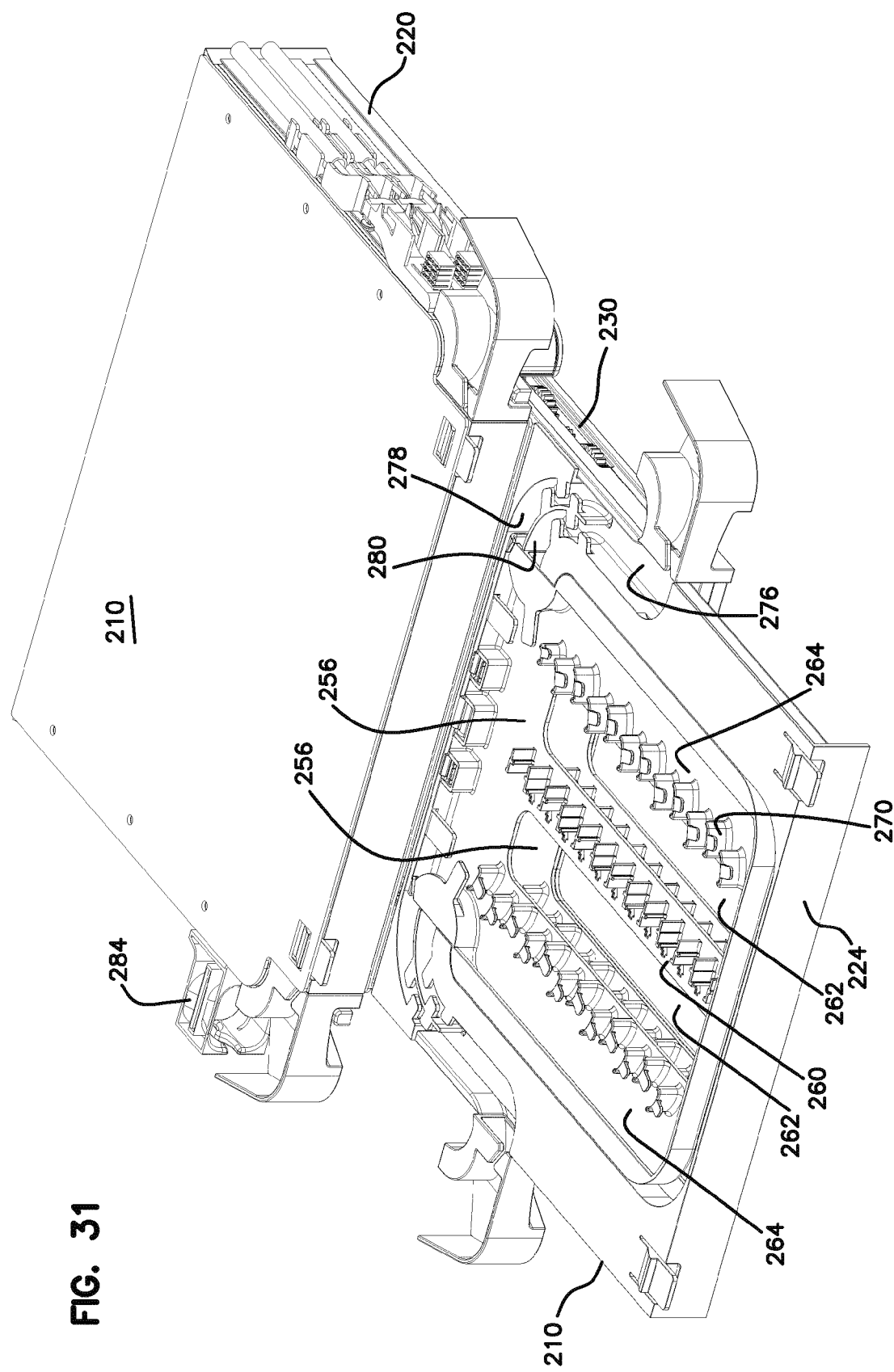
FIG. 31 shows a tray pulled forward from the chassis of one of the elements of the block of FIG. 30.
Figure 32:
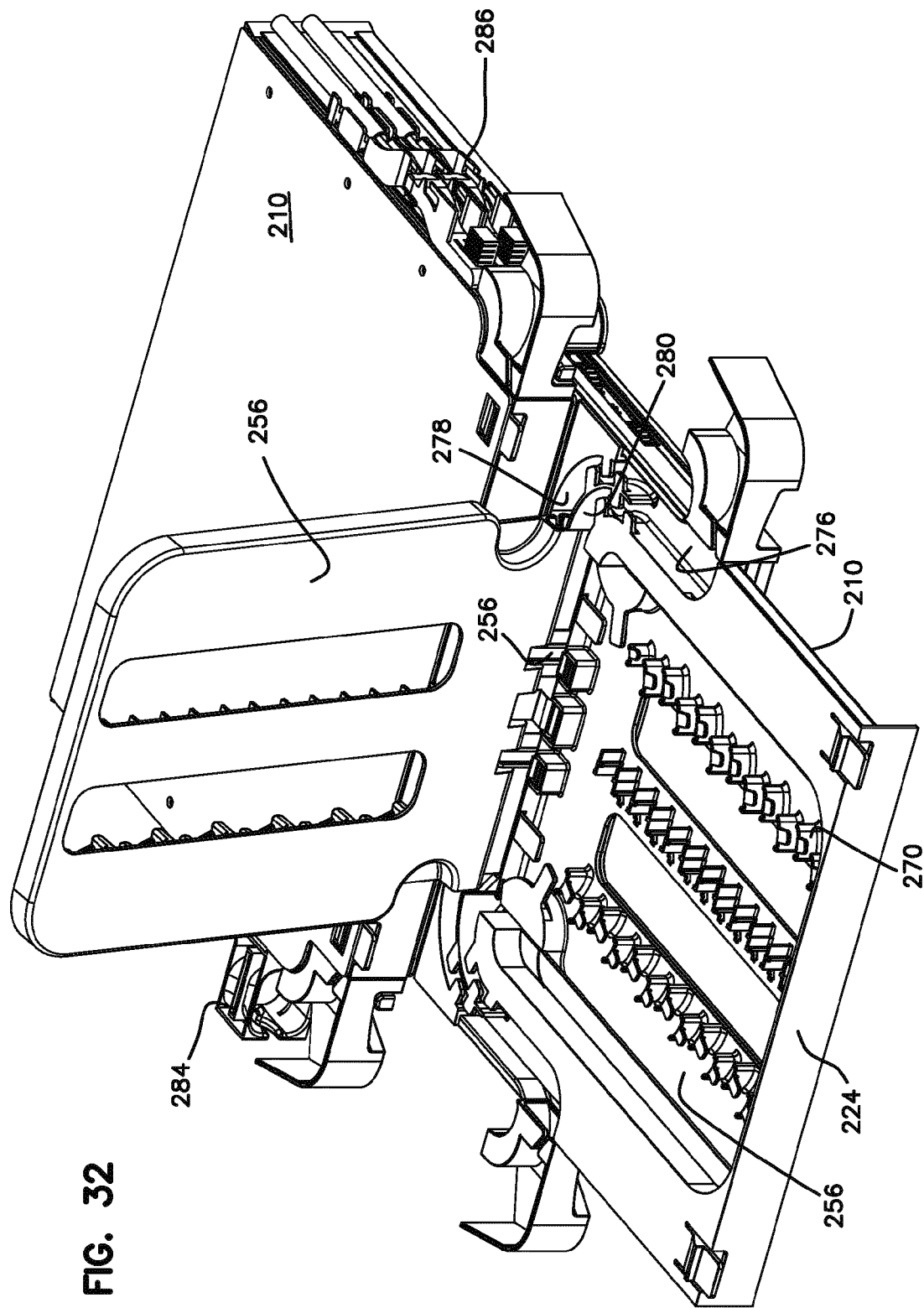
FIG. 32 shows the tray extended forward as in the view of FIG. 31, with one of the frame members pivoted upwardly.
Figure 33:
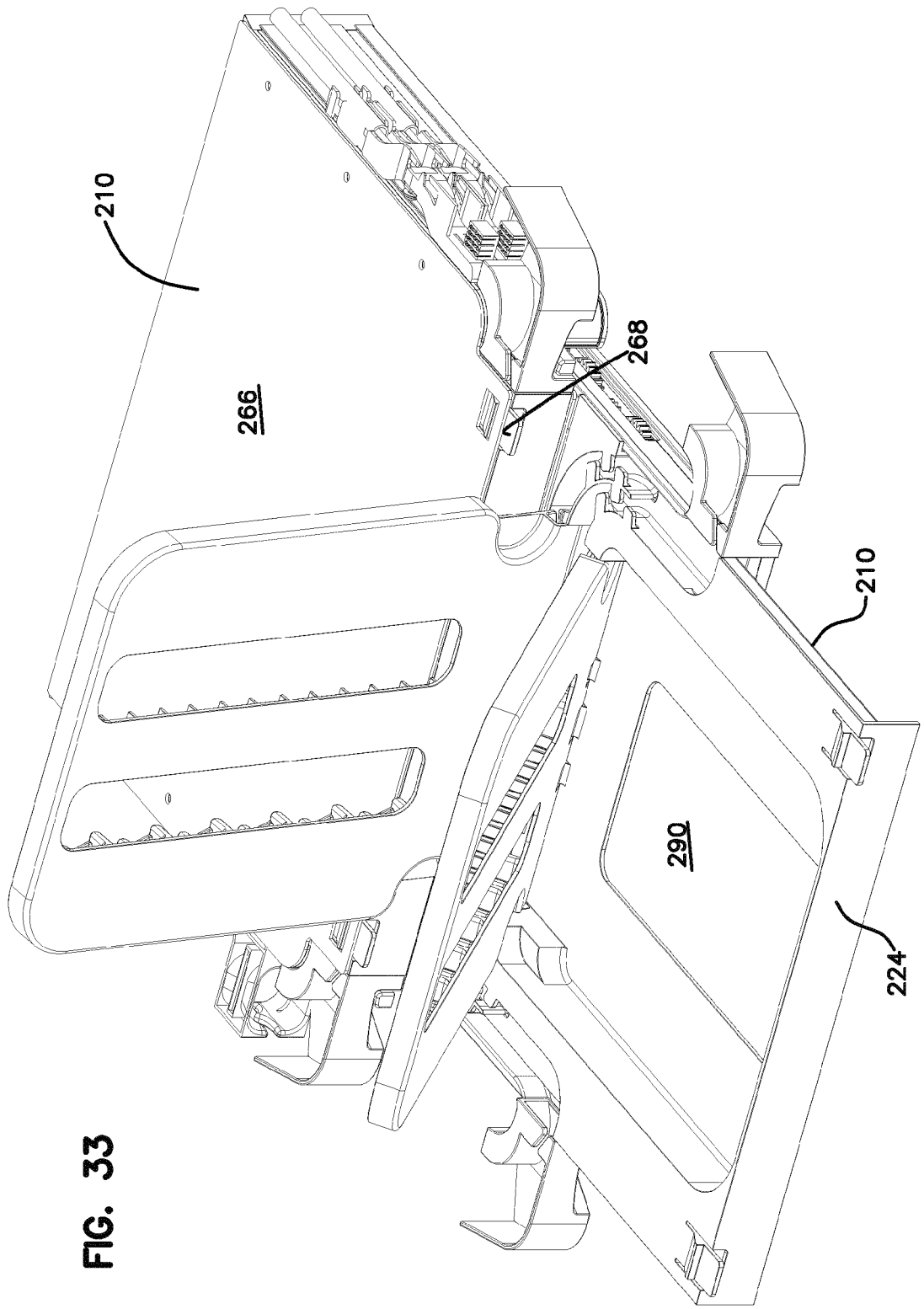
FIG. 33 is a view similar to the view of FIG. 32, with a second frame member pivoted upwardly.
Figure 34:
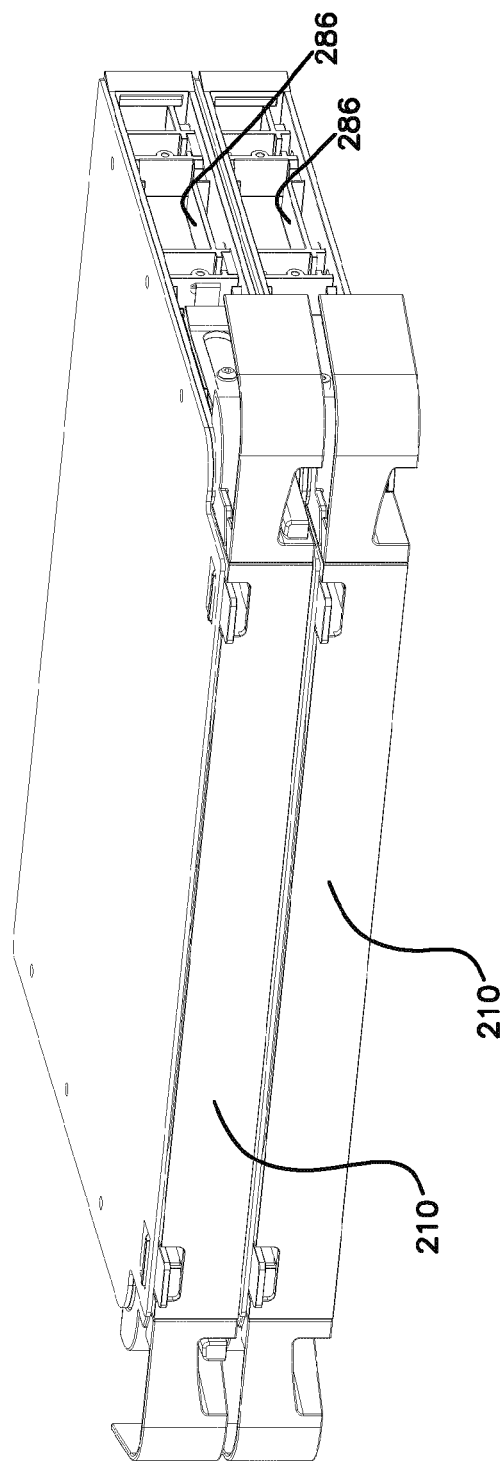
FIG. 34 shows a block including two elements.
Figure 35:
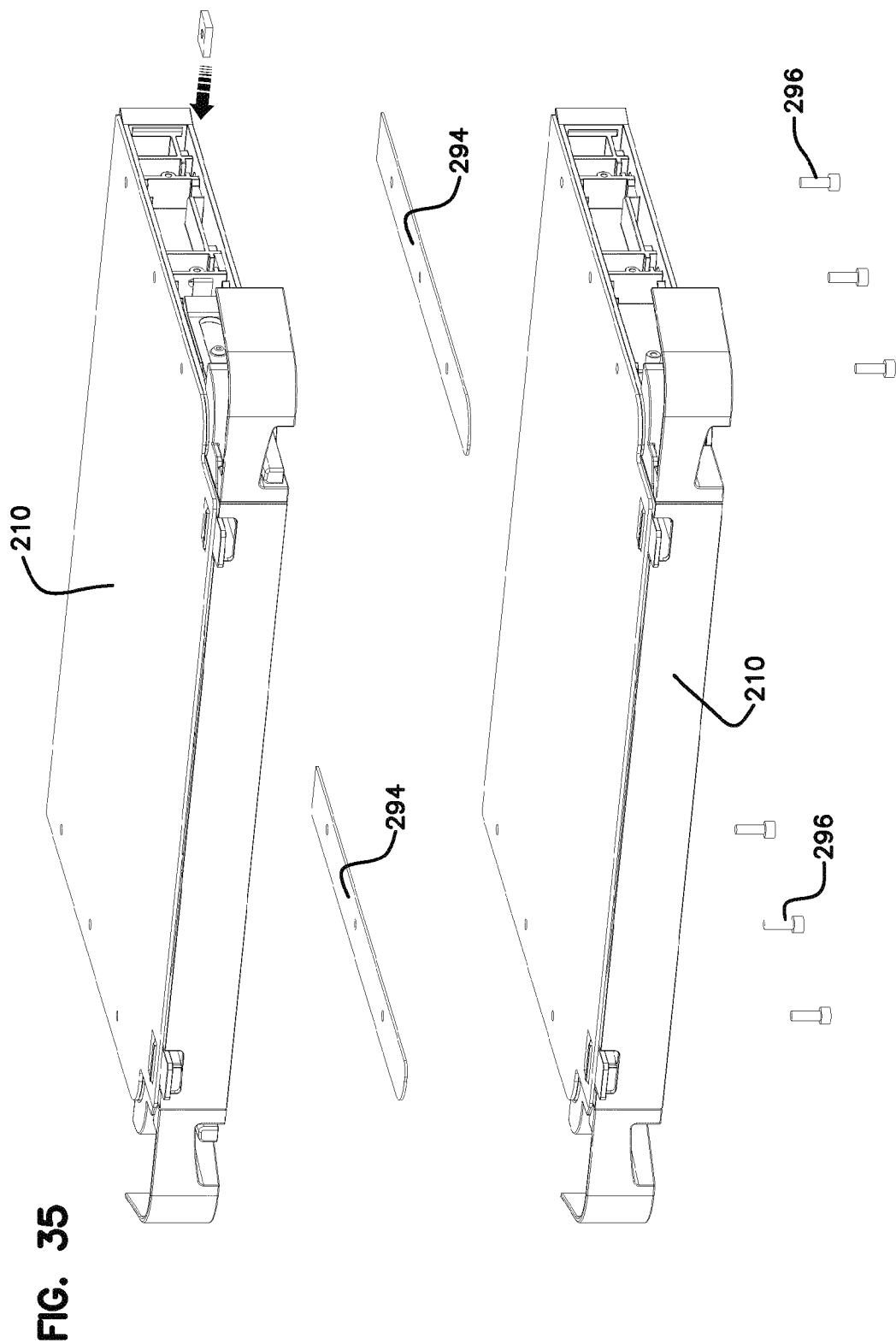
FIG. 35 shows an exploded view of the two elements of the block of FIG. 34.
Figure 36:
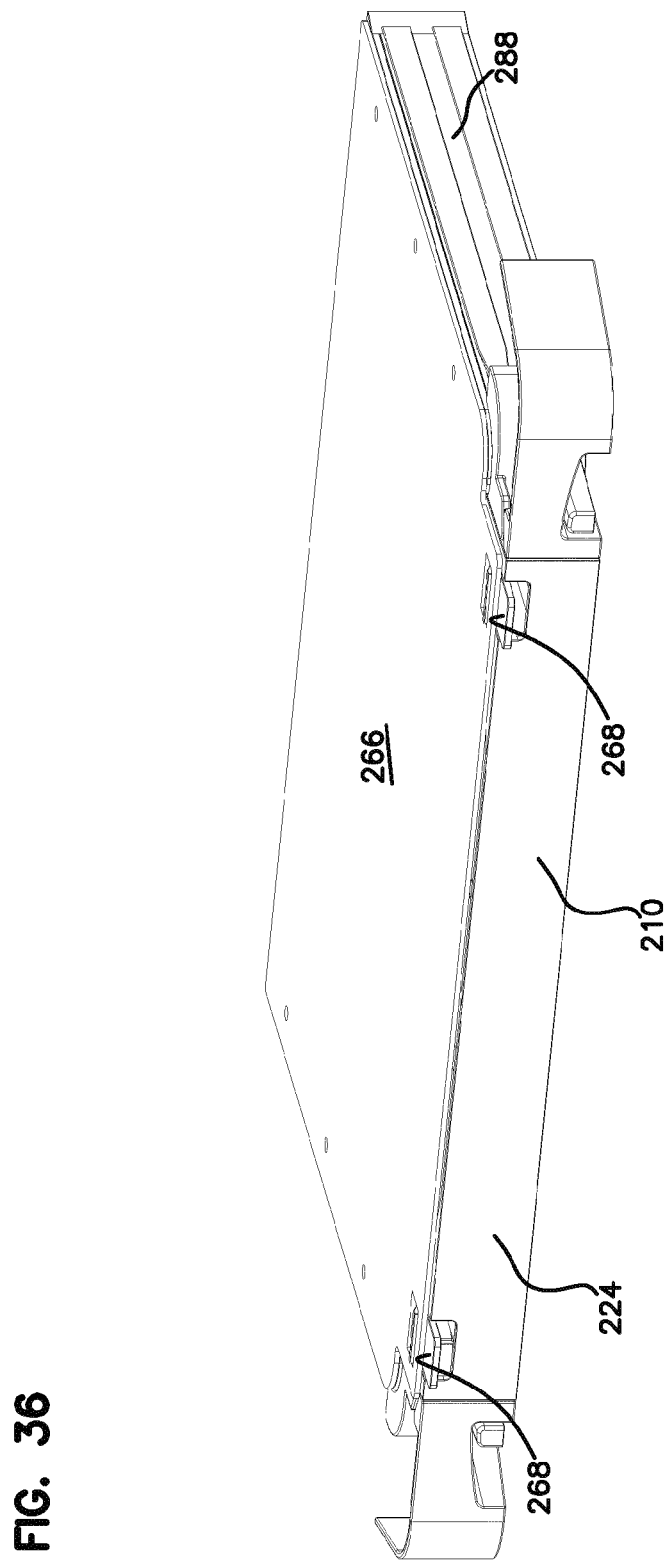
FIG. 36 shows a single element.
Figure 37:
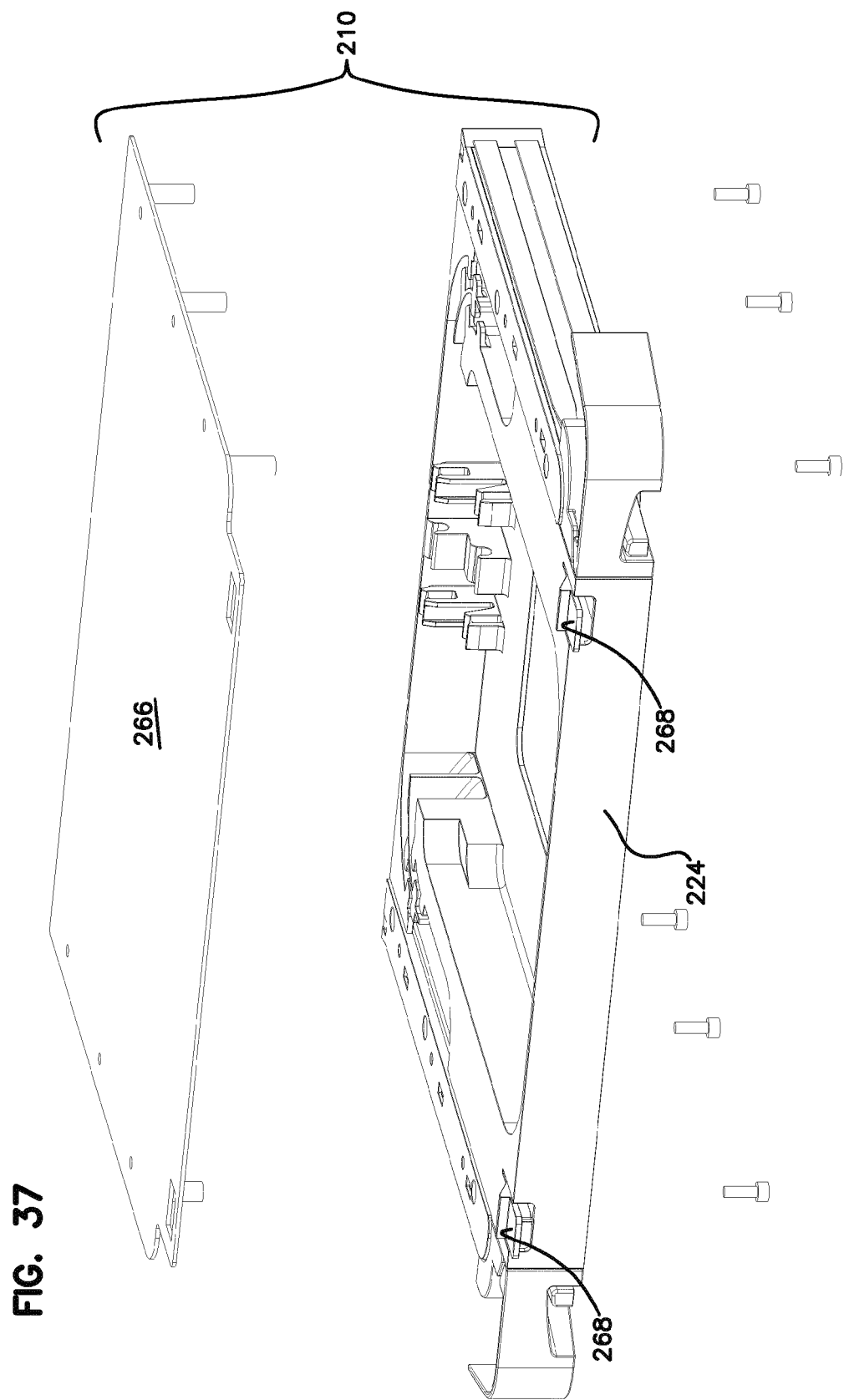
FIG. 37 shows an exploded view of the element of FIG. 36.
Figure 38:
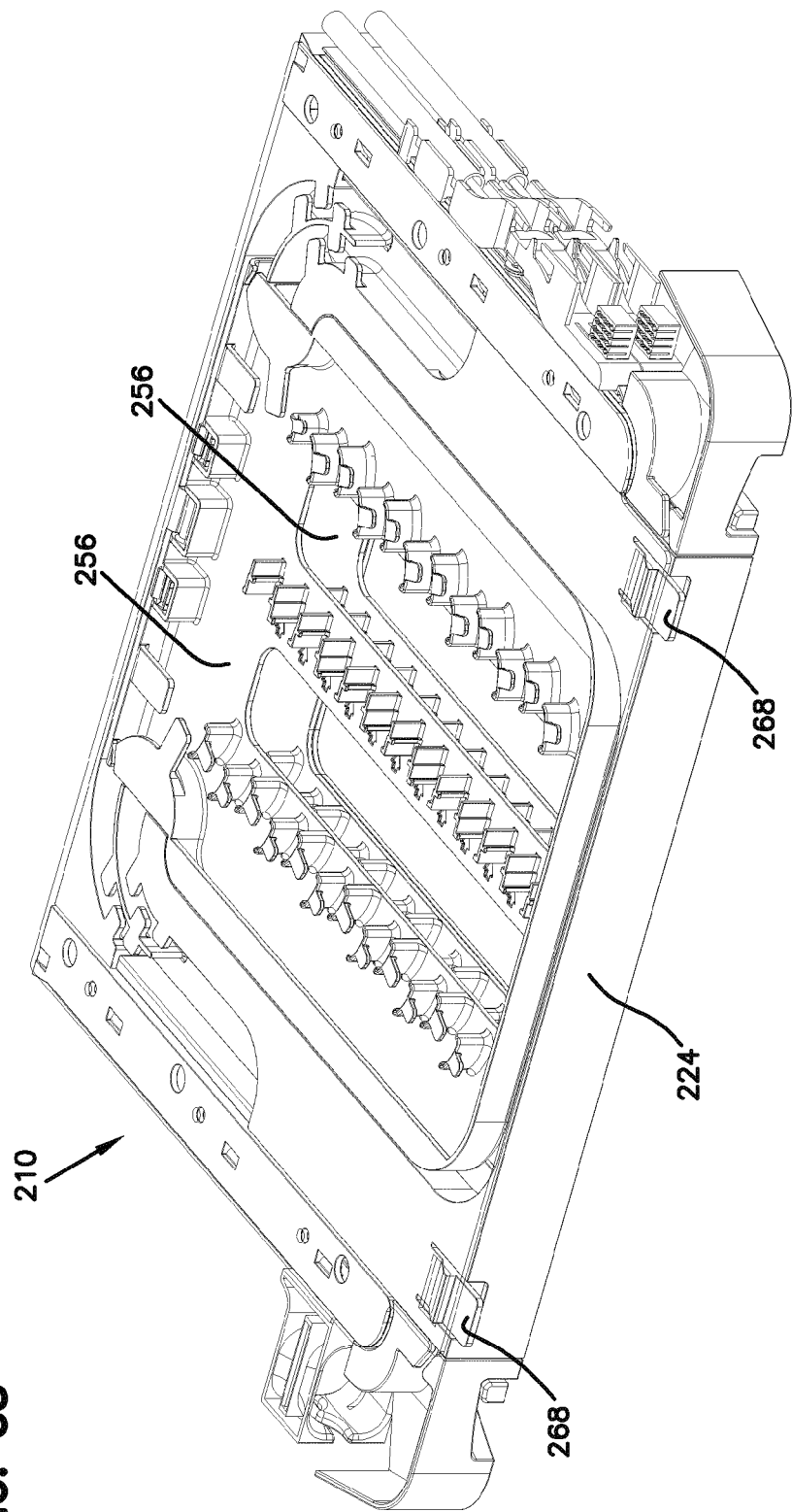
FIG. 38 shows the element of FIG. 37, without the top cover.
Figure 39:
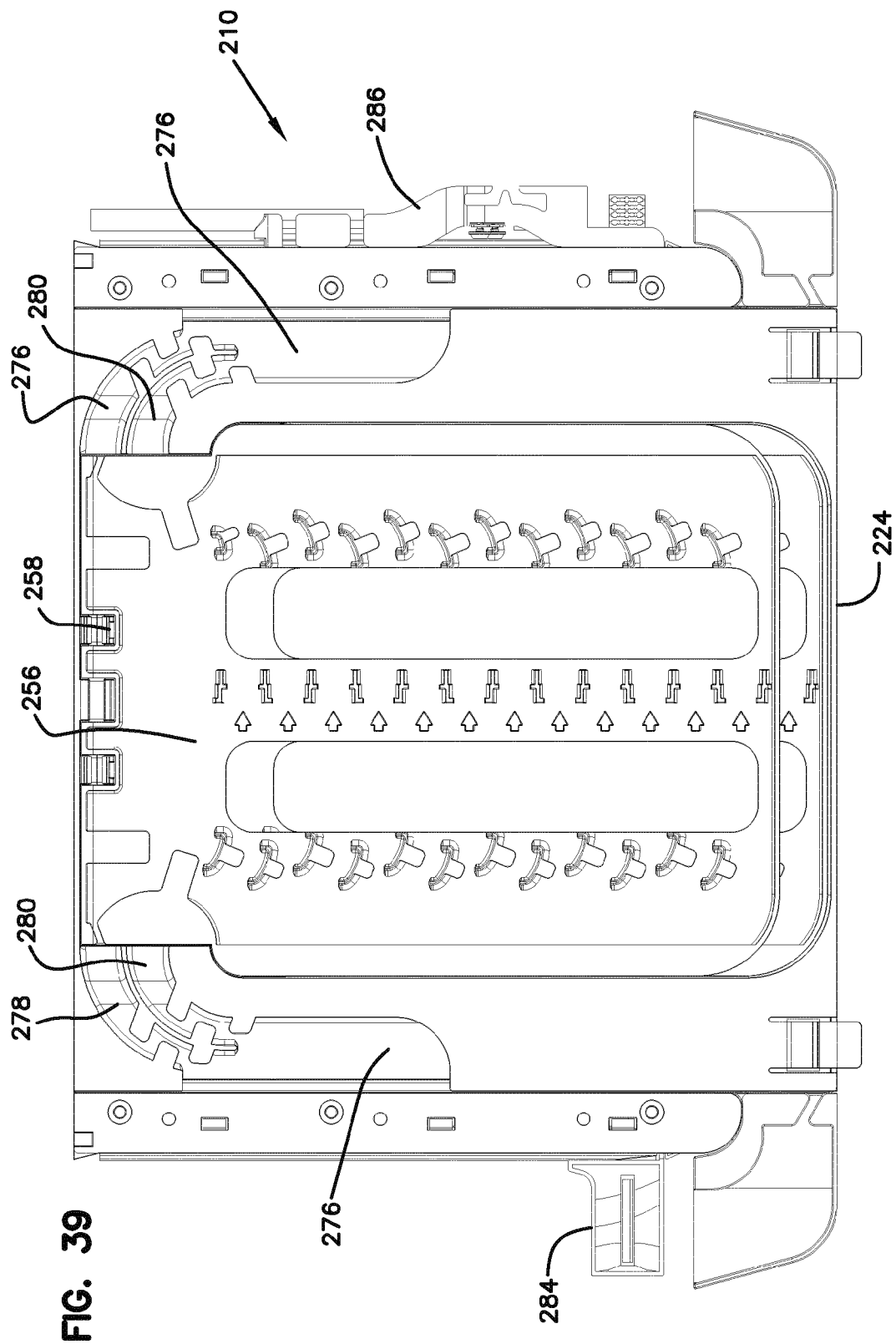
FIG. 39 is a top view of the element of FIG. 38.
Figure 40:
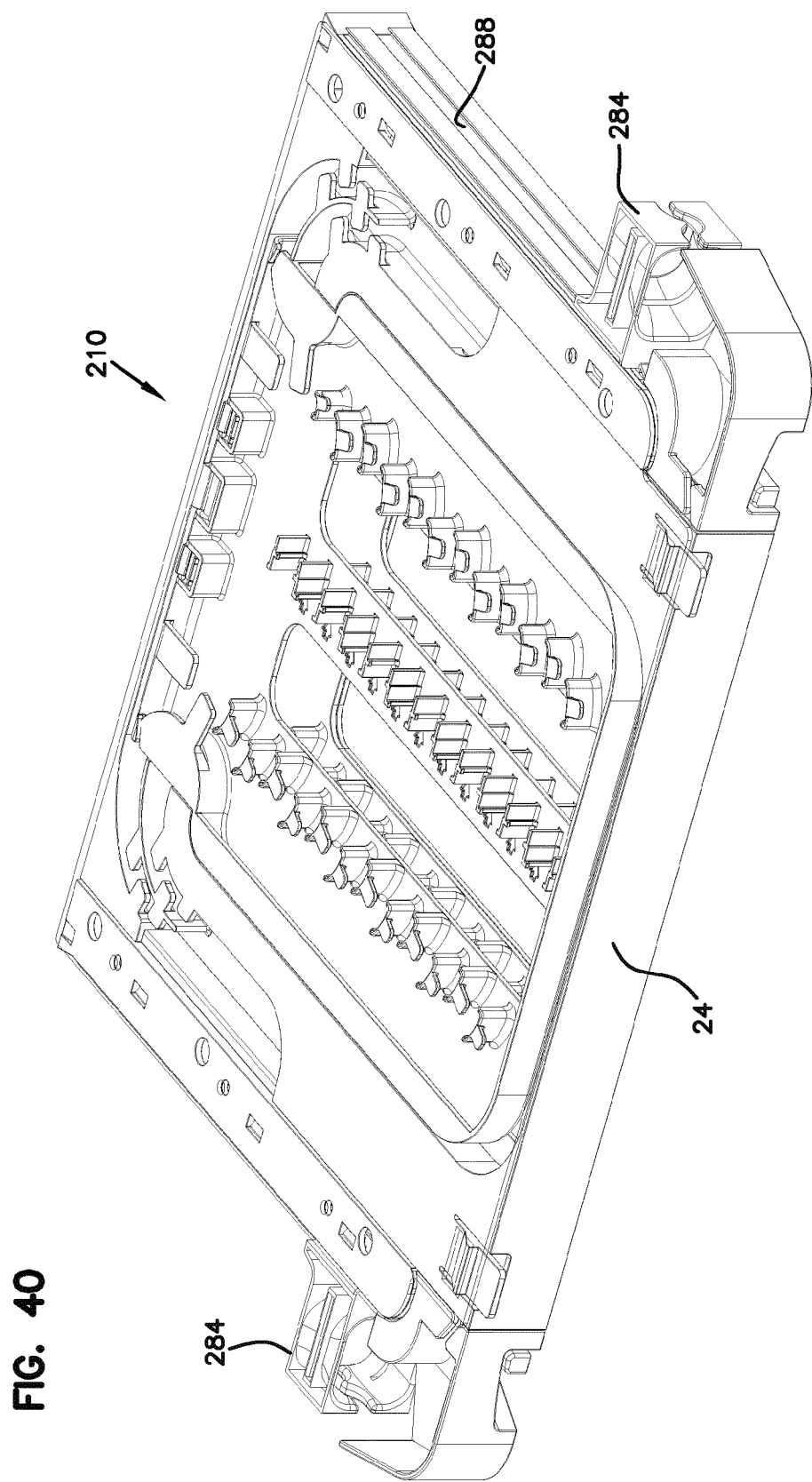
FIG. 40 is an alternative view of the element of FIG. 38, showing alternative devices at the cable entry points.
Figure 41:
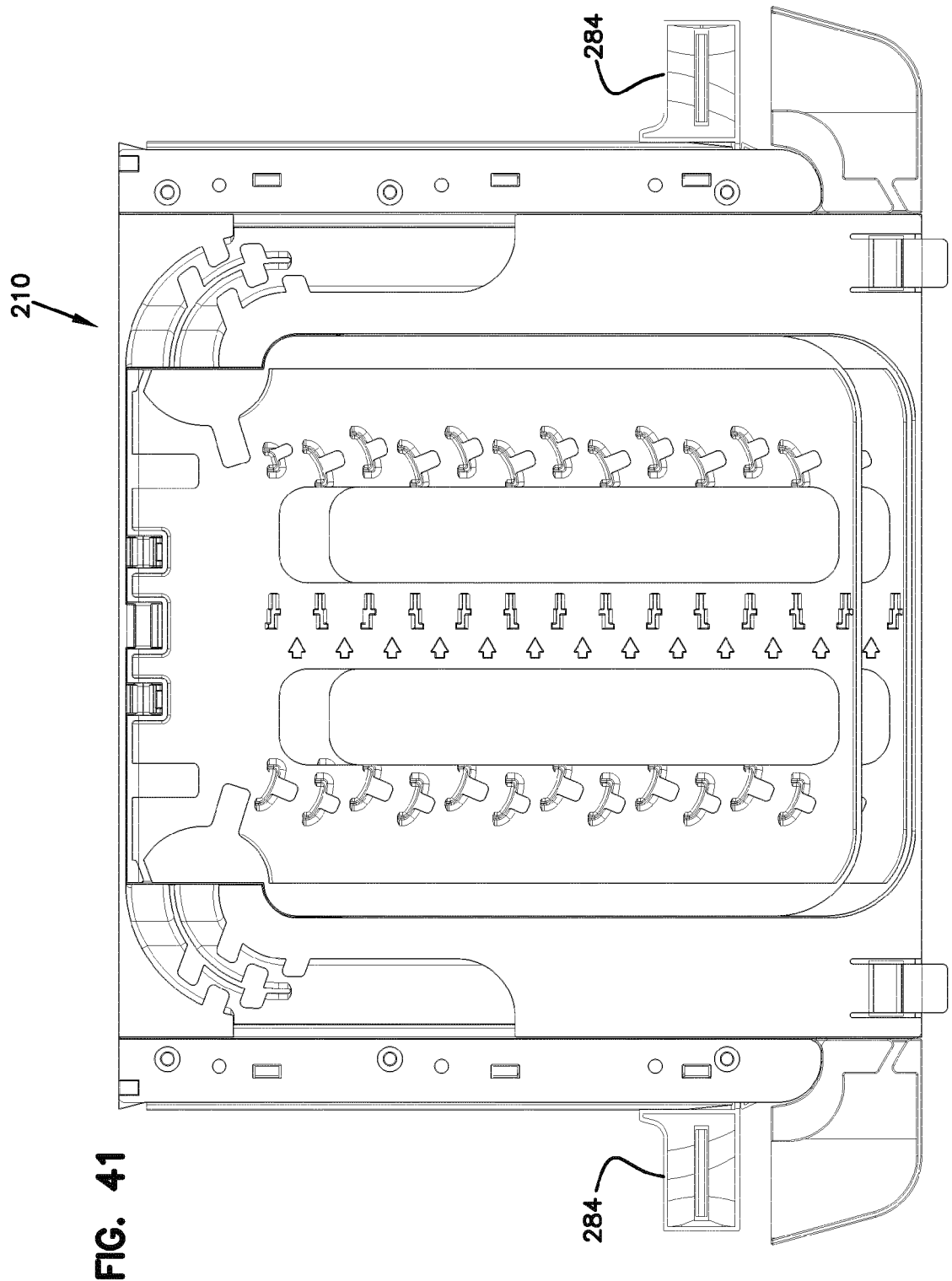
FIG. 41 is a top view of the element of FIG. 40.
Figure 42:
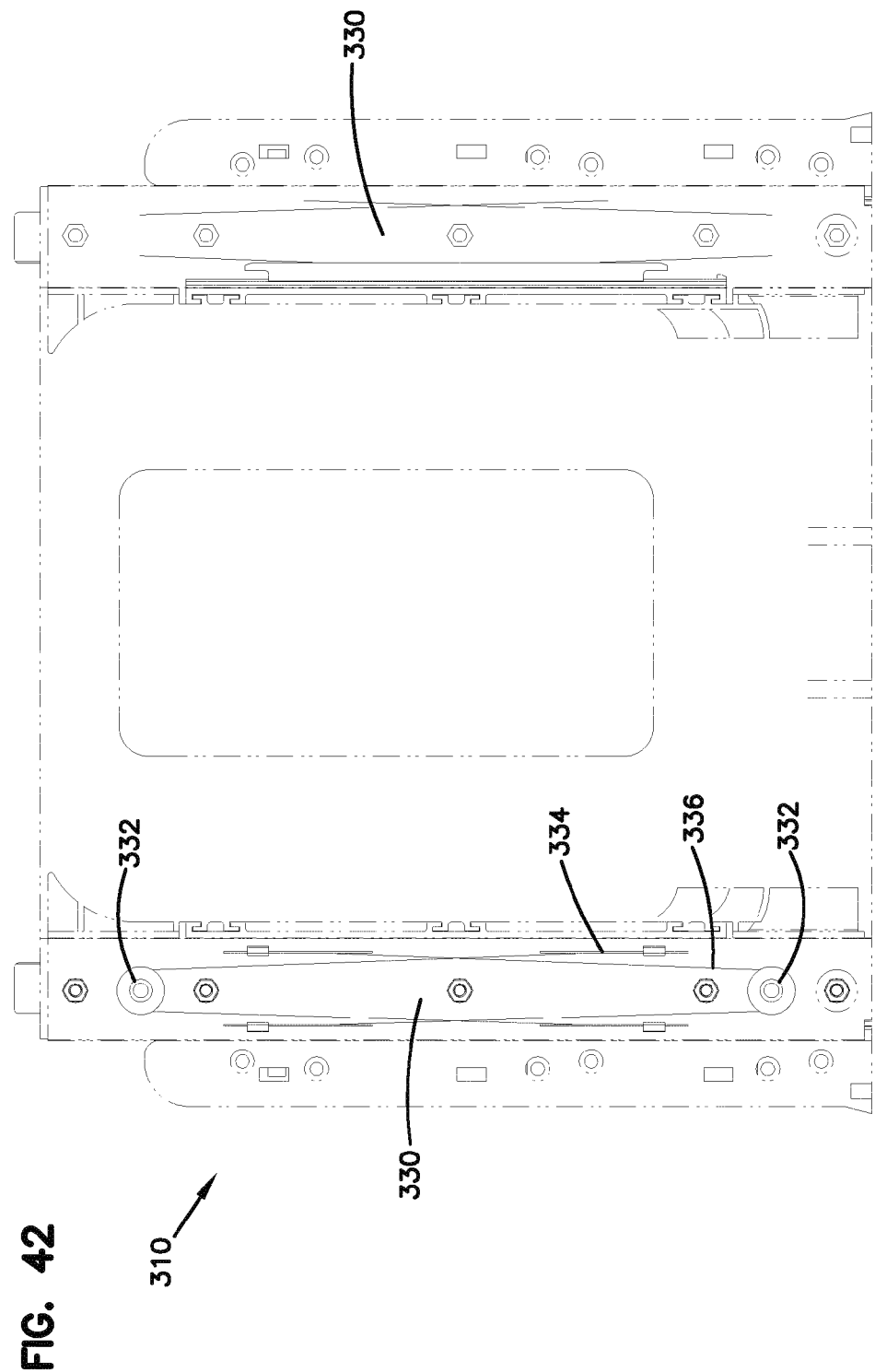
FIG. 42 shows an alternative embodiment of an element in a top view with an alternative synchronized movement feature.
Figure 43:
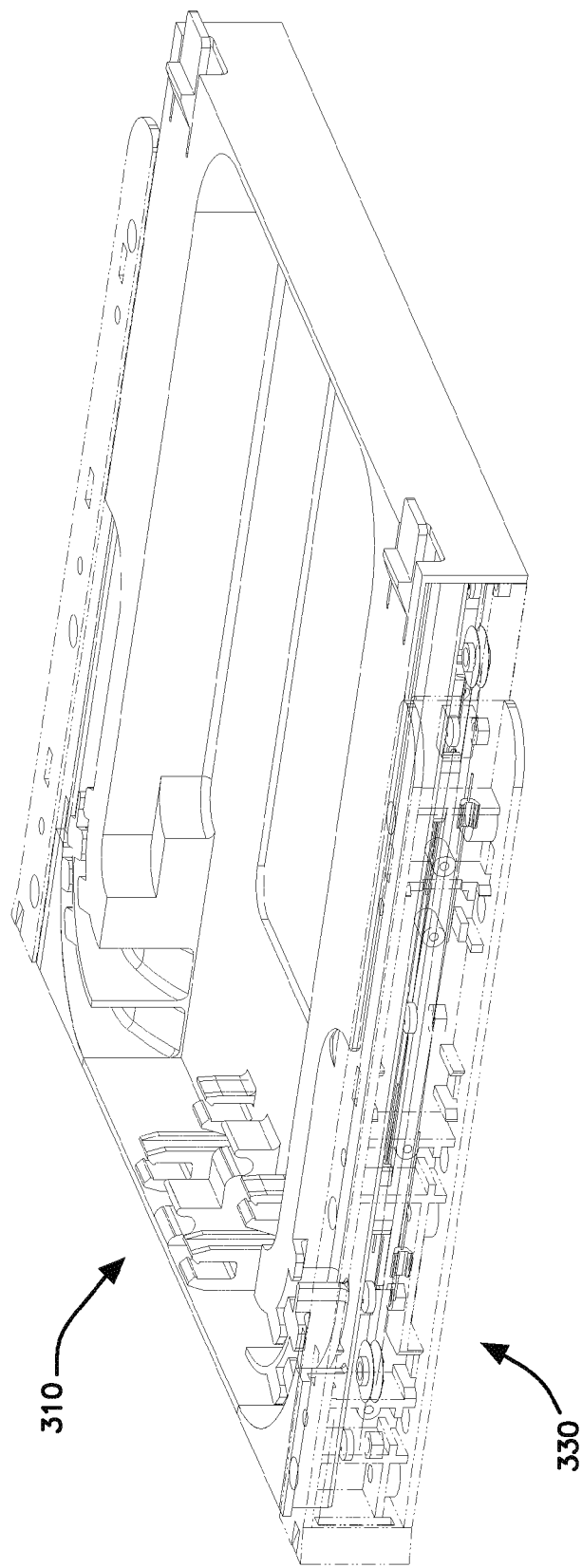
FIG. 43 is a perspective view of the element of FIG. 42.
Figure 44:
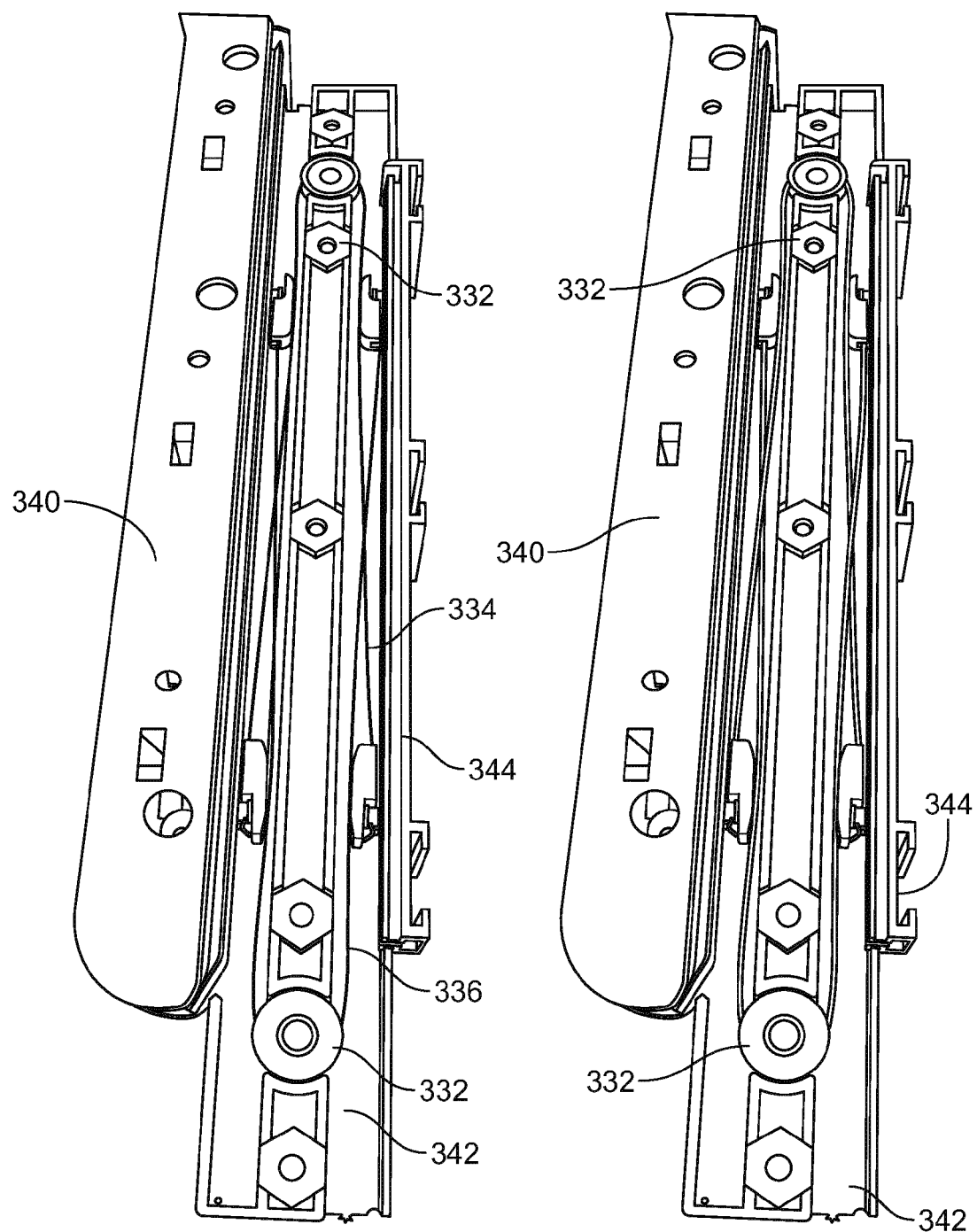
FIGS. 44 and 45 show movement of the various components of the synchronized movement feature of FIGS. 42 and 43.
Figure 45:
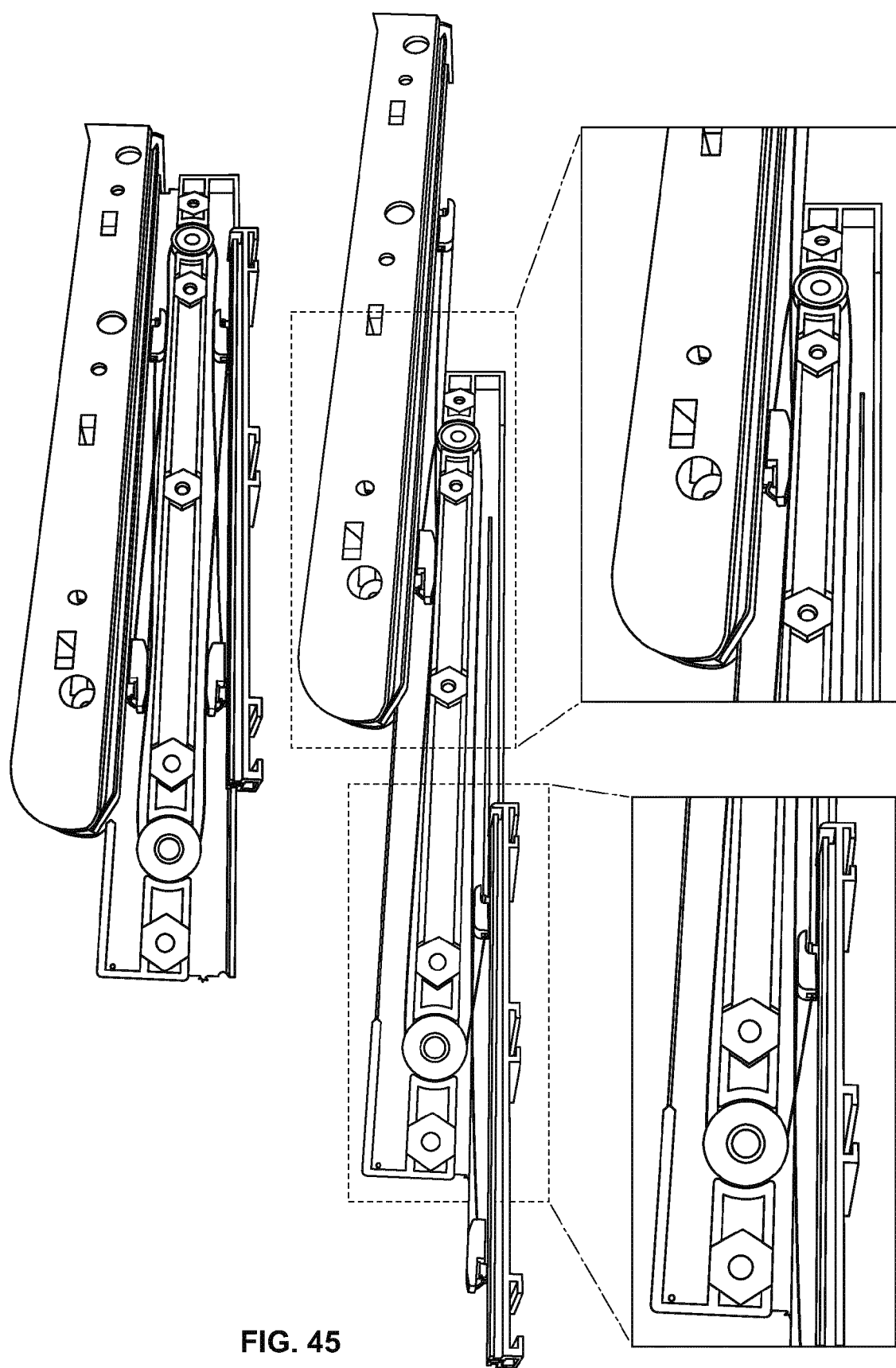

The wrap 102 shown in FIG. 16 is mounted horizontally to the tray 24 wherein both the front and rear ends of the wrap are mounted to horizontal mounts at similar horizontal planes. However, in other embodiments, where the wrap needs to be mounted to mounts that are at different planes or at planes that are perpendicular to each other, the wrap may be flexible enough to be able to be twisted around its longitudinal axis. As such, the front and the rear ends of the wrap may be mounted to mounts that are at perpendicular planes to each other and still not violate minimum bending requirements for the cables as the trays are moved back and forth with respect to the elements. Such wraps may be used on all of the embodiments of the elements discussed herein.

Referring now to FIGS. 17-29, various examples of cable routings are illustrated for element 10.

If desired, more than one feeder cable can supply cabling to more than one element 10.

Referring now to FIGS. 30-41, various additional embodiments of elements 210 are shown. Element 210 includes a chassis 220 in a movable tray 224 mounted with a slide mechanism 230 which promotes synchronized movement of radius limiters 238. Each tray 224 includes two hingedly mounted frame members 256. Each frame member 256 has a middle portion 260 separated by openings 262 from side portions 264. Middle portion 260 can hold fiber terminations. Side portions 264 include radius limiters 270. Cover 266 goes over tray 224. Latches 268 latch tray 224 to cover 266 in the closed position.

A pathway 276 extends from either side from tray 224 to supply cables to each of trays 224. An upper level 278 and a lower level 280 supply the respective frame members 256 with cabling. A general S-shaped pathway 276 is defined wherein the pathway 276 passes close to hinges 258.

A dovetail 288 is used to hold cable mounts 286 and radius limiters 284.

An opening 290 in tray 224 allows for connector access by the technician. Similarly, openings 262 on each frame member 256 allow for technician access to the individual connectors.

To form a block 292 of plural elements 210, bars 294 and fasteners 296 are used. Bars 294 give a small spacing between each element 210.

Referring now to FIGS. 42-45, an alternative slide mechanism 330 is shown in alternative element 310. Slide mechanism 330 allows for movement of the trays and related radius limiters and synchronized movement similar to slide mechanism 30, 230. Alternative slide mechanism 330 includes two wheels 332 and two wires 334, 336. The wheels 332 are located on second part 342. The wires are looped in opposite directions and are connected to the first part 340 and the third part 344.

Figure 46:
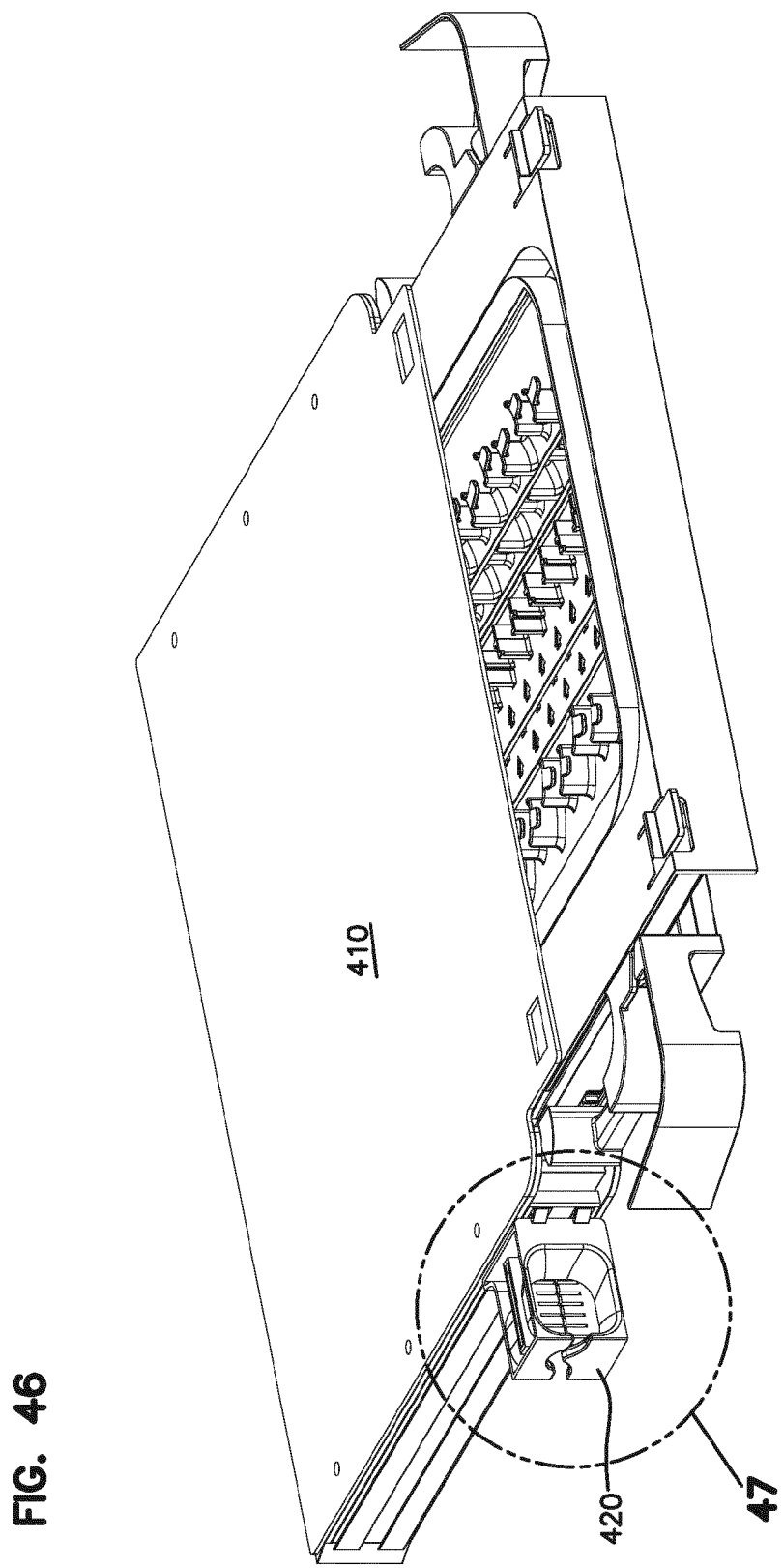
FIGS. 46 and 47 show an element with an alternative radius limiter at the cable entry and exit locations.
Figure 47:
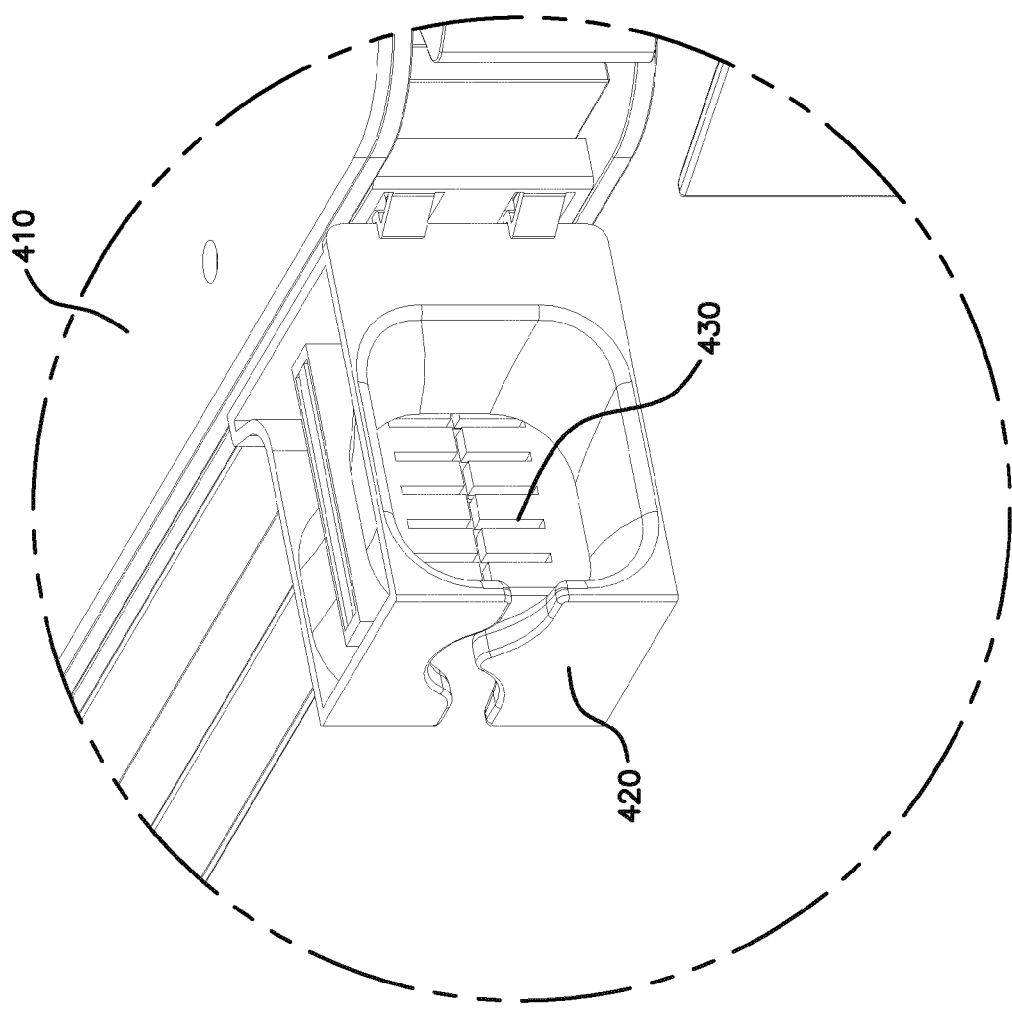

Referring now to FIGS. 46 and 47, an alternative radius limiter 420 is shown on alternative element 410. Radius limiter 420 includes friction members 430 which limit the amount of sliding movement of cables passing through radius limiter 420, to assist with cable management. Friction members 430 include flexible fingers which press lightly on the cables in radius limiter 420 to reduce or eliminate sliding movement of the cables in the radius limiter 420.

Referring now to FIGS. 48-52, a universal mounting mechanism 500 for releasably mounting a telecommunications chassis to a telecommunications fixture, such as an optical fiber distribution rack, is illustrated. In FIGS. 48-52, the universal mounting mechanism 500 is shown as having been adapted for and being used on an optical fiber distribution element 510 having features similar to those elements 210, 410 shown in FIGS. 30-47 of the present disclosure. With the universal mounting mechanism 500 of FIGS. 48-52, telecommunications chassis or elements such as elements 210, 410, and 510 can be mounted as desired to telecommunications fixtures or equipment such as racks, frames, or cabinets.

It should be noted that although the universal mounting mechanism 500 of the present disclosure has been shown as being used on a piece of telecommunications equipment such as the optical fiber distribution element 510 (which has similar features to those elements 210 and 410 of FIGS. 30-47), the optical fiber distribution element 510 is simply one example of telecommunications equipment or chassis on which the mounting mechanism 500 may be used for mounting to equipment such as telecommunications racks, frames, or cabinets. For use with the universal mounting mechanism 500 of FIGS. 48-52, the element 510 has been adapted to receive certain portions of the mounting mechanism 500. However, it should be understood that the mounting mechanism 500 of the present disclosure includes features having inventive aspects in isolation and can be used on other types of optical fiber distribution elements as long as the elements or chassis thereof are adapted to receive portions of the mounting mechanism 500.

Still referring to FIGS. 48-52, the universal mounting mechanism 500 will now be described in further detail.

Figure 48:
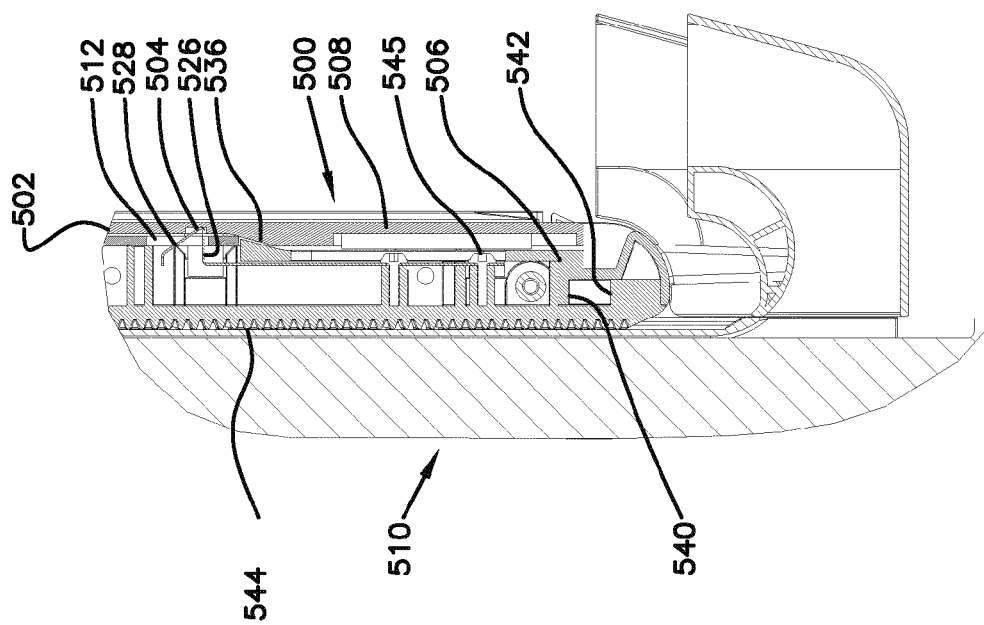
FIG. 48 shows a cross-sectional view of a portion of a universal mounting mechanism configured for mounting an optical fiber distribution element similar to those shown in FIGS. 30-47 of the present disclosure to a telecommunications rack, the mounting mechanism shown in a locked position.
Figure 49:
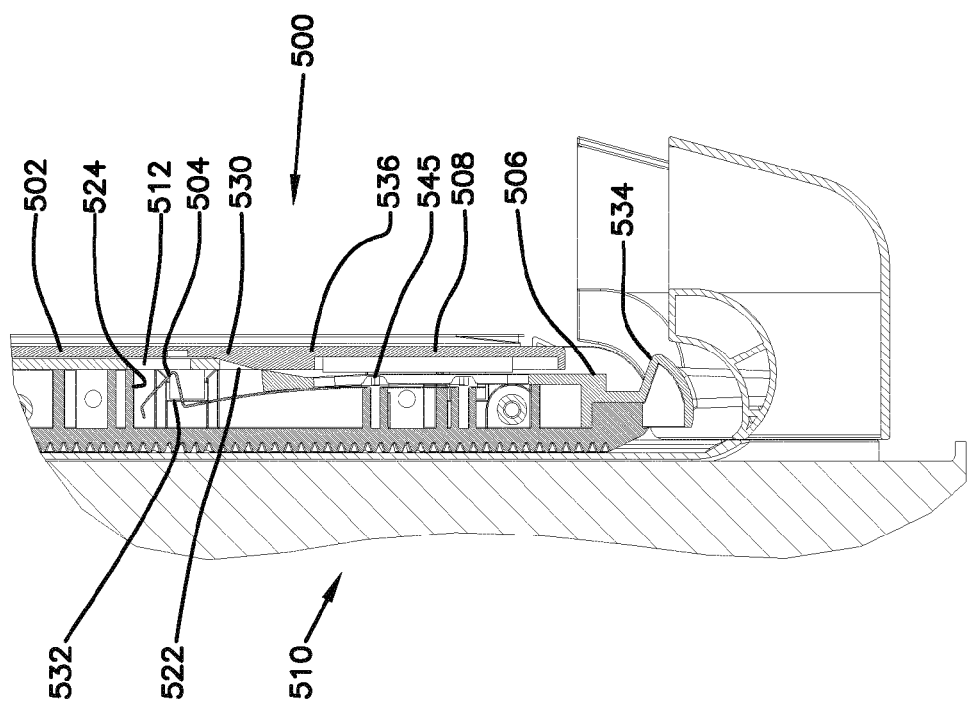
FIG. 49 illustrates the universal mounting mechanism of FIG. 48 in an unlocked position.
Figure 50:
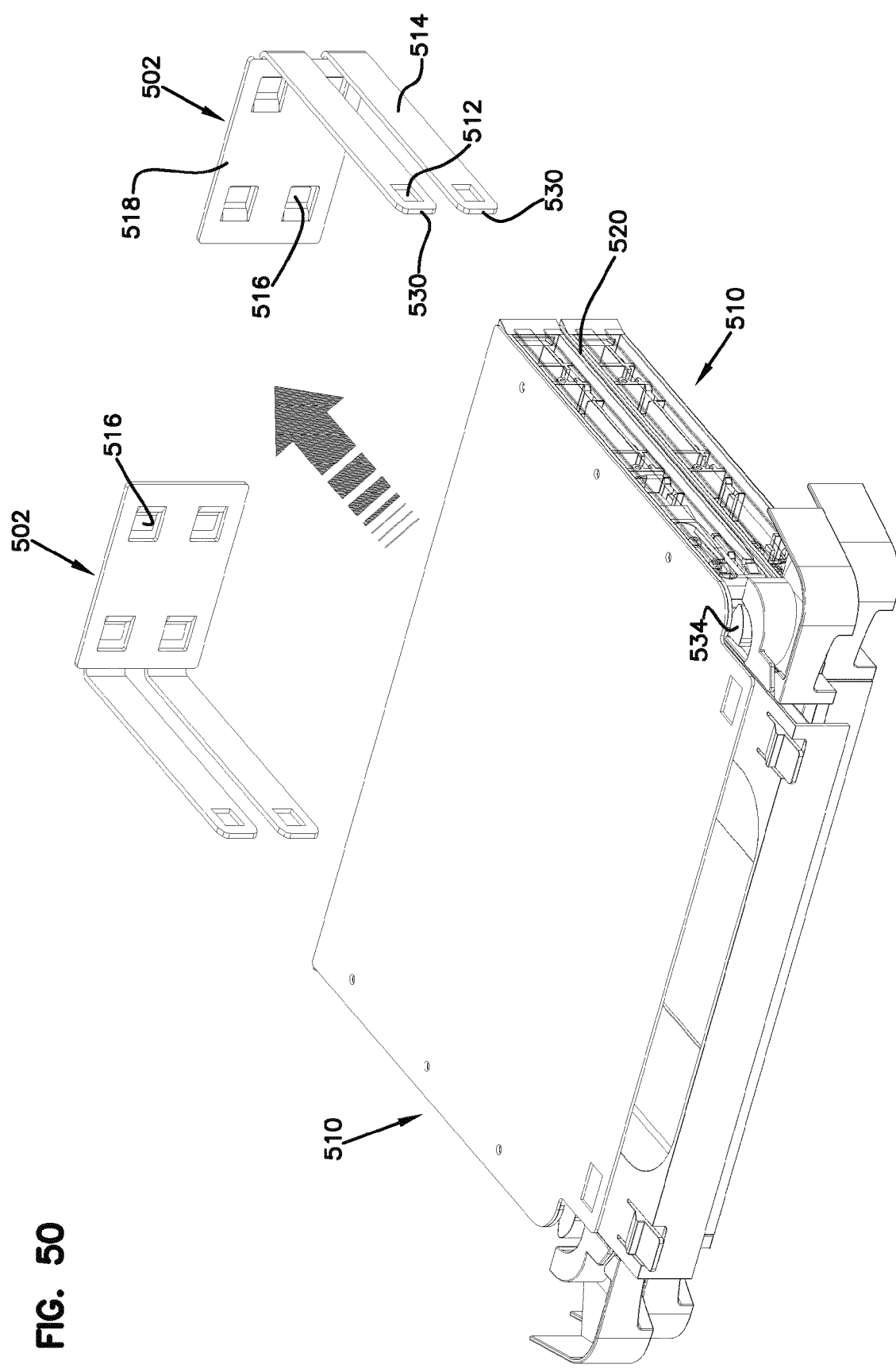
FIG. 50 illustrates a partially exploded perspective view of a portion of the universal mounting mechanism of FIGS. 48-49 being used on an optical fiber distribution element similar to the elements shown in FIGS. 30-47.
Figure 51:
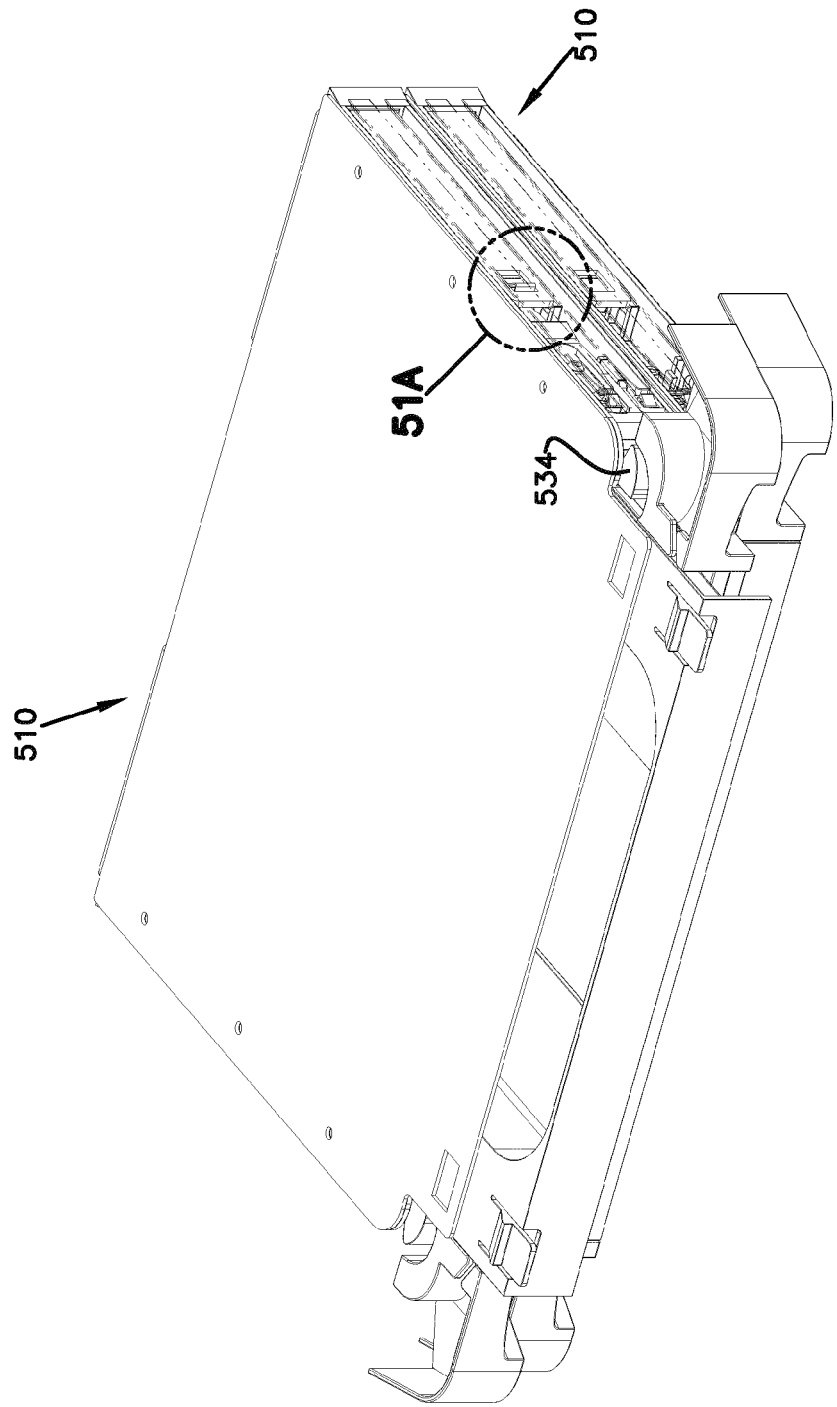
FIG. 51 illustrates the universal mounting mechanism of FIG. 50 with the universal mounting brackets of the mechanism mounted to the element of FIG. 50.
Figure 51A:
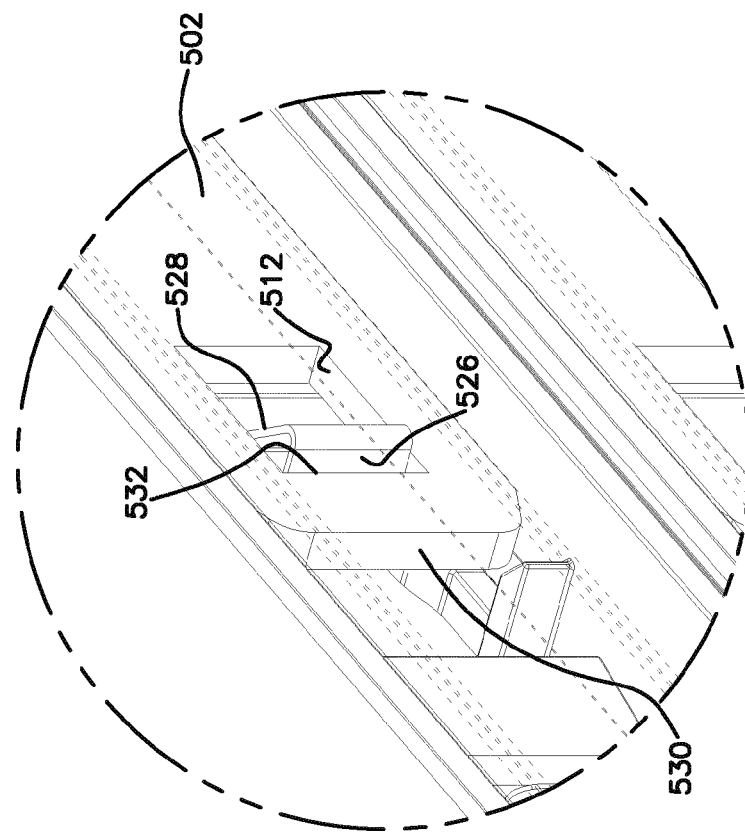
FIG. 51A is a close-up view of a portion of the universal mounting mechanism of FIG. 51, illustrating the locking spring in a locked position with respect to the universal mounting bracket.

FIG. 48 shows a cross-sectional view of a portion of the universal mounting mechanism 500, wherein the mounting mechanism 500 is in a locked state or position. FIG. 49 illustrates the universal mounting mechanism 500 in an unlocked position. FIG. 50 illustrates a partially exploded perspective view of a portion of the universal mounting mechanism 500 being used with the optical fiber distribution element 510, which is similar to the elements 210, 410 shown in FIGS. 30-47, as noted above. FIG. 51 illustrates the universal mounting mechanism 500 with the universal mounting brackets 502 of the mechanism 500 mounted to the element 510. FIG. 51A is a close-up view of a portion of the universal mounting mechanism 500, illustrating a locking spring 504 of the mechanism 500 in a locked position with respect to the universal mounting bracket 502 of the mechanism 500. FIG. 52 is a cross-sectional view of a portion of the universal mounting mechanism 500 showing the positional relationship between the universal mounting bracket 502 and a release handle 506 of the mounting mechanism 500 when the mechanism 500 is in a locked state.

The universal mounting mechanism 500 generally includes the right and left universal mounting brackets 502, release handles 506 for each of the mounting brackets 502, a cover 508 for each of the mounting brackets 502, and the locking spring 504 for each of the mounting brackets 502.

In the depicted embodiment, each of the universal mounting brackets 502 is designed for mounting two stacked elements 510. Thus, each of the right and left mounting brackets 502 includes two latch openings 512 adjacent the front 514 of the mounting bracket 502 (one for each element 510) and upper and lower mounting tabs 516 at the rear 518 of the bracket 502.

In the given embodiment, the mounting tabs 516 at the rear 518 of the mounting brackets 502 are designed to slidably mount the brackets 502 to fixtures such as telecommunications racks along a sideway or lateral direction. As such, in mounting elements 510 to a rack, the universal mounting brackets 502 are initially slid into openings provided on the rack using the mounting tabs 516. Once the brackets 502 are secured on a rack, the elements 510 can be slid onto the brackets 502 in a sliding fashion, as will be described in further detail. The latch openings 512 of the brackets 502 are, then, used to lock the elements 510 in place.

In using the universal mounting mechanism 500 of the present disclosure, each element 510, on each of the right and left sides thereof, defines a bracket channel 520. The channel 520 is configured to slidably receive the front portions 514 of the mounting brackets 502. The cover 508 closes the bracket channel 520 to the exterior of each element 510. The cover 508 defines a deflection ramp 522 at the inner face thereof, the purpose of which will be discussed in further detail below. The locking spring 504 is mounted to each element 510 such that an end portion 524 of the locking spring 504 can flex in and out of the latch opening 512 of the universal mounting bracket 502. As shown in the cross-sectional views of FIGS. 48 and 49 and in FIGS. 51 and 51A, the end portion 524 of the locking spring 504 defines a perpendicular locking face 526 and an angular insertion face 528. When an element 510 is initially being slidably mounted on the mounting bracket 502, the angled insertion face 528 rides over the front end 530 of the front portion 514 of the mounting bracket 502 until the end portion 524 of the locking spring 504 flexibly snaps into the latch opening 512.

The element 510, at this point, is prevented from being pulled out forwardly. The locking spring 504 abuts an inner front face 532 defined by the latch opening 512 of the mounting bracket 502 to prevent removal of the chassis from a rack.

The release handle 506 is positioned between the locking spring 504 and the cover 508. The release handle 506 has a grip portion 534 for pulling the release handle 506 forwardly to release the chassis for removal from the mounting brackets 502. The release handle 506 also defines a deflection tab 536 at the rear end 538. The deflection tab 536 is configured to ride over the deflection ramp 522 of the cover 508 when the grip portion 534 is pulled forwardly. The interaction of the deflection tab 536 and the deflection ramp 522 causes lateral inward movement of the deflection tab 536, which in turn, pushes the spring 504 laterally inwardly, clearing the end portion 524 of the locking spring 504 from the latch opening 512. In this manner, when the release handle 506 is pulled forwardly, the interaction of the deflection tab 536 and the deflection ramp 522 causes the release of the spring 504, and thus the entire element 510, from the mounting bracket 502. The chassis and the entire element 510 can be pulled forwardly from the mounting bracket 502.

In using the universal mounting mechanism 500 on the element 510, a tray of the element 510 has to be pulled from its chassis to allow enough room for gripping the release handle 506 as seen in FIG. 52, to pull it forwardly. In initially mounting the element 510 to a rack using the universal mounting mechanism 500, the release handle 506 has to be either pushed rearwardly by the user to allow the spring 504 to be positioned in its locking position or the user can simply push a tray of the element 510 rearwardly to contact the grip portion 534 of the release handle 506 to push the release handle 506 rearwardly. Thus, when the element 510 is mounted to a rack using the universal mounting mechanism 500, the release handle 506 must be in its rearward position to allow the spring 504 to be in its locking position. Otherwise, if the release handle 506 is in its forward position, the element 510 can simply slide out of the brackets 502.

The release handle 506 defines a positive stop 540 that is configured to abut a stop face 542 defined by a portion of a slide mechanism 544 within the element 510. The abutment of the stop 540 with the stop face 542 prevents further forward pulling of the release handle 506.

The universal mounting mechanism 500 includes a design that may be retrofitted on a number of telecommunications chassis. As long as a bracket channel 520 is provided in the chassis and the chassis includes enough spacing on the sides thereof for receiving a locking spring 504, a release handle 506, and a cover 508 for interacting with the release handle 506 and closing the mounting mechanism 500 to the exterior of the chassis, the universal mounting mechanism 500 can be utilized on any given chassis.

Also, as noted above, the rear portion 518 of the mounting brackets 502 may be modified to fit different types of mounting configurations on different types of telecommunications racks, frames, or cabinets. The mounting arrangement of the brackets 502 of the present disclosure that utilizes the tabs 516 for lateral slide-locking is simply one example of a mounting arrangement. Also, even though the mounting mechanism 500 of the present disclosure has been shown with mounting brackets 502 that can accommodate two vertically stacked elements 510, the mounting brackets 502 can be modified to receive other number of chassis, including a single chassis per bracket 502.

In the given embodiment, the locking spring 504 is fixed to the chassis with fasteners 545, allowing the end portion 524 of the locking spring 504 to be flexible. Other fixing methods may be used for the locking spring 504 in other types of telecommunications equipment.

Figure 53:
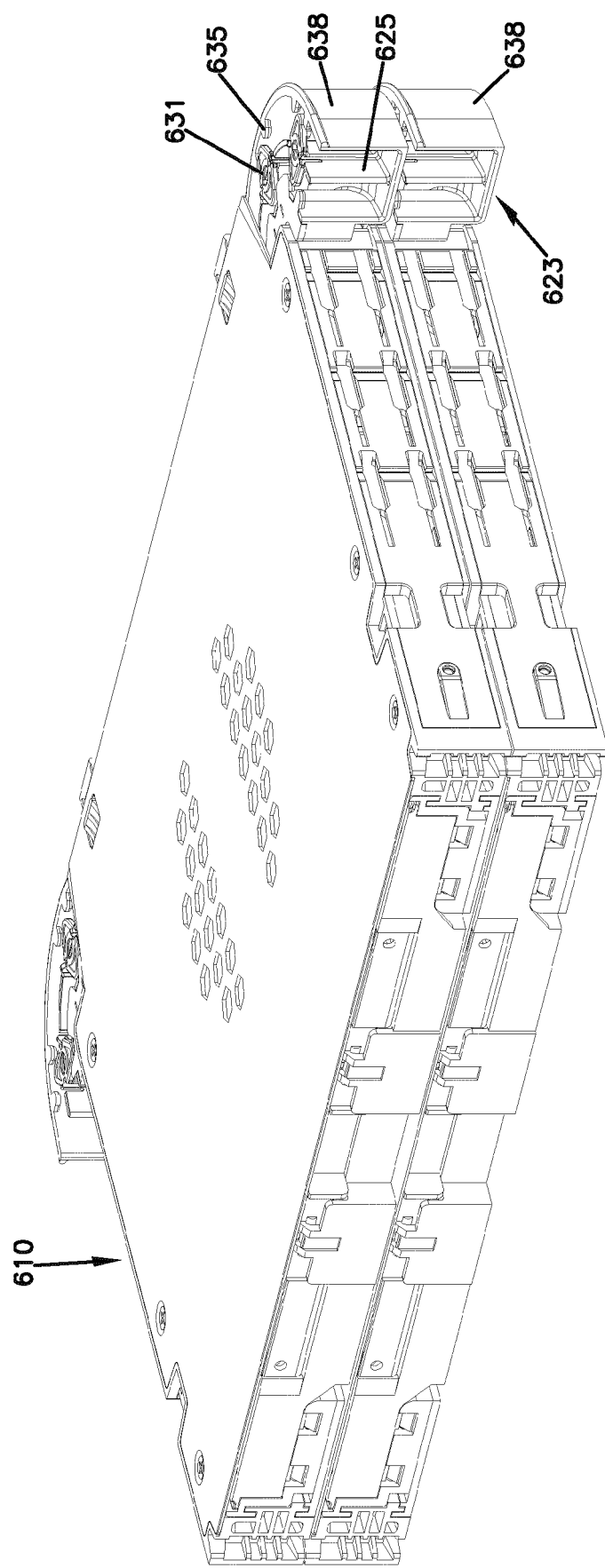
FIG. 53 shows a pair of elements in a stacked configuration, the elements shown with another alternative radius limiter on the slide mechanism.
Figure 54:
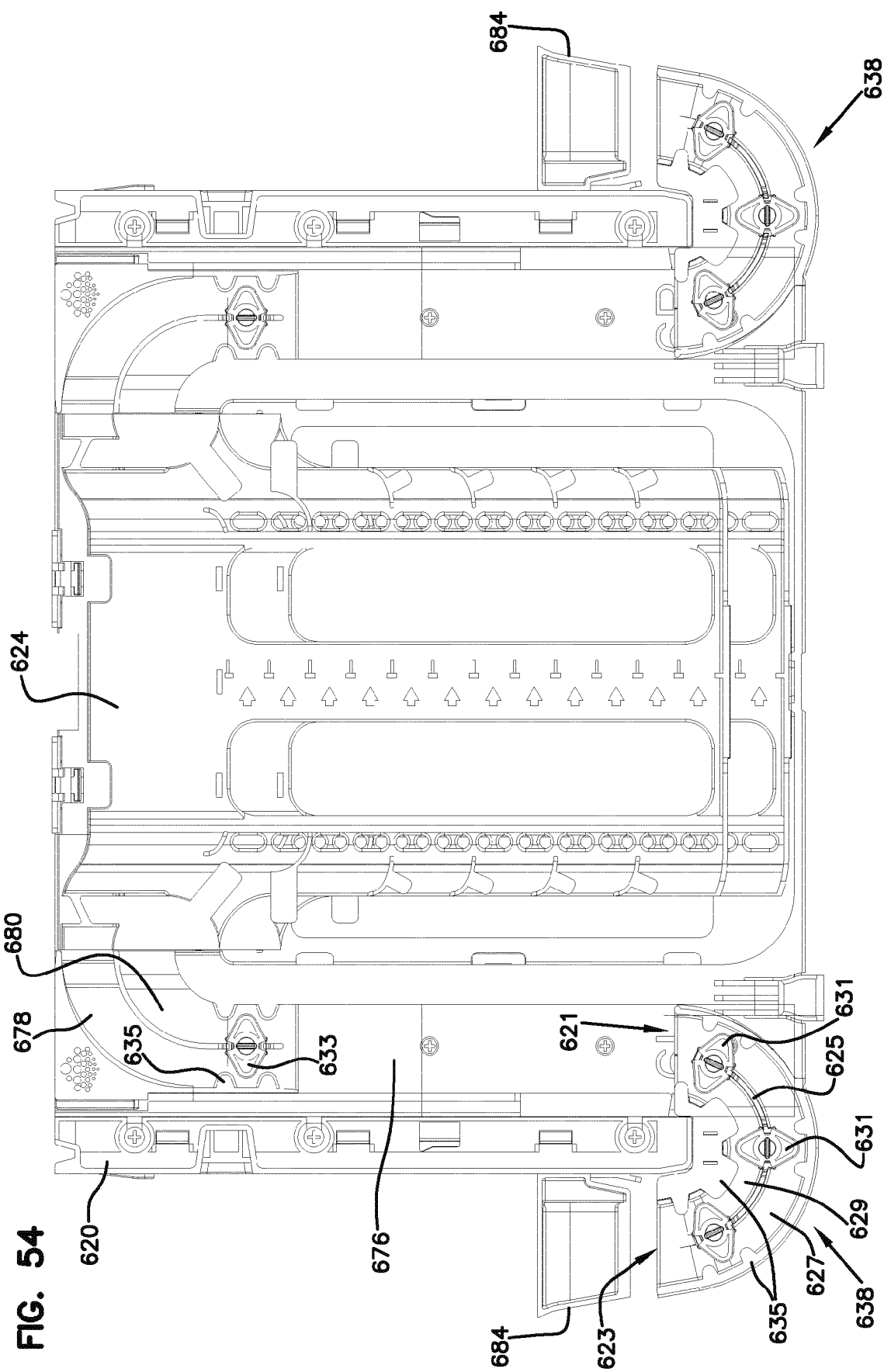
FIG. 54 is a top view of one of the elements of FIG. 50 illustrating the alternative radius limiter.

Referring now to FIGS. 53 and 54, an alternative radius limiter 638 is shown on the slide mechanisms of alternative elements 610. Elements 610 are generally similar in construction and function to those of the elements discussed previously. Radius limiter 638 defines a generally U-shaped configuration that leads cables from and to the element 610 while preserving minimum bend radius requirements.

The U-shaped radius limiter 638 defines an inner end 621 and an outer end 623 and a divider 625 extending from adjacent the inner end 621 to adjacent the outer end 623. The outer end 623 of the radius limiter 638 cooperates with a cable guide 684 that is mounted to the chassis 620 of the element 610 for leading cables to and from the tray 624 of the element 610.

The divider 625 of the radius limiter 638 forms two separate troughs 627, 629 for the radius limiter 638. The two troughs 627, 629 isolate and separate the cables (e.g., coming in and going out) of the element 610 into two distinct paths. According to one example cable routing configuration, the two troughs 627, 629 may guide the cables to the upper and lower levels 678, 680 defined toward the rear of the tray 624 while maintaining the S-shaped pathway 676 created within the element 610. The divider 625 of the radius limiter 638 includes a plurality of cable management tabs 631 mounted thereon for retaining the cables within the troughs 627, 629. A similar tab 633 is also found at the rear of the tray 624 for retaining the cables that are being lead to the upper and lower levels 678, 680. The tabs 631 and 633 may be removable, snap-on structures.

The tabs 631 and 633 cooperate with additional cable management fingers 635 defined both on the radius limiter 638 and toward the rear of the tray 624 in retaining the cables within the S-shaped pathway 676.

Referring now to FIGS. 55-61, a mounting system 700 for fixedly stacking two or more telecommunications elements in a vertical column or stack is illustrated. In FIGS. 55-61, the mounting system 700 of the present disclosure is illustrated as being used to stack elements having features similar to those elements 610 shown in FIGS. 53-54.

It should be noted that although the mounting system 700 of the present disclosure has been shown as being used on a piece of telecommunications equipment such as the optical fiber distribution element 610 (which has similar features to those elements 10, 210, 410, and 510 of FIGS. 1-52), the optical fiber distribution element 610 is simply one example of telecommunications equipment on which the mounting system 700 may be used for fixedly stacking such elements for further mounting to equipment such as telecommunications racks, frames, or cabinets. As will be discussed in further detail below, the element 610 has been configured specifically to incorporate certain aspects of the mounting system 700. However, it should be understood that the mounting system 700 of the present disclosure includes features having inventive aspects in isolation and can be used on other types of optical fiber distribution elements as long as the elements or chassis thereof are adapted to incorporate aspects of the mounting system 700. According to certain embodiments of the disclosure, the mounting system 700 of the present disclosure may be used as a retro-fit solution on pre-existing telecommunications equipment by modifying certain aspects of the preexisting equipment to incorporate features of the system 700, as will be apparent from the following description.

Figure 60:
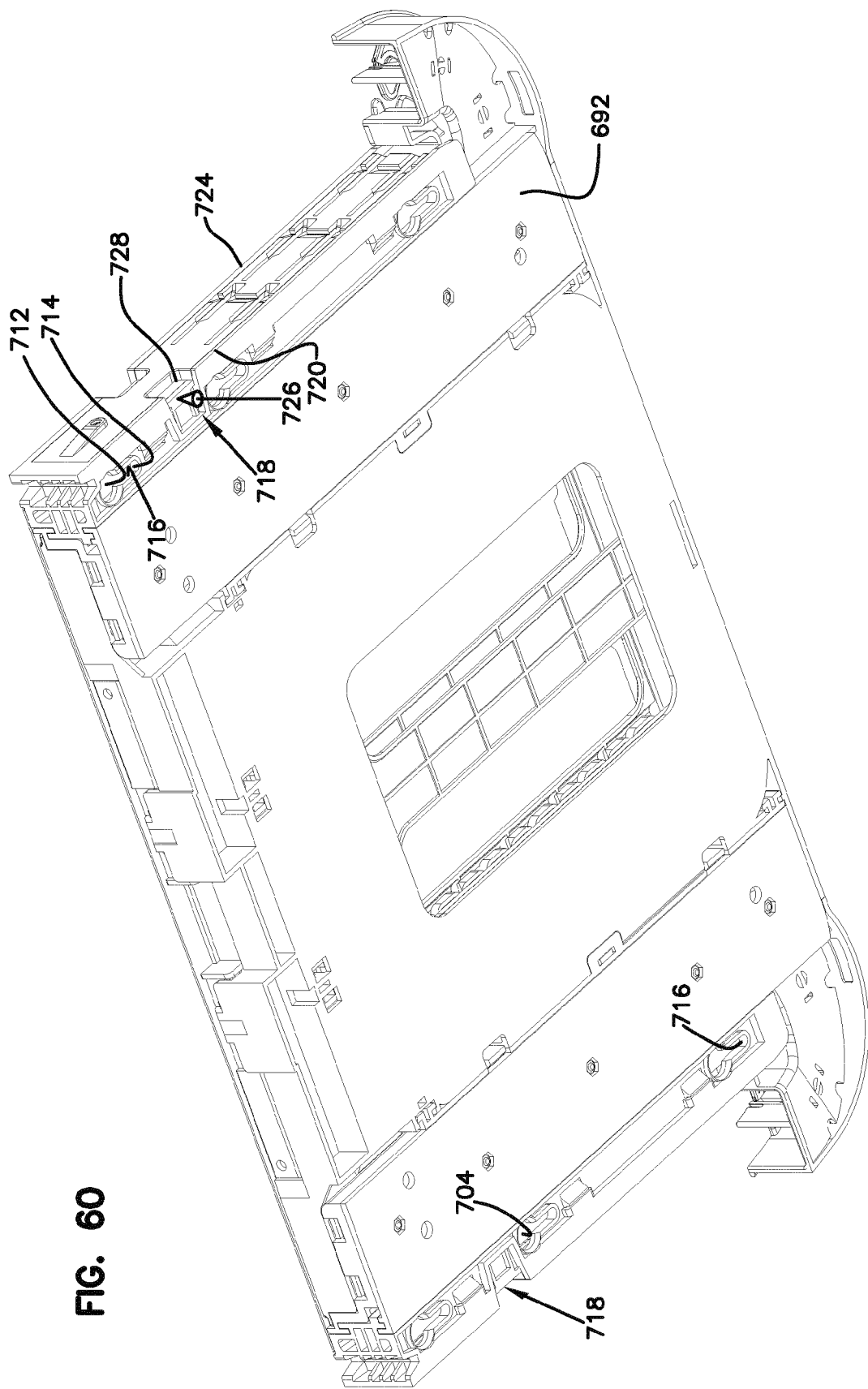
FIG. 60 is a bottom perspective view of one of the telecommunications distribution elements of FIGS. 55-59, illustrating the slots of the mounting system.

Still referring to FIGS. 55-61, the mounting system 700 will now be described in further detail. FIGS. 55-59 illustrate the steps for stacking two of the elements 610 in a vertical stack or column using the mounting system 700 of the present disclosure. FIG. 60 is a bottom perspective view of one of the elements 610 of FIGS. 55-59 and FIG. 61 is a bottom plan view of the element 610 of FIG. 60.

According to an example embodiment, the mounting system 700 includes a first locking feature 701 in the form of at least one stud 702 (e.g., a plurality of studs 702 as depicted) that is provided at a top surface 690 of an element 610 and a second locking feature 703 in the form of at least one slot 704 (e.g., a plurality of slots 704 as depicted) that is provided at a bottom surface 692 of an element 610. According to an example embodiment, to improve manufacturing efficiency and standardization, an element 610 may include both the studs 702 at its top surface 690 and the slots 704 at its bottom surface 692. Thus, when stacking similarly configured elements 610, the studs 702 that are located at the top surface 690 of an element 610 can cooperate with the slots 704 that are located at the bottom surface 692 of an adjacent element that is to be stacked vertically with the first element 610.

In addition to the studs 702 and slots 704 which cooperate to partially fix the elements 610 together, the mounting system 700 of the present invention also includes a third locking feature 705 in the form of a removably mounted slide lock 706. As will be described in further detail below, the slide lock 706 is configured to prevent two stacked elements 610 from relatively sliding along the horizontal direction so as to prevent removal of the studs 702 from the slots 704, and, thus, separation of the two elements 610.

Figure 61:
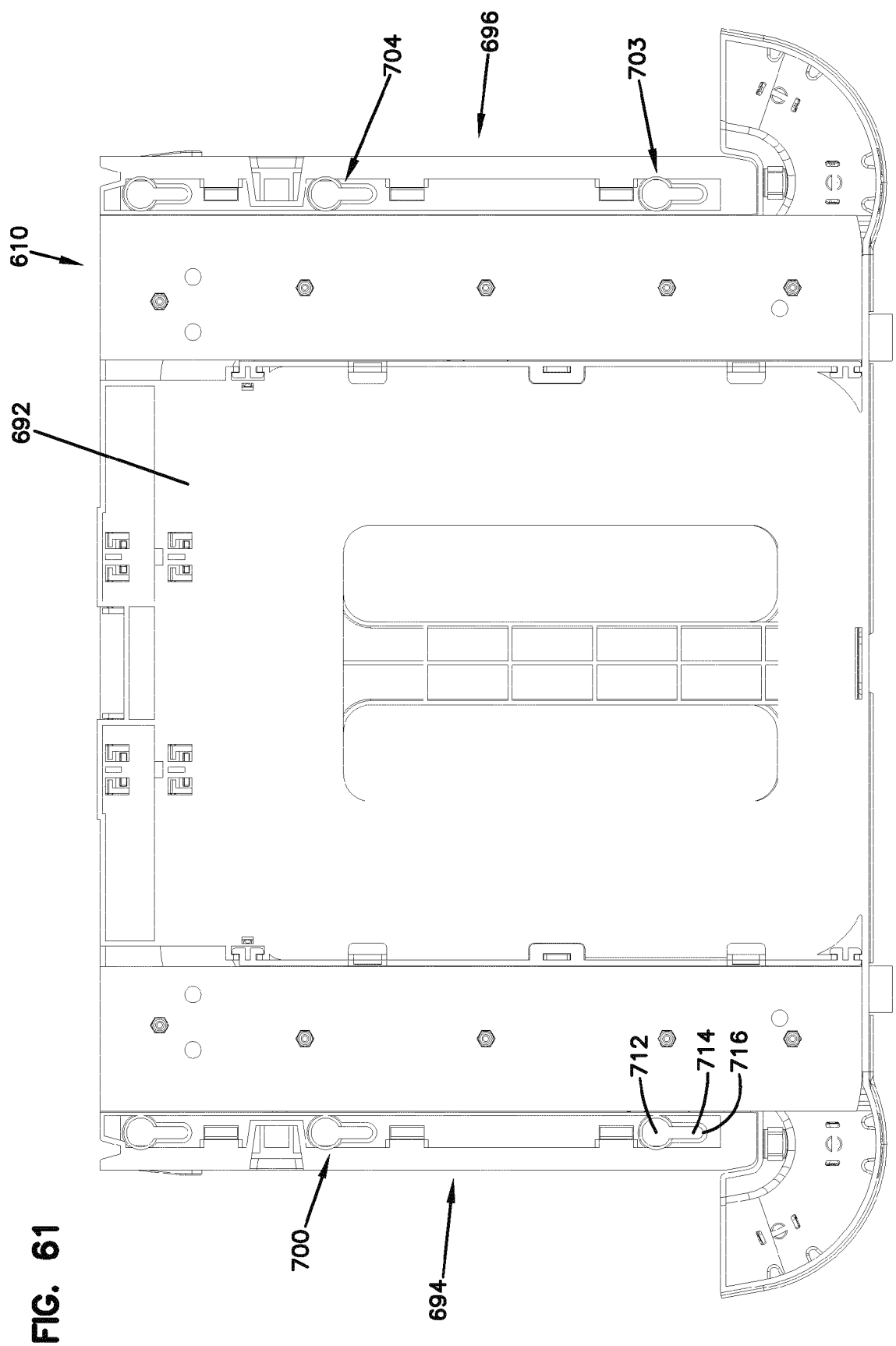
FIG. 61 is a bottom plan view of the telecommunications distribution element of FIG. 60.

Still referring to FIGS. 55-61, in the depicted embodiment, the studs 702 are located along both the right side 694 and the left side 696 of the element 610. Similarly, as shown in FIGS. 60 and 61, the slots 704 are also positioned on the right and left sides 694, 696 of the element 610 so as to align and cooperate with the studs 702 of an adjacent element 610 for using the mounting system 700.

Each stud 702 includes a stem portion 708 and a flange portion 710. Each slot 704 includes a receiver portion 712 and a retention portion 714. The receiver portion 712 is sized to accommodate the flange portion 710 of the stud 702. Once the flange portion 710 of a stud 702 has been inserted through the receiver portion 712 of a slot 704, the stem portion 708 of the stud 702 slides through the retention portion 714 until the flange portion 710 of the stud 702 is positioned above the retention portion 714. Further advancement of a stud 702 within a slot 704 is prevented due to the abutment of the stem portion 708 of the stud 702 with an end 716 of the retention portion 714 of the slot 704 that acts as a positive stop.

In this manner, once the flange portion 710 of a stud 702 has been positioned above the retention portion 714 of a slot 704, the stud 702 cannot be separated from the slot 704 along a direction perpendicular to the sliding direction.

Figure 55:
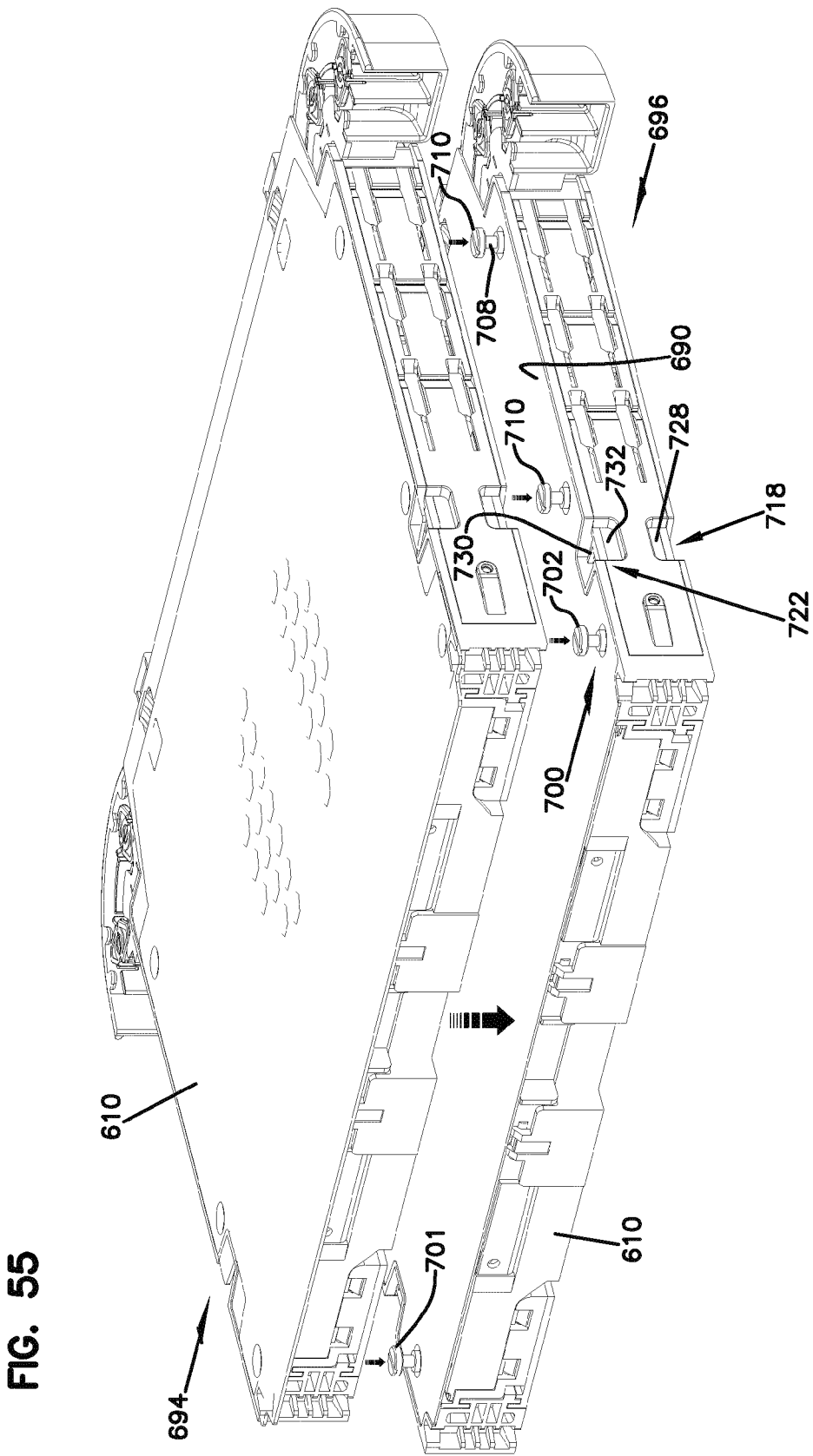
FIGS. 55-59 illustrate the steps for stacking two telecommunications distribution elements in a vertical stack or column using the mounting system of the present disclosure.
Figure 56:
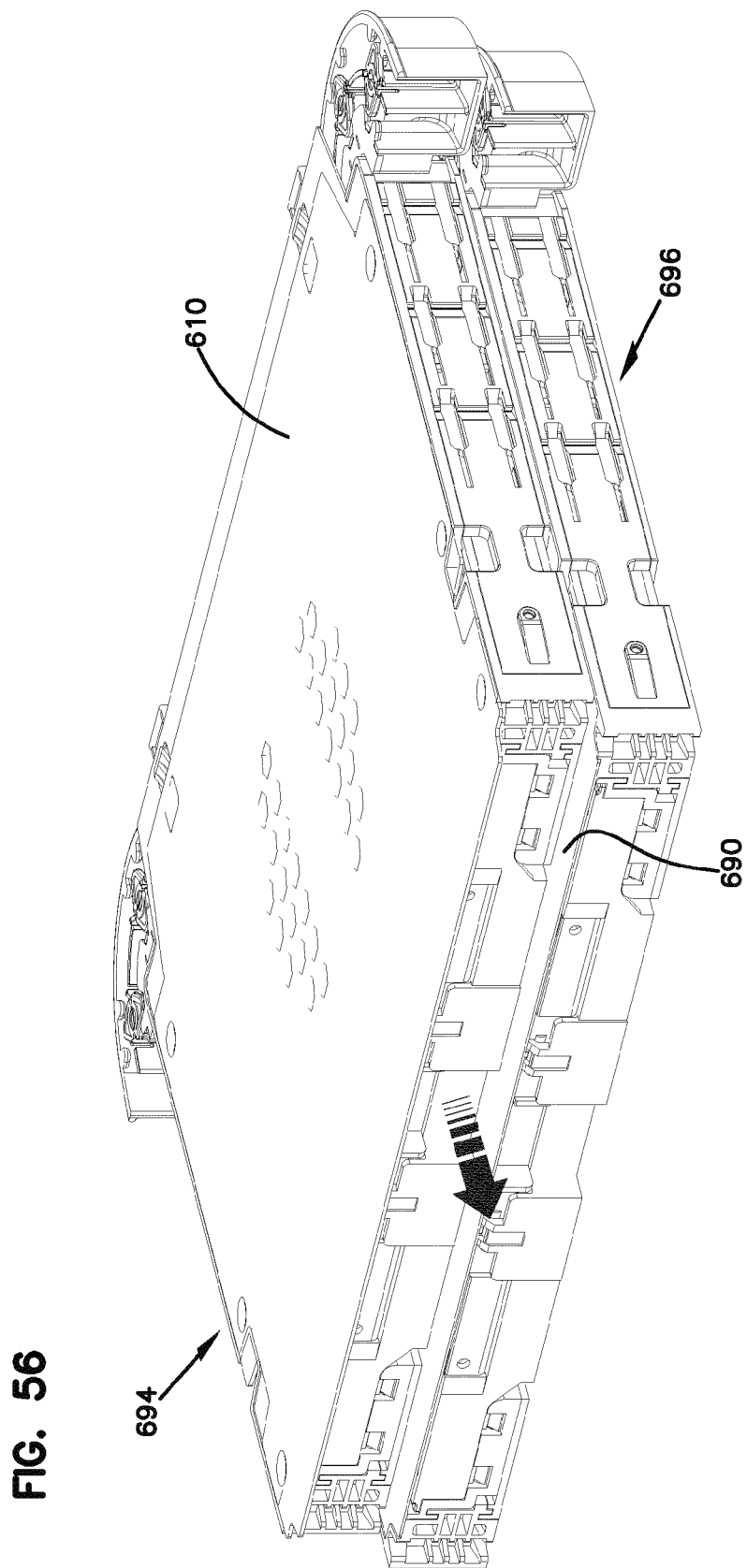
Figure 57:
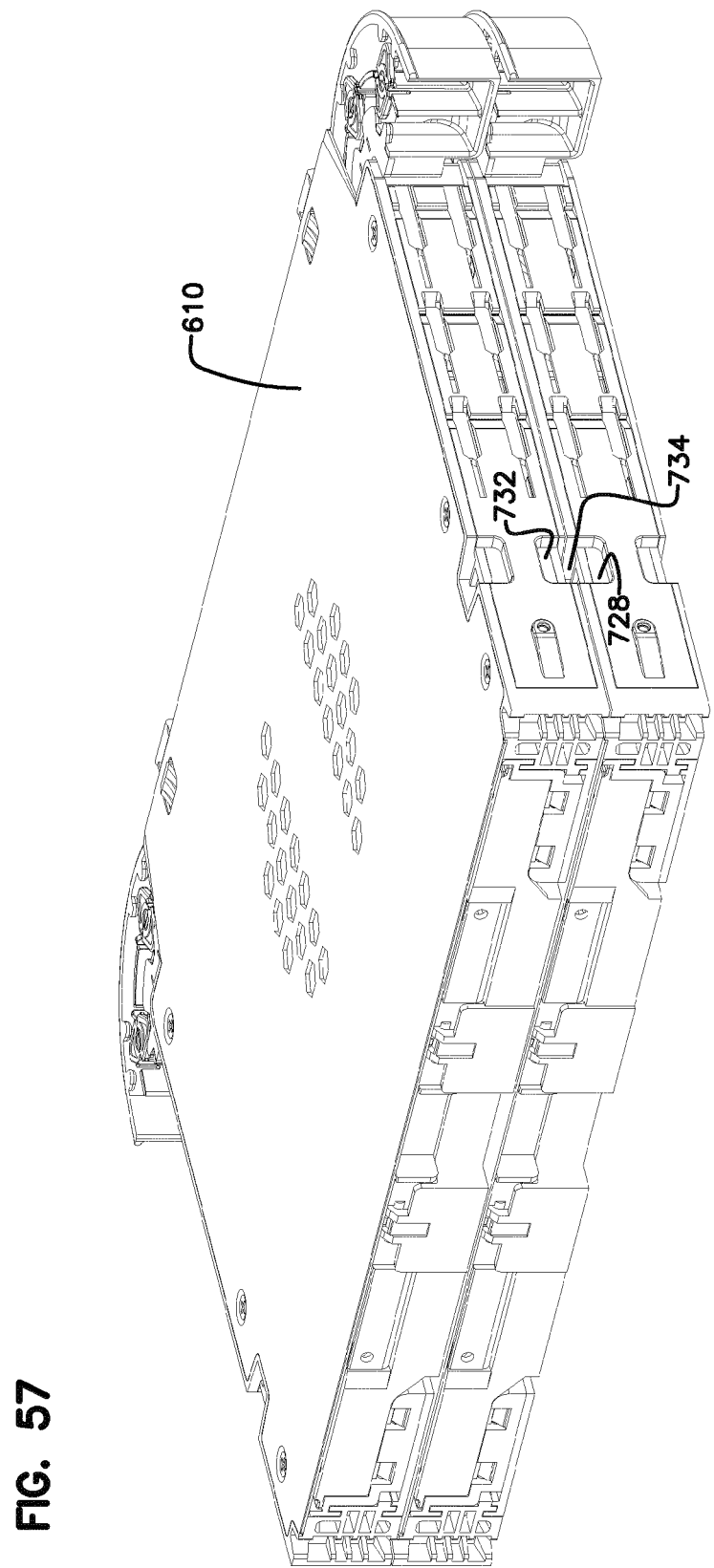
Figure 58:
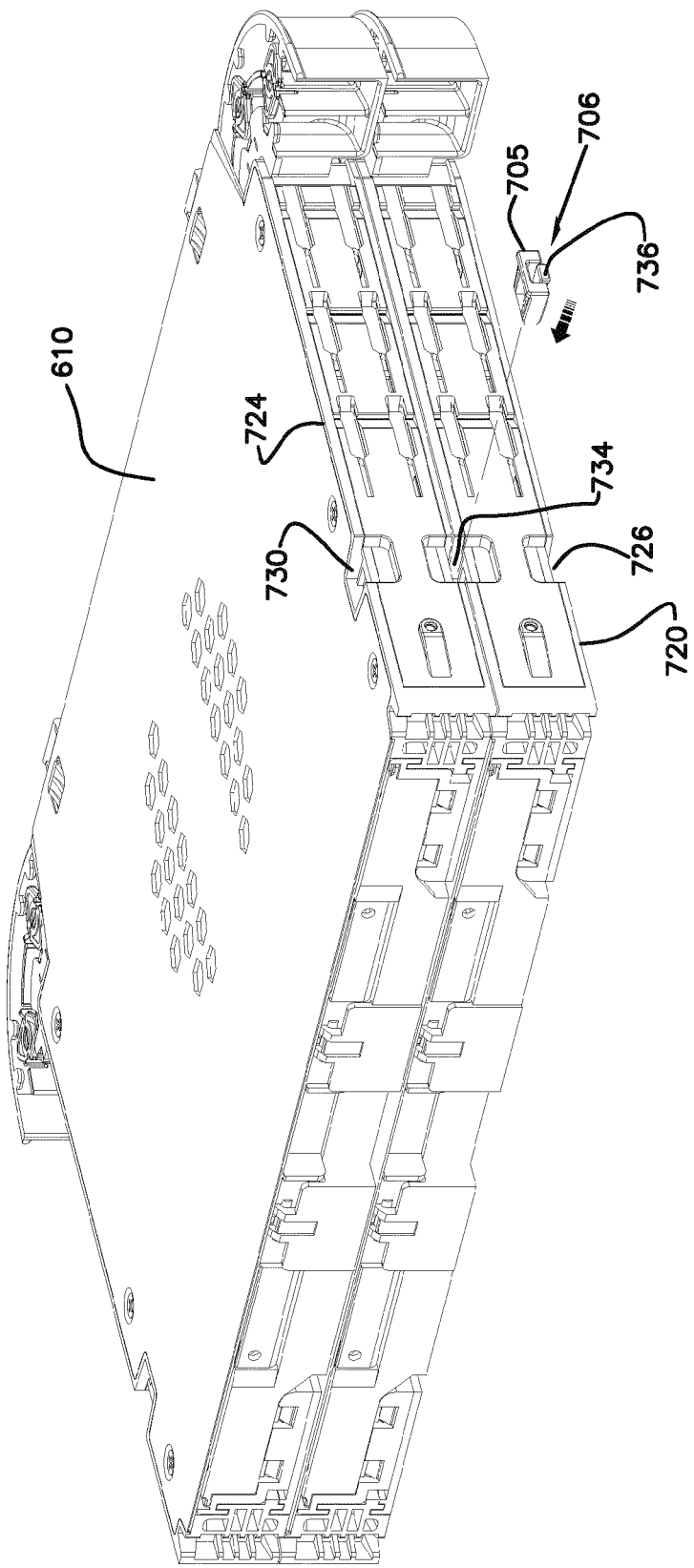
Figure 59:
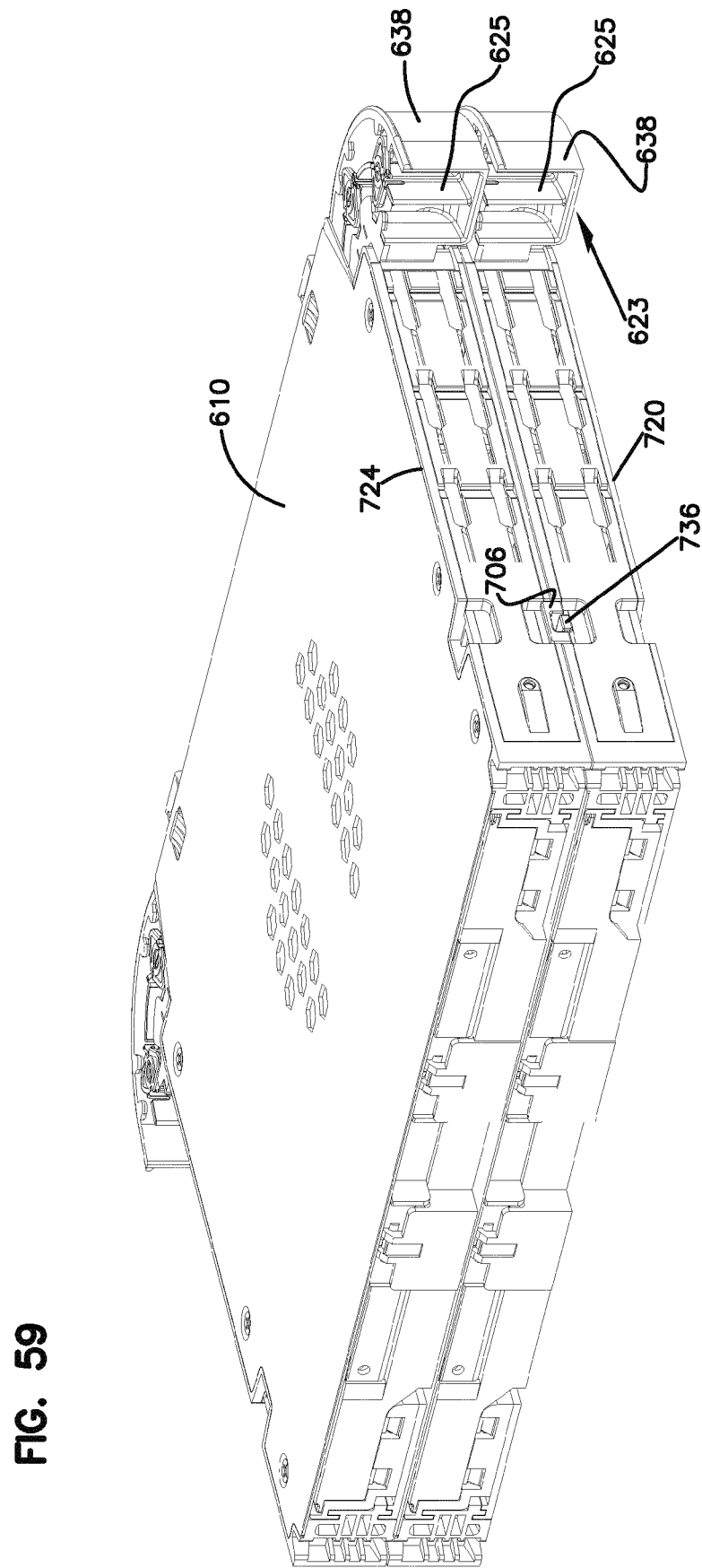

As shown in FIG. 55, when stacking two elements 610 together, the elements 610 are initially aligned to position the flange portions 710 of the studs 702 of a bottom element 610 with the receiver portions 712 of the slots 704 of an upper element 610. As shown in FIGS. 56 and 57, after the elements 610 are brought together, the elements 610 are slid with respect to each other. In the depicted embodiment, the upper element 610 is slid rearwardly with respect to the bottom element 610. This movement results in the stem portions 708 of the studs 702 sliding through the retention portions 714 of the slots 704 and bringing the flange portions 710 of the studs 702 over the retention portions 714 of the slots 704. When the stem portion 708 finally abuts the positive stop defined by the end 716 of the slot 704 and the relative sliding of the elements 610 is completed, separation in the vertical direction is prevented. Separation of the two elements 610, at this point, requires a reversal of the steps used in fixing the two elements 610. For separation, the stem portions 708 of the studs 702 have to be slid through the retention portions 714 of the slots 704 until the flange portions 710 are aligned with the receiver portions 712 of the slots 704. And, at that point, the two elements 610 can be separated from each other along a vertical direction perpendicular to the sliding direction.

Since separation of the two elements 610, after they have been fixed via the studs 702 and the slots 704, requires reverse relative horizontal movement between the elements 610, the mounting system 700 of the present disclosure further includes the slide lock 706 noted above and shown in FIGS. 58 and 59. The slide lock 706 is configured to prevent two stacked elements 610 from sliding along the horizontal direction with respect to each other such that the studs 702 cannot be removed from the slots 704.

As shown in FIG. 60, each element 610 has been provided with specific features to utilize the slide lock 706. In the example shown in FIG. 60, each element 610 defines a cutout 718 at a lower side edge 720 thereof (i.e., lower cutout 718) at both the right and left sides 694, 696 of the element 610 and a cutout 722 at an upper side edge 724 thereof (i.e., upper cutout 722) at both the right and left sides 694, 696 of the element 610. The upper cutouts 722 are configured to align with and cooperate with the lower cutouts 718 when two elements 610 are stacked in order to use the slide lock 706 to prevent separation of the elements 610. Again, as noted above, each element 610 may be provided with both an upper cutout 722 and a lower cutout 718 for manufacturing efficiency and standardization of the parts.

It should be noted that although the depicted example of the mounting system 700 utilizes a slide lock 706 on both the right and left sides 694, 696 of an element stack, a slide lock 706 can be used on a single side of the stack if desired. Also, it should be noted that although the depicted example of the mounting system 700 utilizes a single slide lock 706 on each of the right and left sides 694, 696 of an element stack, more slide locks 706 can be used if desired.

Referring specifically now to a lower cutout 718 of an element 610, the cutout 718 defines both a bottom notch 726 and a side notch 728. The upper cutout 722 defines both a top notch 730 and a side notch 732. The cutouts 718, 722 are configured such that when the lower cutout 718 of an upper element 610 aligns with the upper cutout 722 of a lower element 610, an opening 734 is created between the two elements 610. The opening 734 is created by the alignment of the bottom notch 726 of a lower cutout 718 and the top notch 730 of an upper cutout 722.

The slide lock 706 is inserted into the opening 734 and prevents any horizontal movement between two stacked elements 610. The slide lock 706, according to the depicted embodiment, is a removable snap-fit structure that includes a flexible cantilever tab 736. The flexible cantilever tab 736 provides a frictional fit against the top and bottom notches 730, 726 of the upper and lower cutouts 722, 718, respectively, and can be flexed back toward the center of the slide lock 706 in removing the slide lock 706.

The side notches 732, 728 of the upper and lower cutouts 722, 718 also align when the elements 610 are moved into position. The side notches 732, 728 accommodate a user's fingers for accessing the slide lock 706 for either insertion or removal.

Thus, the mounting system 700 of the present disclosure provides a quick-attach solution that can be used in stacking elements 610 in a column for further mounting to equipment such as telecommunications racks, frames, or cabinets. The mounting system 700 of the present disclosure provides an unobtrusive attachment solution that can be incorporated in a variety of telecommunications distribution element designs. The mounting system 700 of the present disclosure may be used as a retro-fit solution on pre-existing telecommunications equipment with slight modification to certain aspects of the preexisting equipment to incorporate features of the system.

The mounting system 700 may be used to mount or stack two or more elements (such as the optical fiber distribution elements 610) that have similar configurations.

The mounting system 700 may also be used to mount or stack dissimilar equipment together if those pieces of equipment include features of the system 700 that allow them to intermate. For example, elements including equipment other than optical distribution features may be mounted to optical distribution elements such as elements 610 using the system 700 of the present disclosure as long as those equipment are configured with features of the system 700 that allow them to intermate with the features of equipment such as elements 610.

The mounting or stacking system 700 of the present disclosure may be used in instances where a single element includes features for mounting that element to a telecommunications rack, frame, or cabinet and other elements may be stacked with respect to that element using the system 700. For example, as shown in the example version of the element 510 in FIGS. 48-52, an element or chassis may include a universal quick-connect mounting mechanism similar to mechanism 500 of FIGS. 48-52 including universal mounting brackets 502 for releasably mounting that element or chassis to a telecommunications fixture, such as an optical fiber distribution rack. Using the stacking system 700 of the present disclosure, only one of the elements that are to be mounted to a separate fixture such as a rack would need to have the structure for utilizing a mechanism such as the universal mounting mechanism 500. The rest of the elements could be stacked with respect to that element by using the mounting or stacking system 700 of the present disclosure that relatively fixes the elements and prevents relative sliding between the elements and relative separation between the elements in a direction generally perpendicular to the direction of the relative sliding.

The element utilizing the mounting features (such as the universal quick-connect mechanism 500 shown in FIGS. 48-52) for mounting to a separate telecommunications fixture may be located at the top of the stack, at the bottom of the stack, or in the middle of the stack using the features of the stacking system 700 of the present disclosure.

Referring now to FIGS. 62-65, another embodiment of a mounting system 900 for fixedly stacking two or more telecommunications elements in a vertical column or stack is illustrated. In FIGS. 62-65, the mounting system 900 of the present disclosure is illustrated as being used to stack elements 810 having features similar to those elements 610 shown in FIGS. 53-61.

It should be noted that although the mounting system 900 of the present disclosure has been shown as being used on a piece of telecommunications equipment such as the optical fiber distribution element 810 (which has similar features to those elements 10, 210, 410, 510, and 610 of FIGS. 1-61), the optical fiber distribution element 810 is simply one example of telecommunications equipment on which the mounting system 900 may be used for fixedly stacking such elements for further mounting to equipment such as telecommunications racks, frames, or cabinets. As will be discussed in further detail below, the element 810 has been configured specifically to incorporate certain aspects of the mounting system 900. However, it should be understood that the mounting system 900 of the present disclosure includes features having inventive aspects in isolation and can be used on other types of optical fiber distribution elements as long as the elements or chassis thereof are adapted to incorporate aspects of the mounting system 900. According to certain embodiments of the disclosure, the mounting system 900 of the present disclosure may be used as a retro-fit solution on pre-existing telecommunications equipment by modifying certain aspects of the preexisting equipment to incorporate features of the system 900, as will be apparent from the following description.

Figure 62:
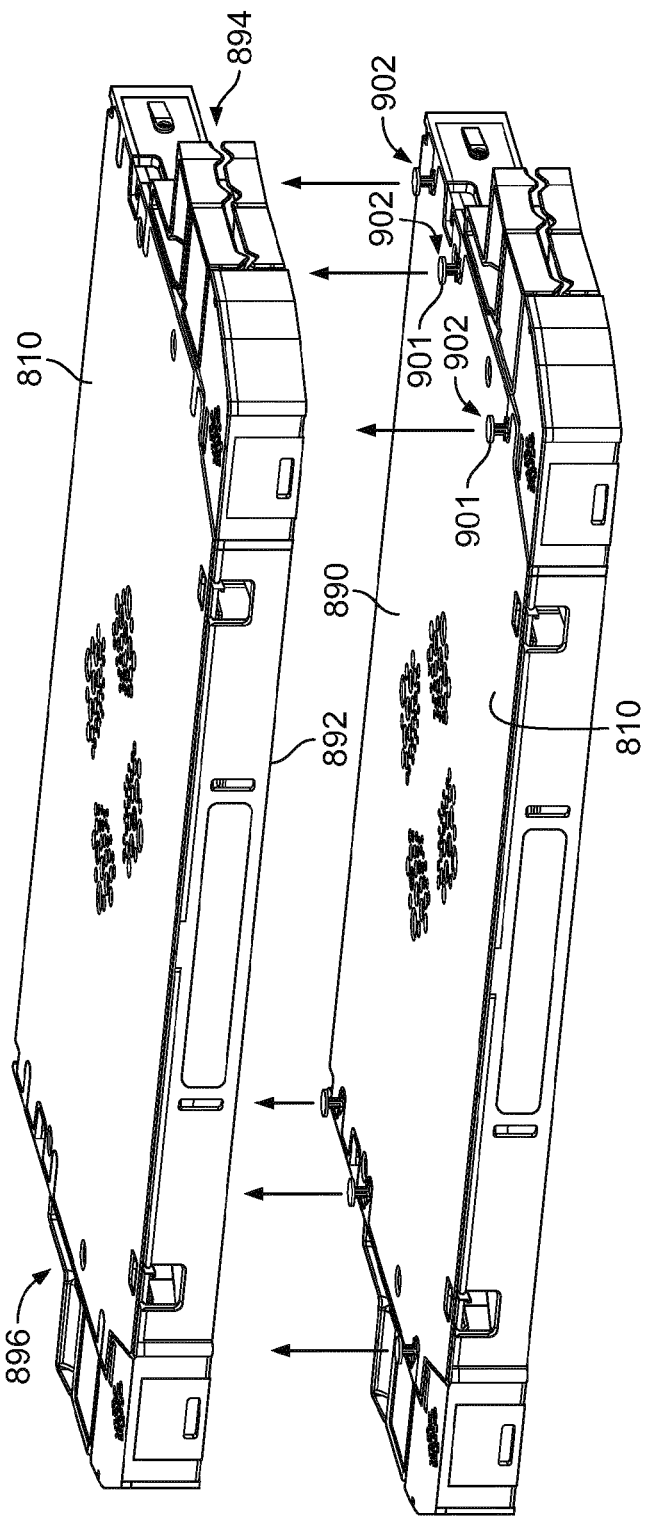
FIGS. 62-63 illustrate the steps for stacking two telecommunications distribution elements in a vertical stack or column using another embodiment of a mounting system according to the present disclosure.
Figure 63:
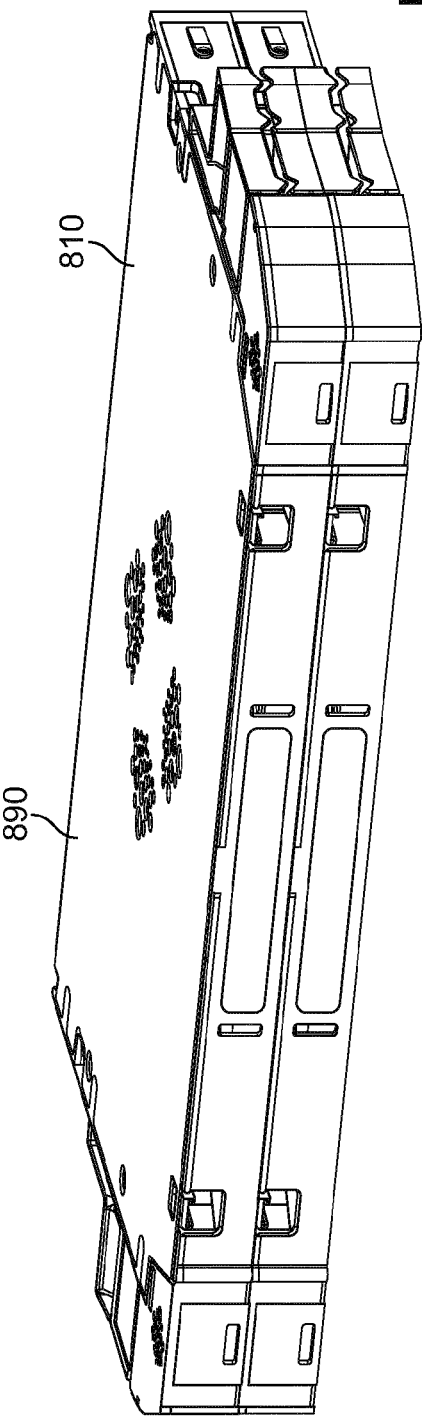
Figure 64:
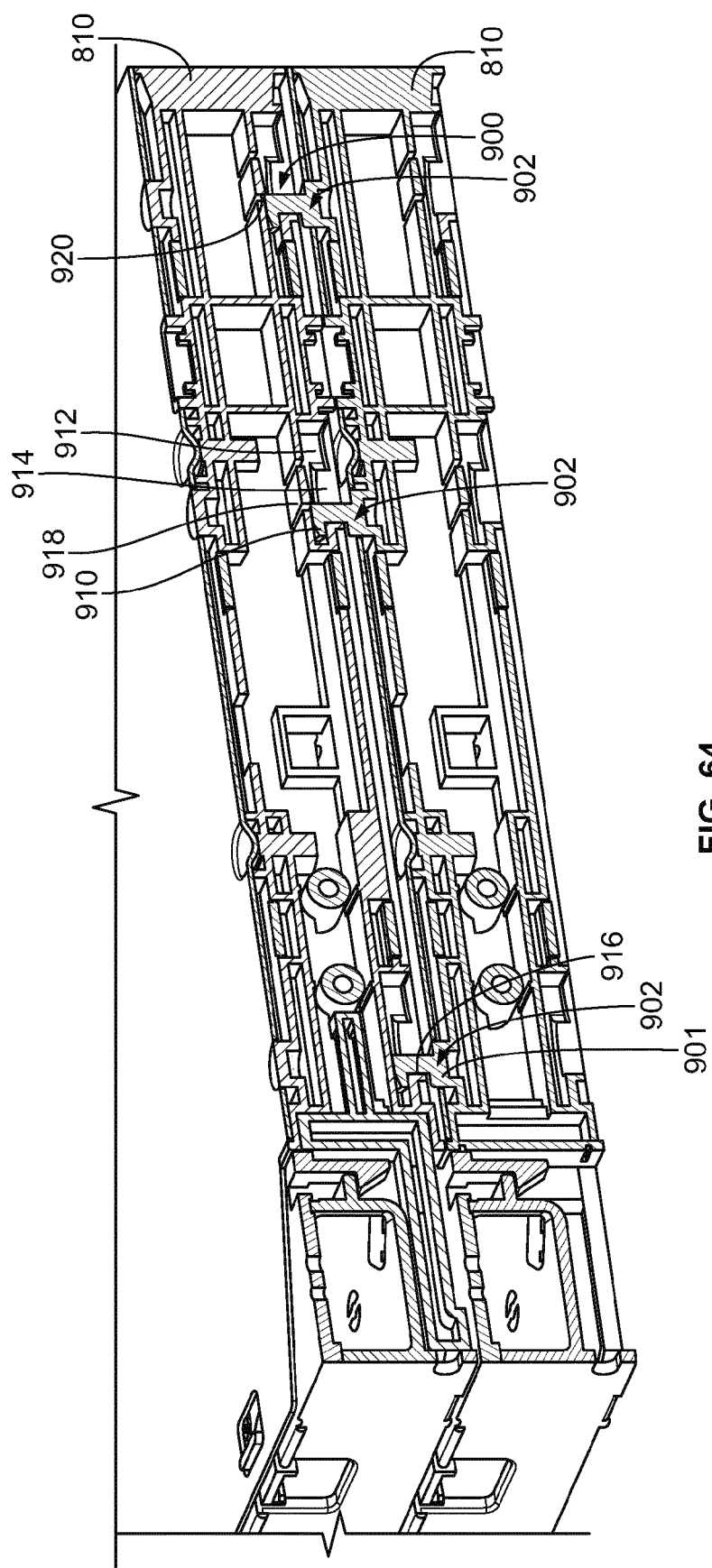
FIG. 64 is a cross-section taken along line 64-64 of FIG. 63.
Figure 65:
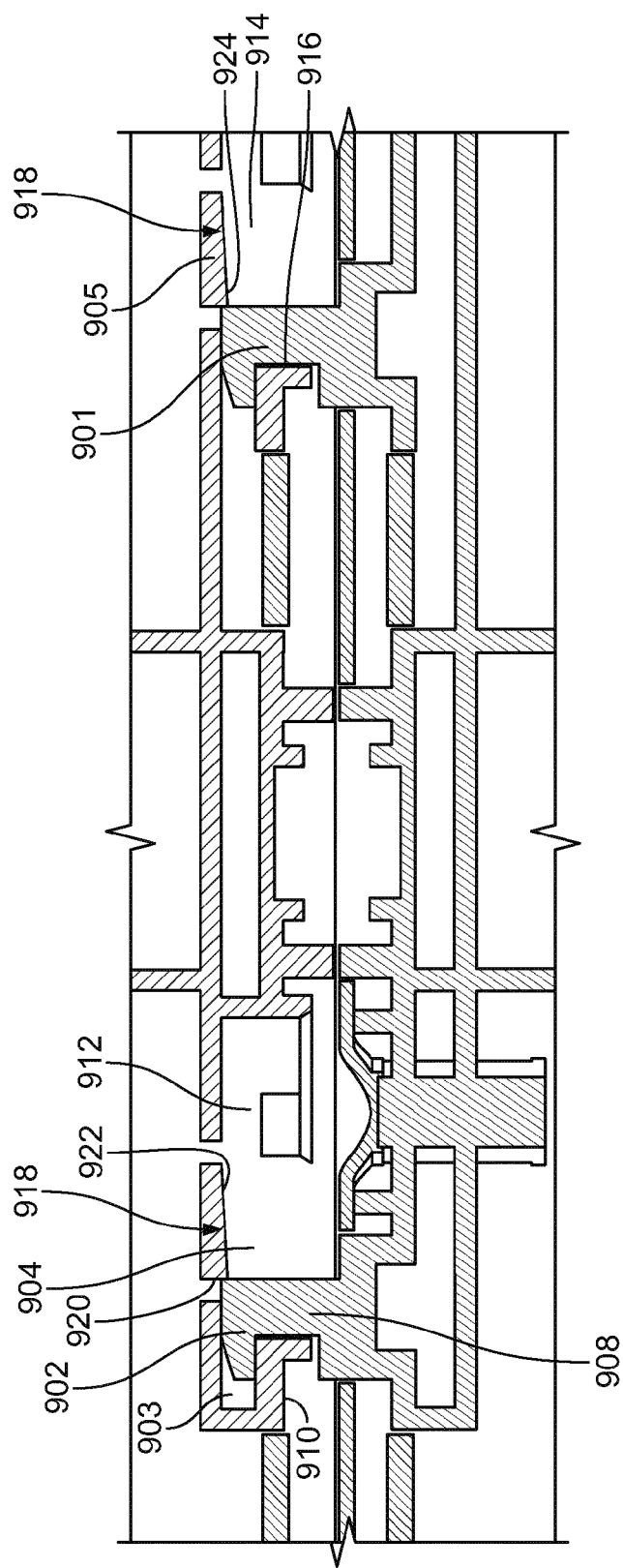
FIG. 65 illustrates a portion of the cross-section of FIG. 64 from a direct side-view.

Still referring to FIGS. 62-65, the mounting system 900 will now be described in further detail. FIGS. 62-63 illustrate the steps for stacking two of the elements 810 in a vertical stack or column using the mounting system 900 of the present disclosure. FIG. 64 is a cross-section taken along line 64-64 of FIG. 63, and FIG. 65 illustrates a portion of the cross-section of FIG. 64 from a direct side view.

According to an example embodiment, the mounting system 900 includes a first locking feature 901 in the form of at least one stud 902 (e.g., a plurality of studs 902 as depicted) that is provided at a top surface 890 of an element 810 and a second locking feature 903 in the form of at least one slot 904 (e.g., a plurality of slots 904 as depicted) that is provided at a bottom surface 892 of an element 810. According to an example embodiment, to improve manufacturing efficiency and standardization, an element 810 may include both the studs 902 at its top surface 890 and the slots 904 at its bottom surface 892. Thus, when stacking similarly configured elements 810, the studs 902 that are located at the top surface 890 of an element 810 can cooperate with the slots 904 that are located at the bottom surface 892 of an adjacent element that is to be stacked vertically with the first element 810. It should be noted that slots 904 are similar in configuration to slots 704 that are shown at the bottom of the element 610 in FIGS. 60-61.

In addition to the studs 902 and slots 904 which cooperate to partially fix the elements 810 together, the mounting system 900 of the present invention also includes a third locking feature 905 in the form of a slide lock 906. As will be described in further detail below, the slide lock 906 is configured to prevent two stacked elements 810 from relatively sliding along the horizontal direction so as to prevent removal of the studs 902 from the slots 904, and, thus, separation of the two elements 810.

Still referring to FIGS. 62-65, in the depicted embodiment, the studs 902 are located along both the right side 894 and the left side 896 of the element 810. Similarly, the slots 904 are also positioned on the right and left sides 894, 896 of the element 810 so as to align and cooperate with the studs 902 of an adjacent element 810 for using the mounting system 900.

Each stud 902 includes a stem portion 908 and a flange portion 910. Each slot 904 includes a receiver portion 912 and a retention portion 914. The receiver portion 912 is sized to accommodate the flange portion 910 of the stud 902. Once the flange portion 910 of a stud 902 has been inserted through the receiver portion 912 of a slot 904, the stem portion 908 of the stud 902 slides through the retention portion 914 until the flange portion 910 of the stud 902 is positioned above the retention portion 914. Further advancement of a stud 902 within a slot 904 is prevented due to the abutment of the stem portion 908 of the stud 902 with an end surface 916 defined by the retention portion 914 of the slot 904 that acts as a positive stop.

In this manner, once the flange portion 910 of a stud 902 has been positioned above the retention portion 914 of a slot 904, the stud 902 cannot be separated from the slot 904 along a direction perpendicular to the sliding direction.

As shown in FIG. 62, when stacking two elements 810 together, the elements 810 are initially aligned to position the flange portions 910 of the studs 902 of a bottom element 810 with the receiver portions 912 of the slots 904 of an upper element 810. As shown in FIGS. 63 and 64, after the elements 810 are brought together, the elements 810 are slid with respect to each other. In the depicted embodiment, the upper element 810 can be slid rearwardly with respect to the bottom element 810 or the bottom element 810 can be slid forwardly with respect to the upper element 810. This movement results in the stem portions 908 of the studs 902 sliding through the retention portions 914 of the slots 904 and bringing the flange portions 910 of the studs 902 over the retention portions 914 of the slots 904. When the stem portion 908 finally abuts the positive stop defined by the end surface 916 of the slot 904 and the relative sliding of the elements 810 is completed, separation in the vertical direction is prevented. Separation of the two elements 810, at this point, requires a reversal of the steps used in fixing the two elements 810. For separation, the stem portions 908 of the studs 902 have to be slid through the retention portions 914 of the slots 904 until the flange portions 910 are aligned with the receiver portions 912 of the slots 904. And, at that point, the two elements 810 can be separated from each other along a vertical direction perpendicular to the sliding direction.

Since separation of the two elements 810, after they have been fixed via the studs 902 and the slots 904, requires reverse relative horizontal movement between the elements 810, the mounting system 900 of the present disclosure further includes the slide lock 906 noted above and shown in FIGS. 65 and 66. The slide lock 906 is configured to prevent two stacked elements 810 from sliding along the horizontal direction with respect to each other such that the studs 902 cannot be removed from the slots 904.

As shown in FIGS. 64 and 65, each element 810 has been provided with specific features to utilize the slide lock 906. In the example shown in FIGS. 62-65, the slide lock 906 is defined by a cantilever arm 918. The cantilever arm 918 defines a stop surface 920, at least a portion of which is configured to abut the stud 902 and prevent the stud 902 from sliding horizontally from the retention portion 914 to the receiver portion 912 of the slot 904. The stop surface 920 captures the stud 902 against the end surface 916.

As shown in FIGS. 64-65, at least a portion of the cantilever arm 918 (i.e., the portion that defines the stop surface 920) communicates with the retention portion 914 of the slot 904. In this manner, the portion of the cantilever arm 918 that communicates with the retention portion 914 of the slot 904 can abut the stud 902 and prevent the stud 902 from sliding.

As also shown in FIGS. 64-65, the cantilever arm 918 defines a tapered flex surface 922 that is configured to facilitate flexing of the cantilever arm 918 elastically upwardly as the stud 902 is slid from the receiver portion 912 of the slot 904 toward the retention portion 914 of the slot 904. The flex surface 922 tapers downwardly as it extends in a direction from the back to the front of the element 810. The flex surface 922 intersects the stop surface 920 of the cantilever arm 918 to define a lower front edge 924. In order to horizontally move the stud 902 from the retention portion 914 to the receiver portion 912 of the slot 904, the edge 924 has to be cleared by the flange portion 910 of the stud 902. This may be accomplished by flexing the cantilever arm 918 elastically upwardly in order to pass the flange portion 910 of the stud 902 thereunder.

In should be noted that a slide lock 906 in the form of a cantilever arm 918 may be provided at one or more of the slots 904 found on the elements 810. In certain embodiments, each slot 904 may include a cantilever arm 918 communicating therewith for providing the slide lock 906. In the example depicted in FIGS. 64-65, only two of the three slots 904 on each side of the element include the cantilever arm 918.

It should also be noted that although the depicted example of the mounting system 900 utilizes a slide lock 906 on both the right and left sides 894, 896 of an element stack, a slide lock 906 can be used on a single side of the stack if desired. However, using a slide lock 906 on both sides 894, 896 of the element stack may provide more stability to the locking mechanism.

Thus, the mounting system 900 of the present disclosure, similar to the locking system 700, provides a quick-attach solution that can be used in stacking elements 810 in a column for further mounting to equipment such as telecommunications racks, frames, or cabinets. The mounting system 900 of the present disclosure provides an unobtrusive attachment solution that can be incorporated in a variety of telecommunications distribution element designs. The mounting system 900 of the present disclosure may be used as a retro-fit solution on pre-existing telecommunications equipment with slight modification to certain aspects of the preexisting equipment to incorporate features of the system.

The mounting system 900 may be used to mount or stack two or more elements (such as the optical fiber distribution elements 810) that have similar configurations.

The mounting system 900 may also be used to mount or stack dissimilar equipment together if those pieces of equipment include features of the system 900 that allow them to intermate. For example, elements including equipment other than optical distribution features may be mounted to optical distribution elements such as elements 810 using the system 900 of the present disclosure as long as that equipment is configured with features of the system 900 that allow them to intermate with the features of equipment such as elements 810.

The mounting or stacking system 900 of the present disclosure may be used in instances where a single element includes features for mounting that element to a telecommunications rack, frame, or cabinet and other elements may be stacked with respect to that element using the system 900. For example, as shown in the example version of the element 510 in FIGS. 48-52, an element or chassis may include a universal quick-connect mounting mechanism similar to mechanism 500 of FIGS. 48-52 including universal mounting brackets 502 for releasably mounting that element or chassis to a telecommunications fixture, such as an optical fiber distribution rack. Using the stacking system 900 of the present disclosure, only one of the elements that are to be mounted to a separate fixture such as a rack would need to have the structure for utilizing a mechanism such as the universal mounting mechanism 500. The rest of the elements could be stacked with respect to that element by using the mounting or stacking system 900 of the present disclosure that relatively fixes the elements and prevents relative sliding between the elements and relative separation between the elements in a direction generally perpendicular to the direction of the relative sliding.

The element utilizing the mounting features (such as the universal quick-connect mechanism 500 shown in FIGS. 48-52) for mounting to a separate telecommunications fixture may be located at the top of the stack, at the bottom of the stack, or in the middle of the stack using the features of the stacking system 900 of the present disclosure.

Figure 66:
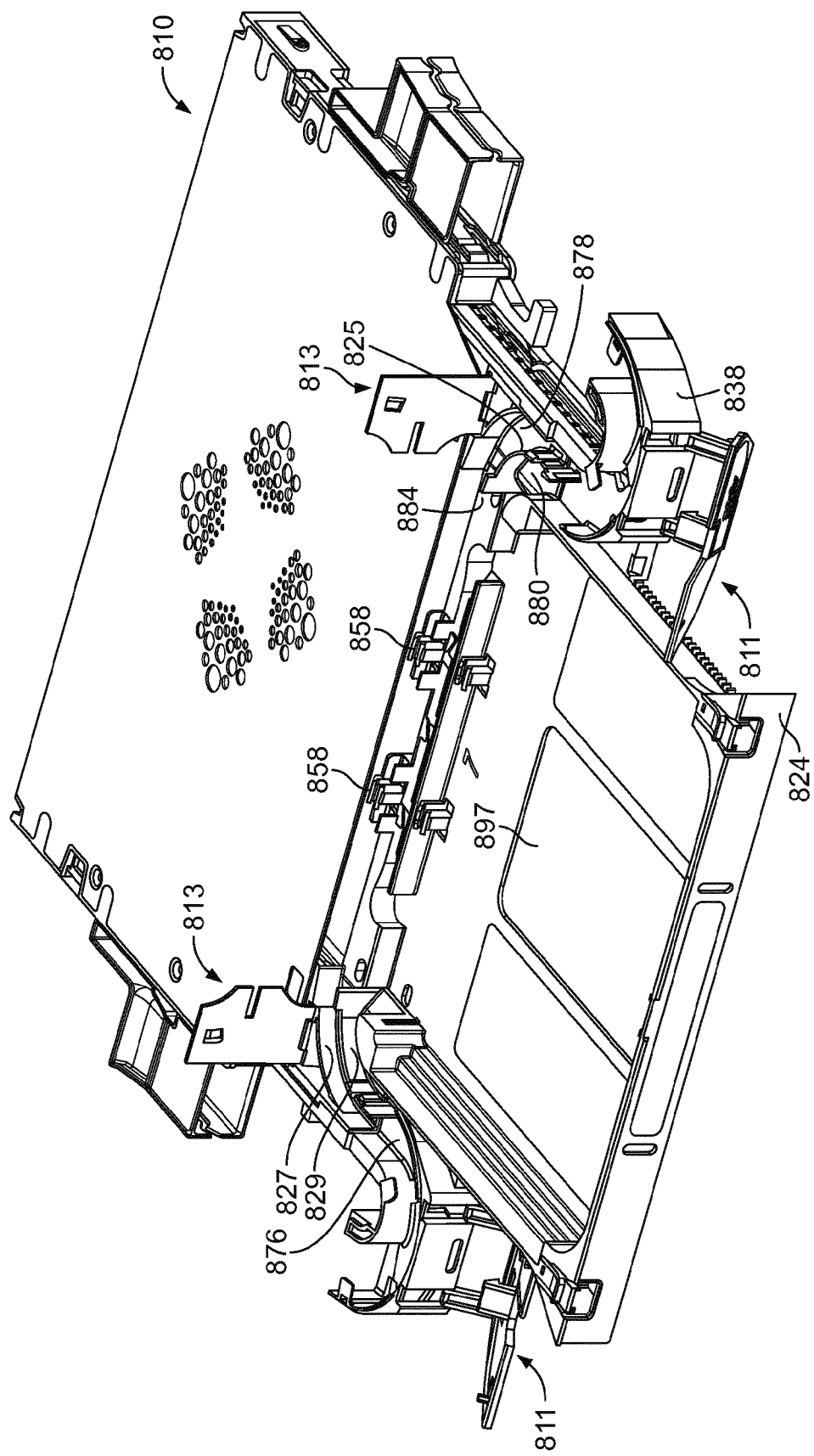
FIG. 66 illustrates the element of FIGS. 62-65 with the tray at an extended position, the element including pivotable covers over the U-shaped radius limiter and the S-shaped cable pathway within the element, the covers shown in an open configuration.
Figure 67:
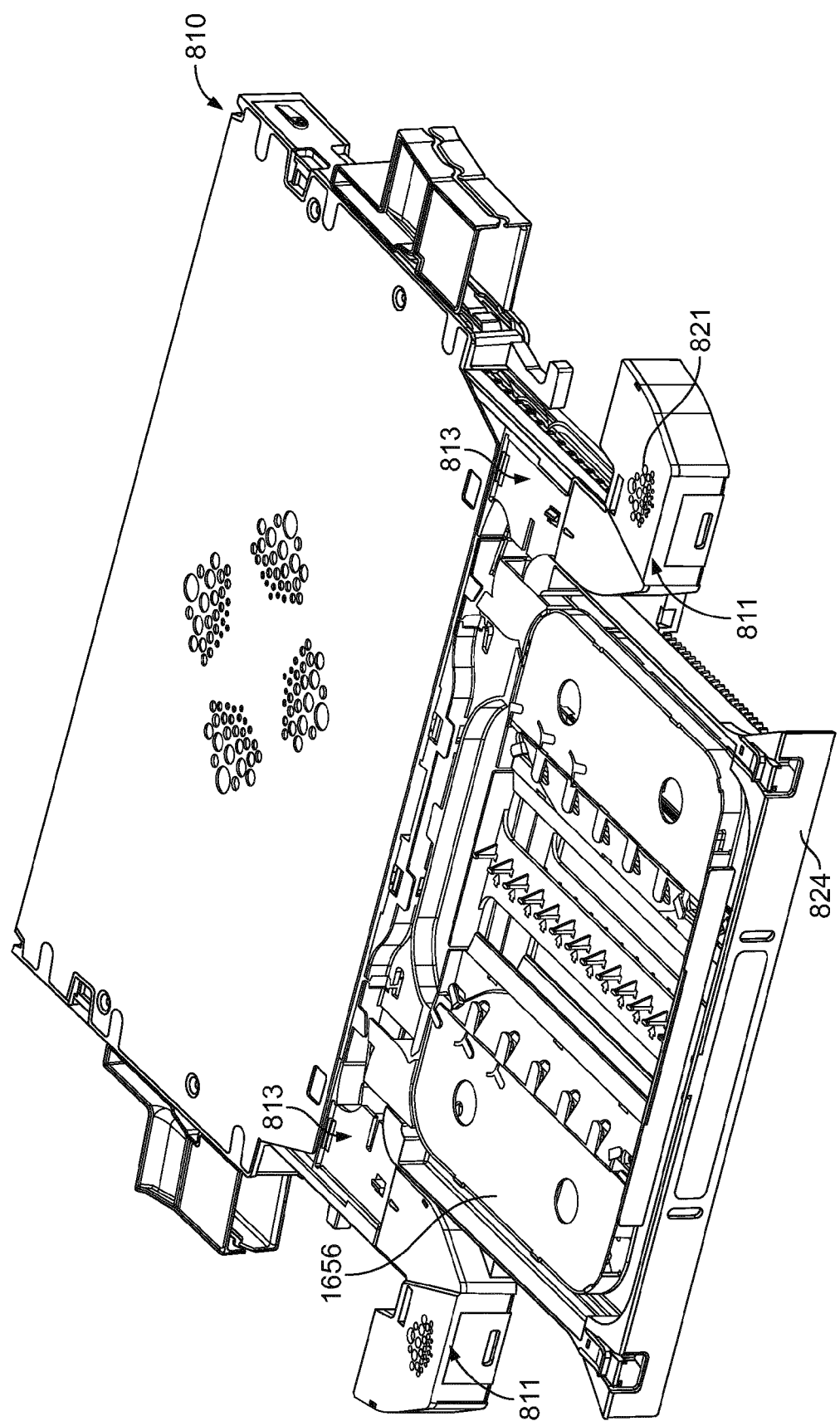
FIG. 67 illustrates the element of FIG. 66 with the covers in a pivotally closed position.

Referring now to FIGS. 66-67, the element 810 of FIGS. 62-65 is shown with the tray 824 of the element 810 at an extended position to illustrate some of the internal features of the element 810. As shown, in FIG. 66, the tray 824 is illustrated empty without any frame members, and in FIG. 67, the tray 824 is illustrated populated with frame members, one of which is further illustrated in further detail in isolation in FIG. 79. As will be discussed, the tray 824 of element 810 may be used with a variety of different versions of frame members, examples of which will be discussed in further detail below.

Still referring to FIGS. 66-67, the element 810 includes a first pivotable snap-fit cover 811 over a U-shaped radius limiter 838 that is on the slide mechanism of the element 810. The U-shaped radius limiter 838 includes features similar to radius limiter 638 shown in FIGS. 53-54. The element 810 further includes a second pivotable snap-fit cover 813 over a rear portion 815 of the S-shaped cable pathway 876 defined within the tray 824 of the element 810. The covers 811, 813 are shown in an open configuration in FIG. 66 and shown in a closed configuration in FIG. 67.

The S-shaped pathway 876, similar to the embodiment of the element 610 discussed previously, is divided into two separate troughs 827, 829 by a divider 825 that is toward the rear of the tray. According to an example cable routing configuration, the two troughs 827, 829 may guide the cables to upper and lower levels 878, 880 defined toward the rear of the tray 824 while maintaining the S-shaped pathway 876 created within the element 810. The covers 811, 813 help retain cables within the S-shaped pathway 876 defined within the tray 824 as the cables lead to and from the radius limiter 838 to the tray 824 within element 810. The pivotability aspect of the covers 811, 813 facilitates initial placement of the cables within the S-shaped pathway 876 and provides access to the cables for removal. As shown, the covers 811, 813 may also include apertures 821 for viewing the cables within the S-shaped pathway 876 from an exterior of the tray 824 when the covers 811, 813 are closed.

Referring now to FIGS. 68-79, as noted above, various hingedly mountable frame members that may be used within the trays 824 of the elements 810 are illustrated. Each of the frame members in FIGS. 68-79 is illustrated in isolation removed from the tray 824 of the element 810. In FIG. 67, discussed previously, the tray 824 is shown populated with frame members, one of which is illustrated in isolation in further detail in FIG. 79.

Similar to the earlier embodiments of the elements, each tray 824 of element 810 may include two frame members in a stacked arrangement, wherein the frame members are hingedly mounted at hinges 858. A top frame member is normally positioned above a bottom frame member. As discussed previously, the S-shaped pathway 876 includes an upper level 878 and a lower level 880 in the interior. The upper level 878 is configured to supply an upper frame member, and the lower level 880 is configured to supply a lower frame member that is positioned below the upper frame member. The trays cooperate with the frame members in defining openings for guiding the cables to the specified frame members.

A portion 884 of the S-shaped pathway 876 is positioned adjacent to hinges 858 to avoid potentially damaging cable pull during pivoting movement of frame members.

Similar to previously discussed trays, each tray 824 of element 810 includes openings 897 to allow for technician access to the cable terminations within the tray 824. Furthermore, as will be discussed in further detail, most of the embodiments of the frame members that are configured to be used within the tray 824 of element 810 include a middle portion that is separated by openings from side portions, similar to the frame members discussed previously, for allowing connector access to the technicians.

Figure 68:
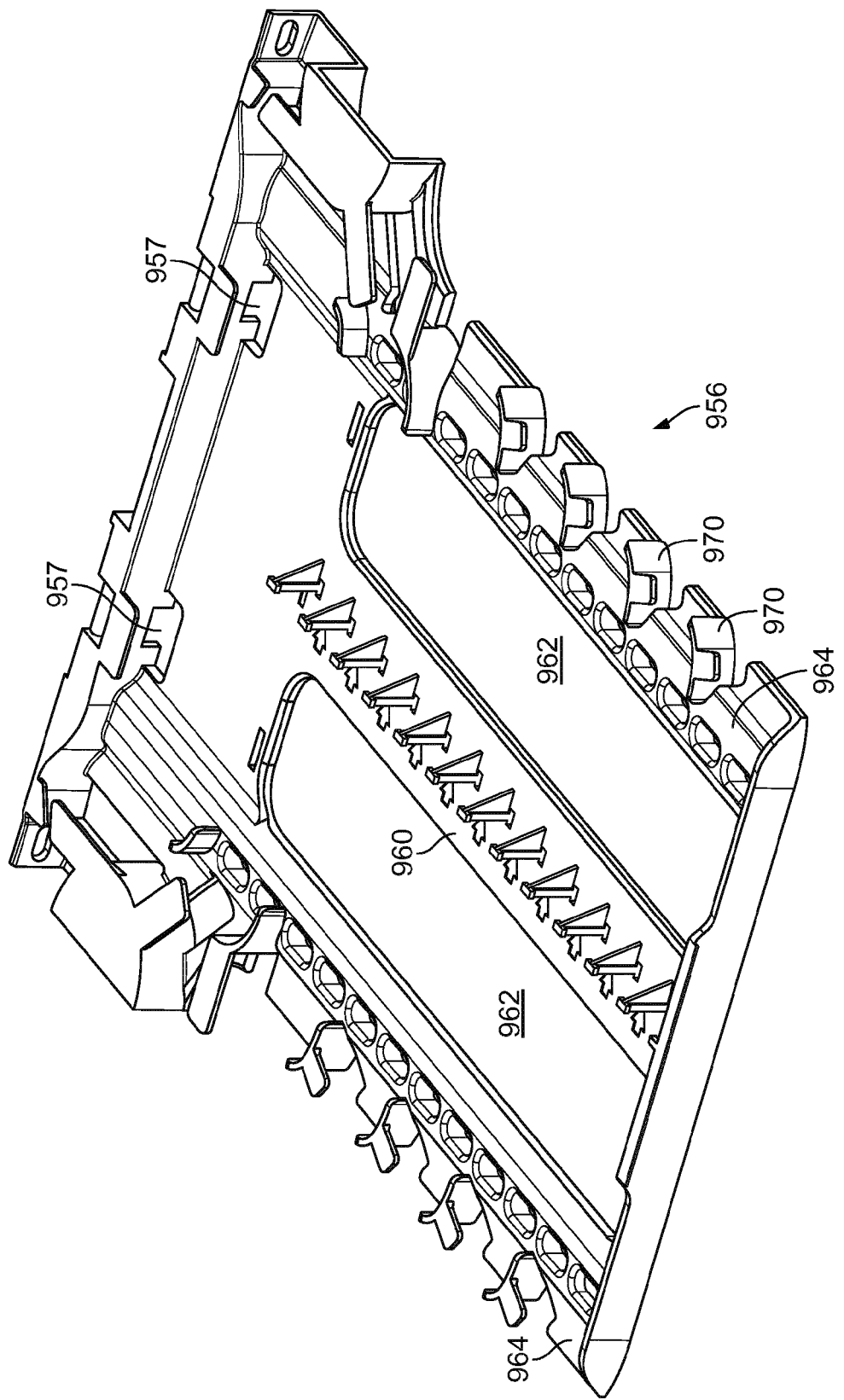
FIGS. 68-79 illustrate various embodiments of hingedly-mountable frame members that may be used within the trays of the element of FIGS. 62-67.

Referring now to FIG. 68, an embodiment of a frame member 956 that can be used with the tray 824 of element 810 is illustrated in isolation. Each frame member 956 has a middle portion 960 separated by openings 962 from side portions 964. Middle portion 960 can hold fiber terminations in the form of fiber optic adapters that can receive fiber optic connectors. Side portions 964 include radius limiters 970. The frame member 956 may include openings 957 at a rear portion thereof for allowing cables to be routed from an upper frame member 956 to a lower frame member 956. Such openings 957 adjacent the hinges of the frame members can be used on other frame members of the present application.

Figure 69:
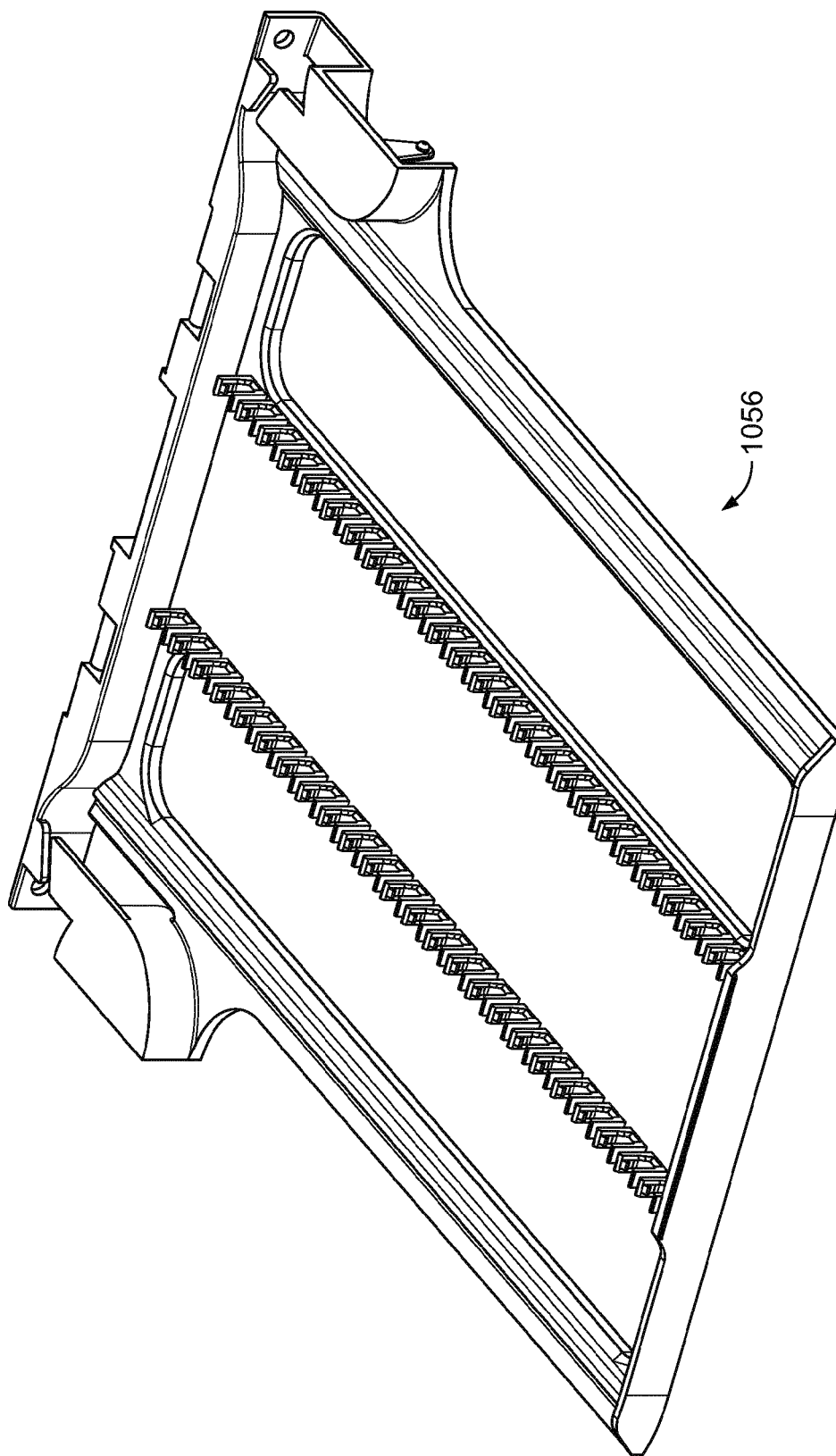

Referring now to FIG. 69, another embodiment of a frame member 1056 that can be used with the tray 824 of element is illustrated in isolation. Frame member 1056 is configured to hold fiber terminations in the form of fiber optic connectors that are different in format than those received by the frame member 956 of FIG. 68.

Figure 70:
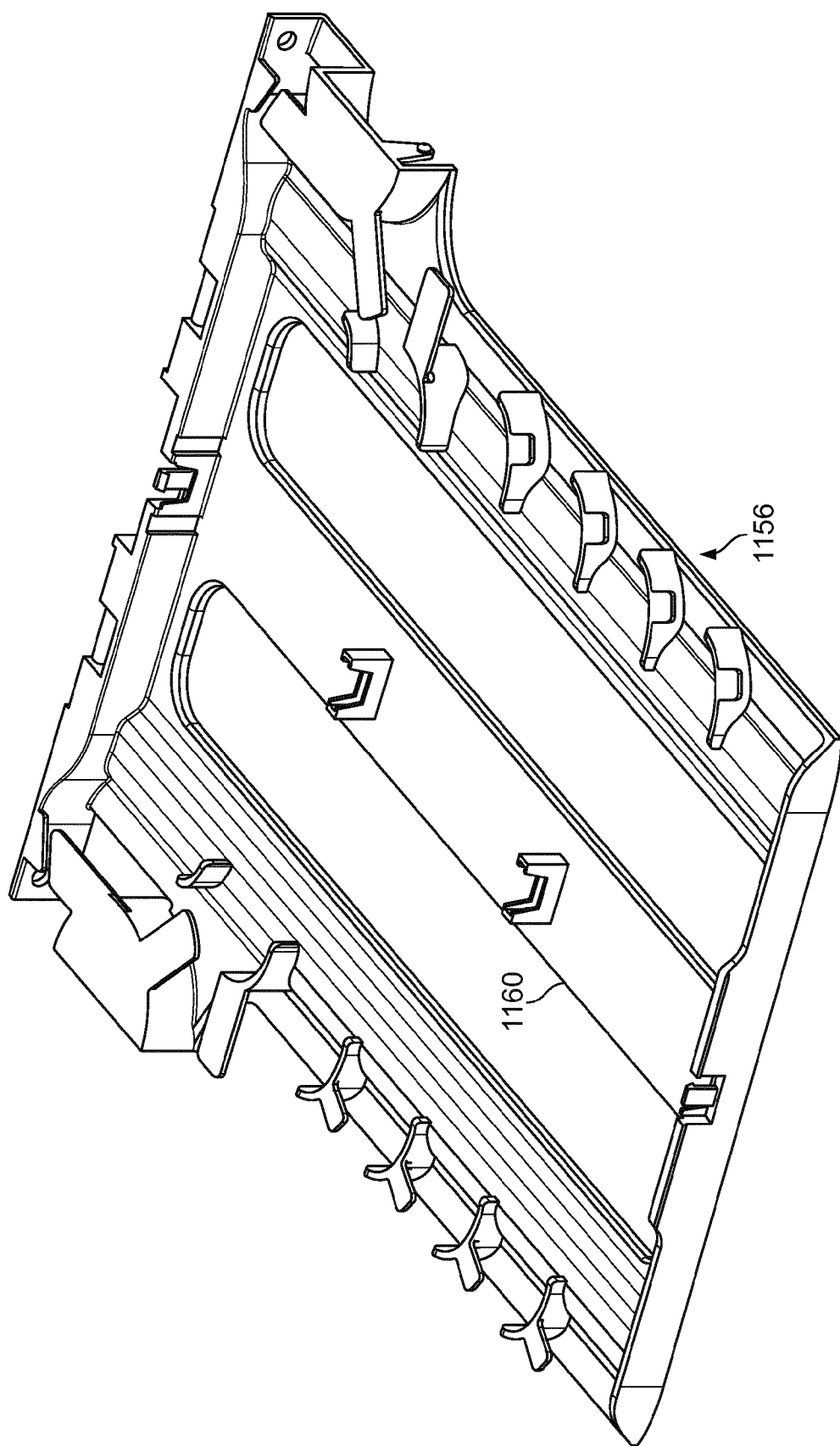

Referring now to FIG. 70, an embodiment of a frame member 1156 that is similar in configuration to the frame member 956 of FIG. 68 is illustrated. The middle portion 1160 of frame member 1156 can hold fiber terminations in the form of fiber optic adapter blocks.

Figures 71, 72:
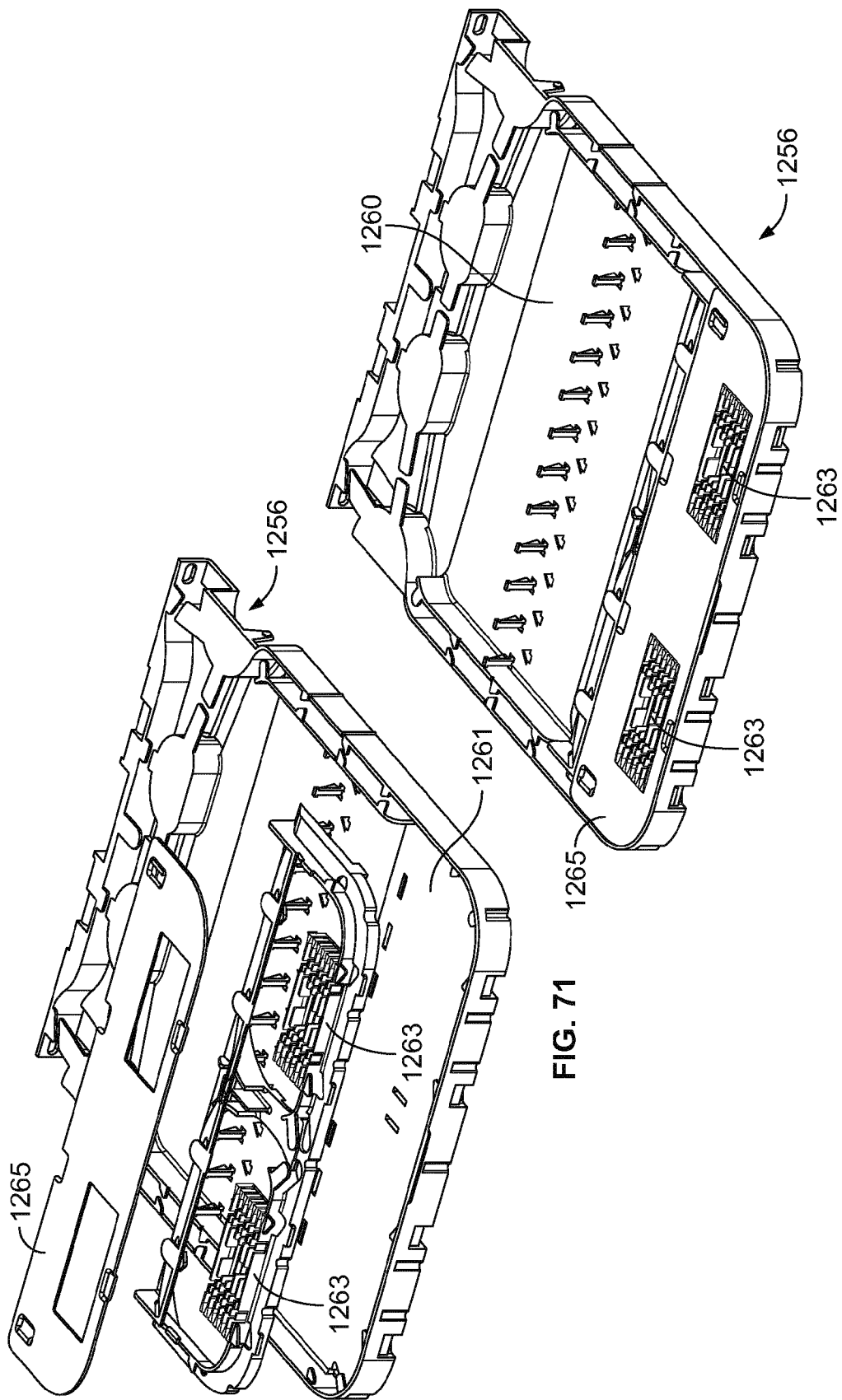

Referring now to FIGS. 71-72, another embodiment of a frame member 1256 that can be used with the tray 824 of element 810 is illustrated in isolation. Frame member 1256 is configured to hold fiber terminations in the form of fiber optic adapters that can receive fiber optic connectors at a center portion 1260 of the frame member 1256. The front portion 1261 of the frame member 1256 includes splice regions 1263 for splicing of fiber optic cables. A cover 1265 may be used to cover the splice regions 1263.

Figure 73:
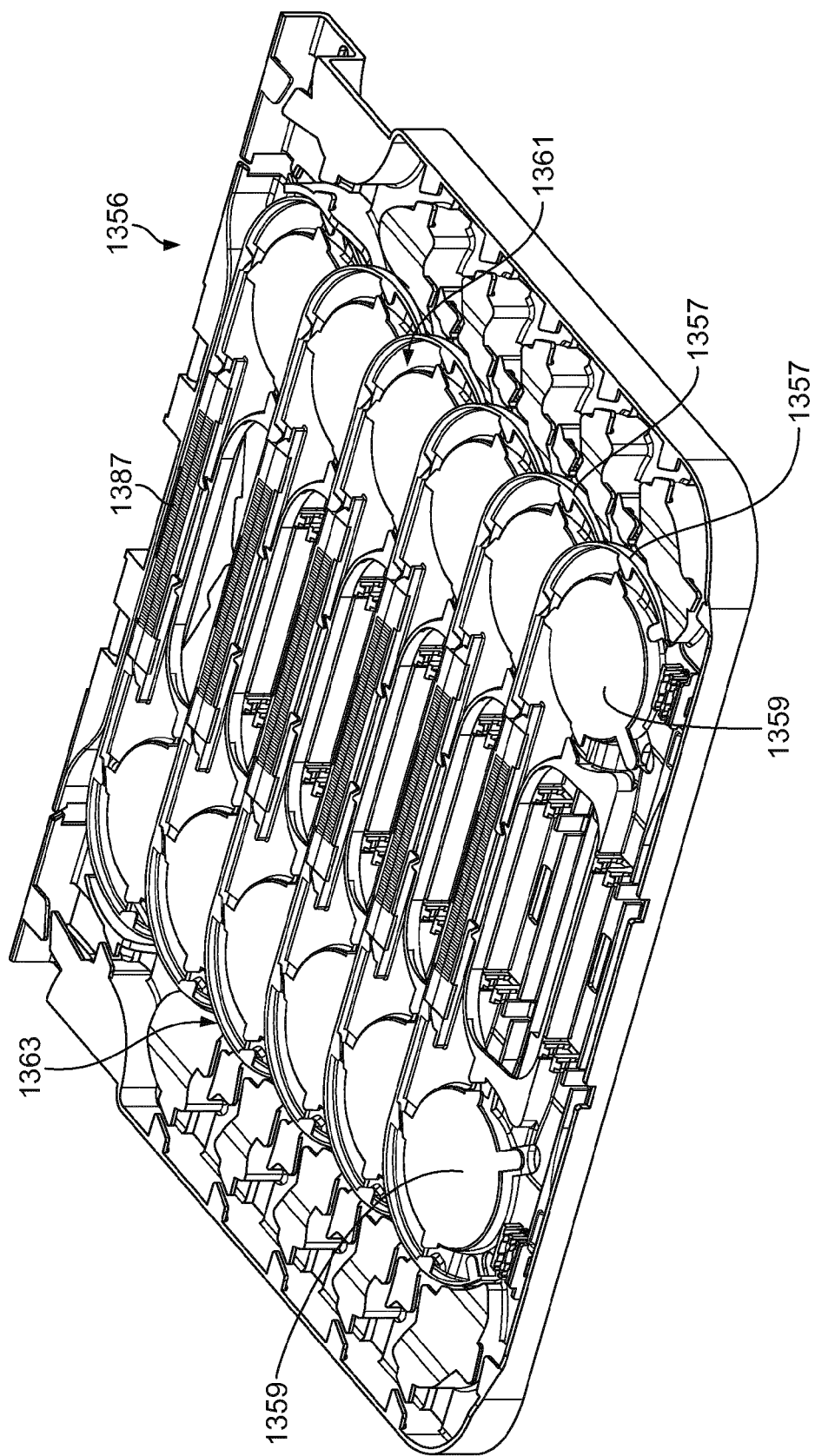

Referring now to FIG. 73, another embodiment of a frame member 1356 that can be used with the tray 824 of element 810 is illustrated in isolation. Frame member 1356 defines a plurality of individually pivotable flip-trays 1357 that can support fiber optic equipment in the form of fiber terminations such as fiber optic connectors and other fiber optic equipment such as splitters 1387. Radius limiters 1359 in the form of spools are positioned at both the right side 1361 and the left side 1363 of each flip-tray 1357.

Figure 74:
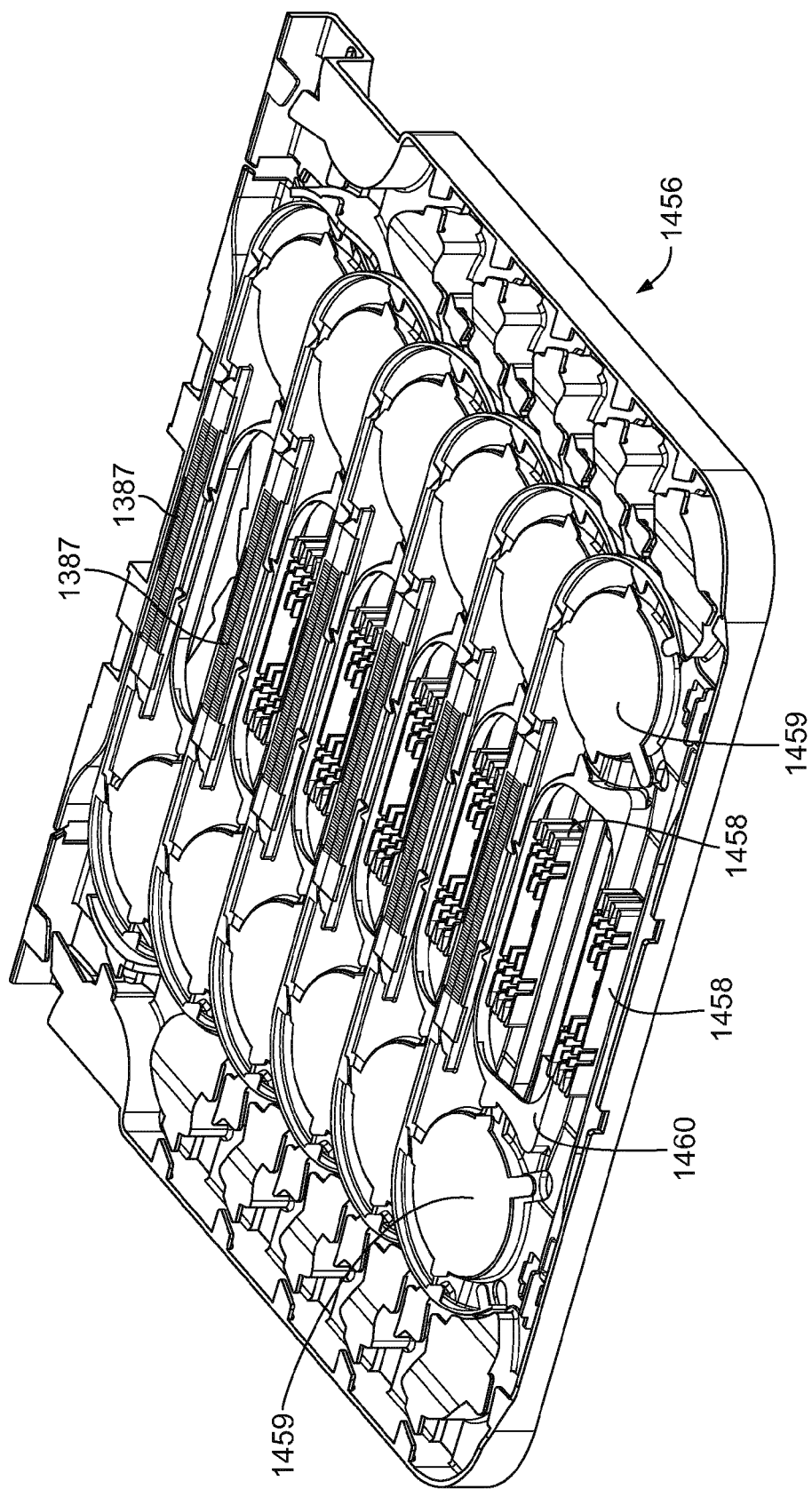

FIG. 74 illustrates a frame member 1456 that is similar in construction to the frame member 1356 of FIG. 73. Frame member 1456 defines splice regions 1458 at the center portion 1460 of the individual flip-trays 1457 between the radius limiters 1459, in addition to fiber optic splitters 1387.

Figure 75:
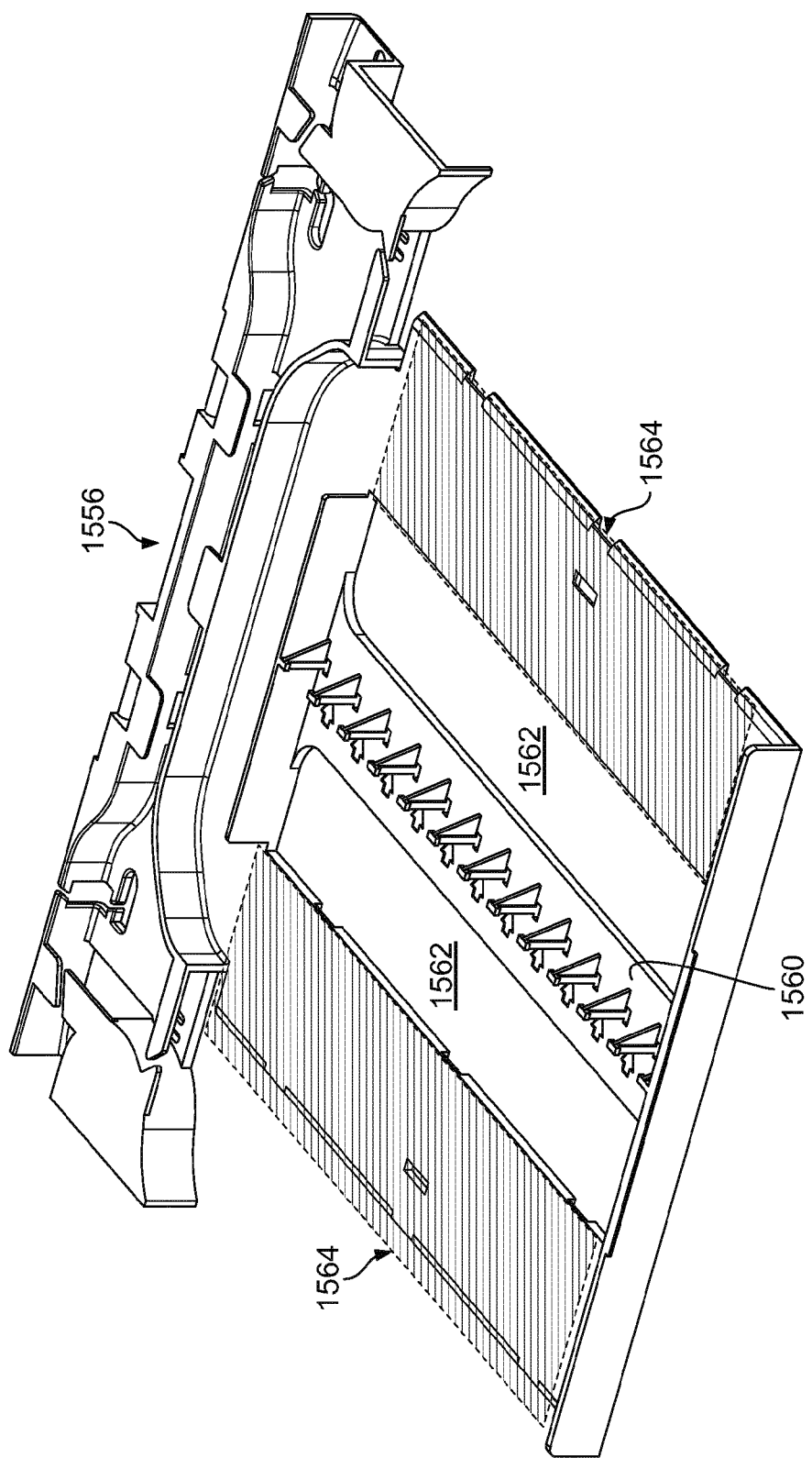

FIG. 75 illustrates a base portion 1556 for a frame member that can be used to mount different modular elements for changing the configuration or the layout of the fiber optic connectivity within the frame member. The base portion 1556 has a middle portion 1560 separated by openings 1562 from side portions 1564. Middle portion 1560 can hold fiber terminations in the form of fiber optic adapters that can receive fiber optic connectors. The side portions 1564 are configured to receive different modular elements for varying the layout of a frame member. The modular elements can be mounted to the side portions 1564 via snap-fit interlocks. For example, the base portion 1556 is shown in FIG. 76 with a pair of modular elements 1569 that are configured to provide a layout that is similar in configuration to that of the frame member 956 of FIG. 68, wherein the modular elements 1569 define radius limiters 1570.

Figure 77:
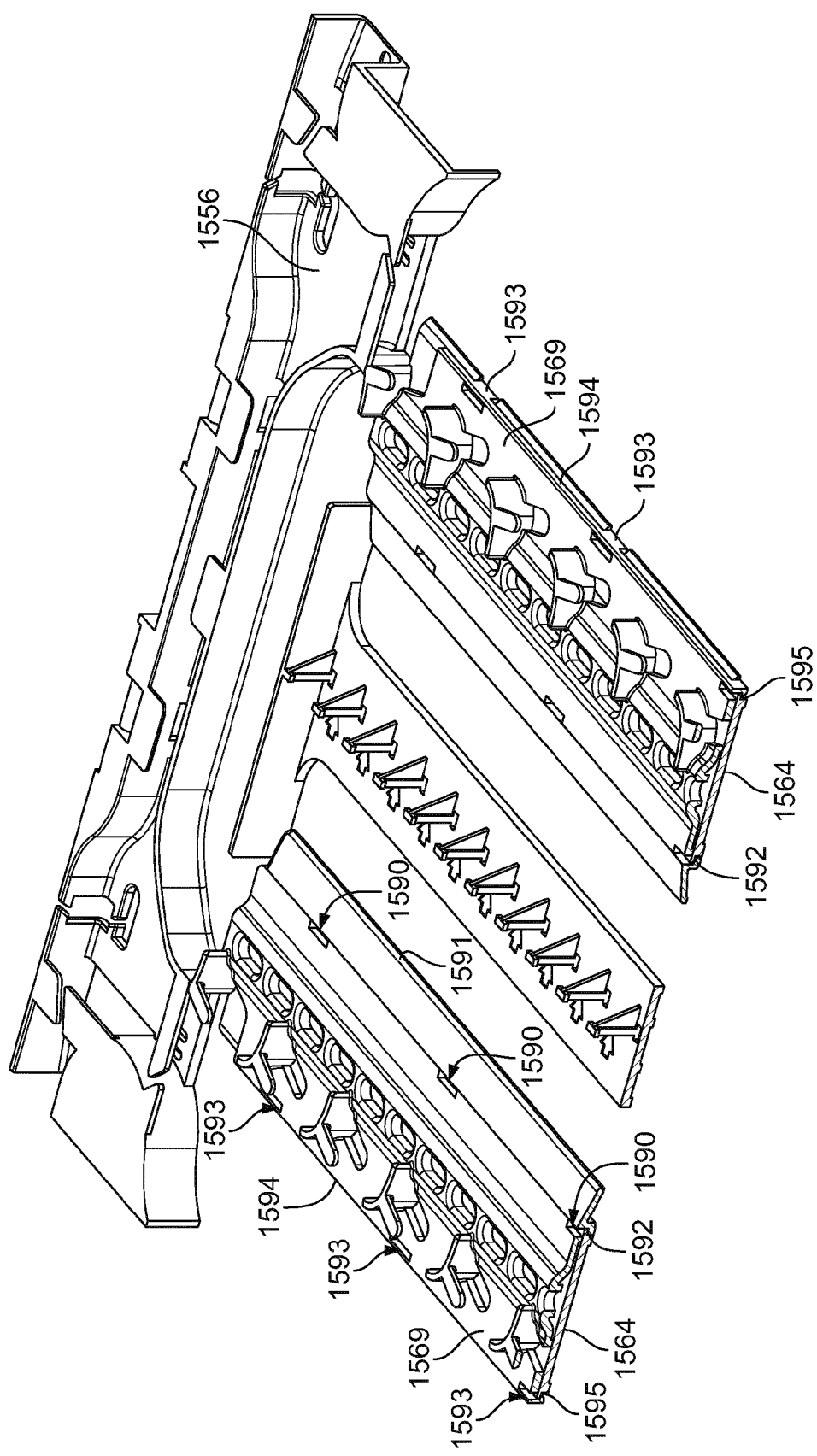

FIG. 77 illustrates the snap-fit feature of the modular elements 1569 in a cross-sectional view. According to the depicted example, the modular elements 1569 may include a plurality of hooks 1590 on a first side 1591 for catching against a first edge 1592 defined by one of the side portions 1564. The modular elements 1569 may include a plurality of elastically flexible snap-fit catches 1593 on an opposing second side 1594 for catching against an opposing second edge 1595 defined by the side portions 1564. In this manner, using the hooks 1590 and catches 1593, the modular elements 1569 can be mounted to the side portions 1564 with a snap-fit and removed therefrom to allow changing the layout of a frame member.

Figure 76:
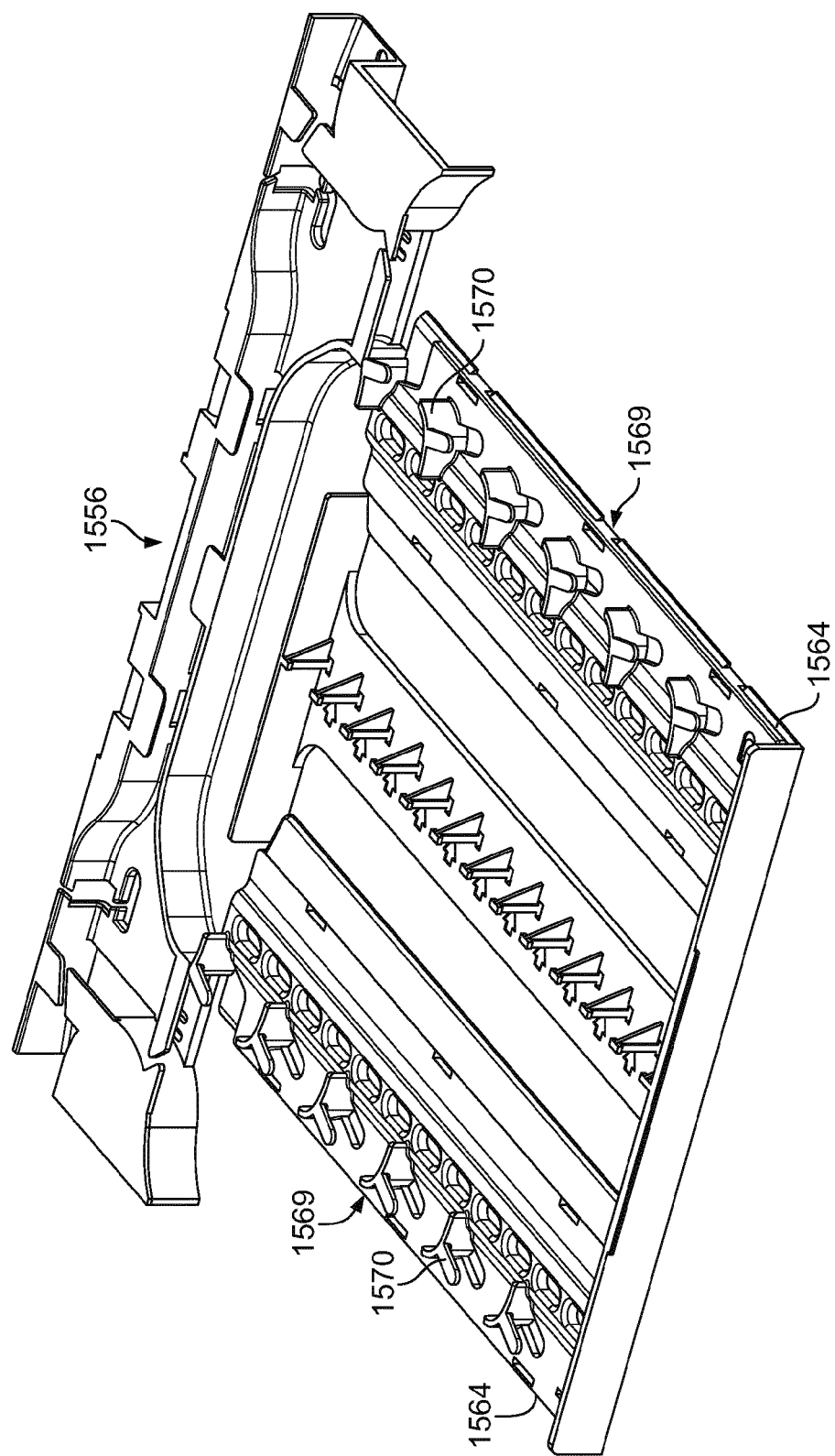
Figure 78:
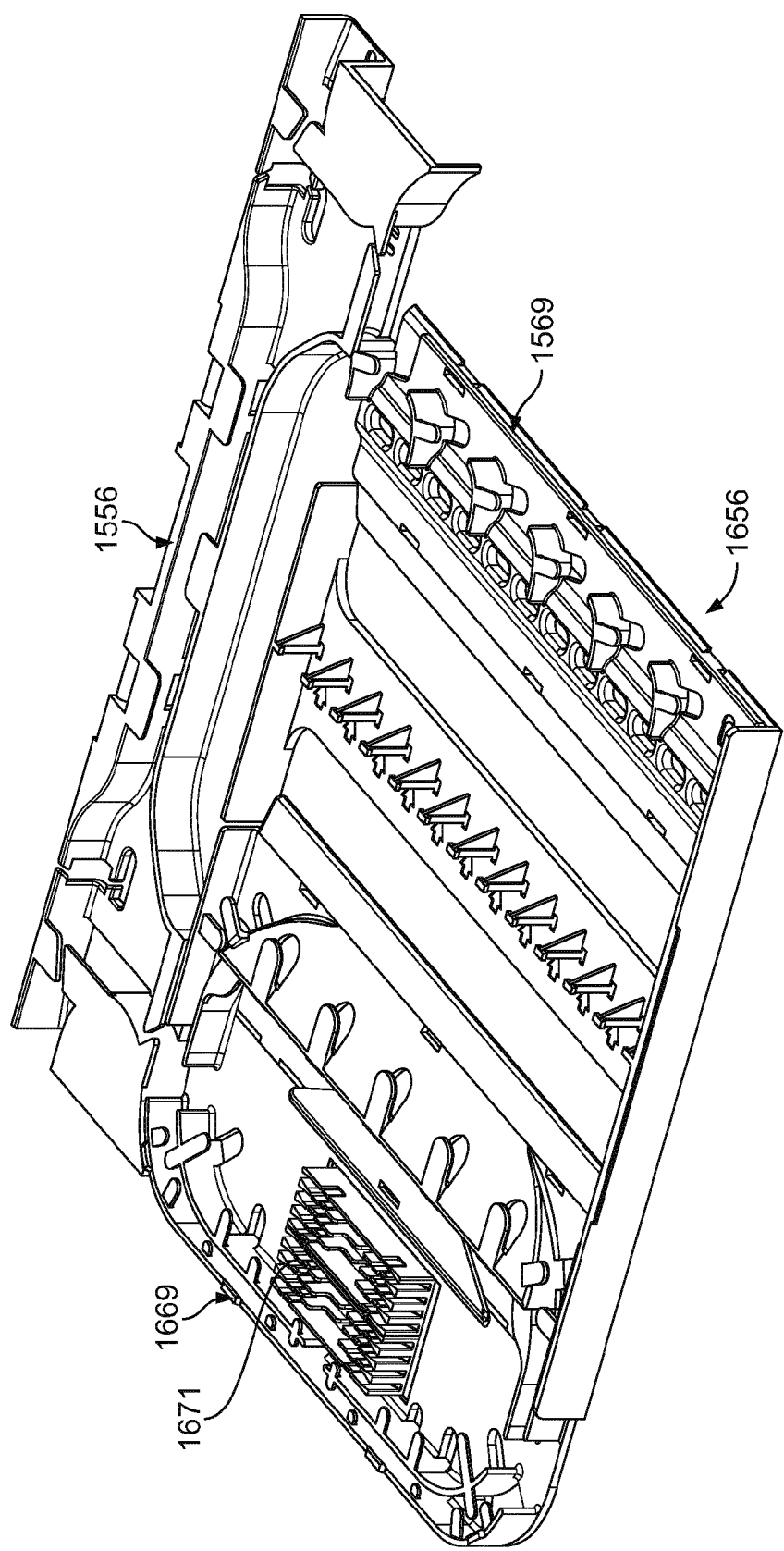
Figure 79:
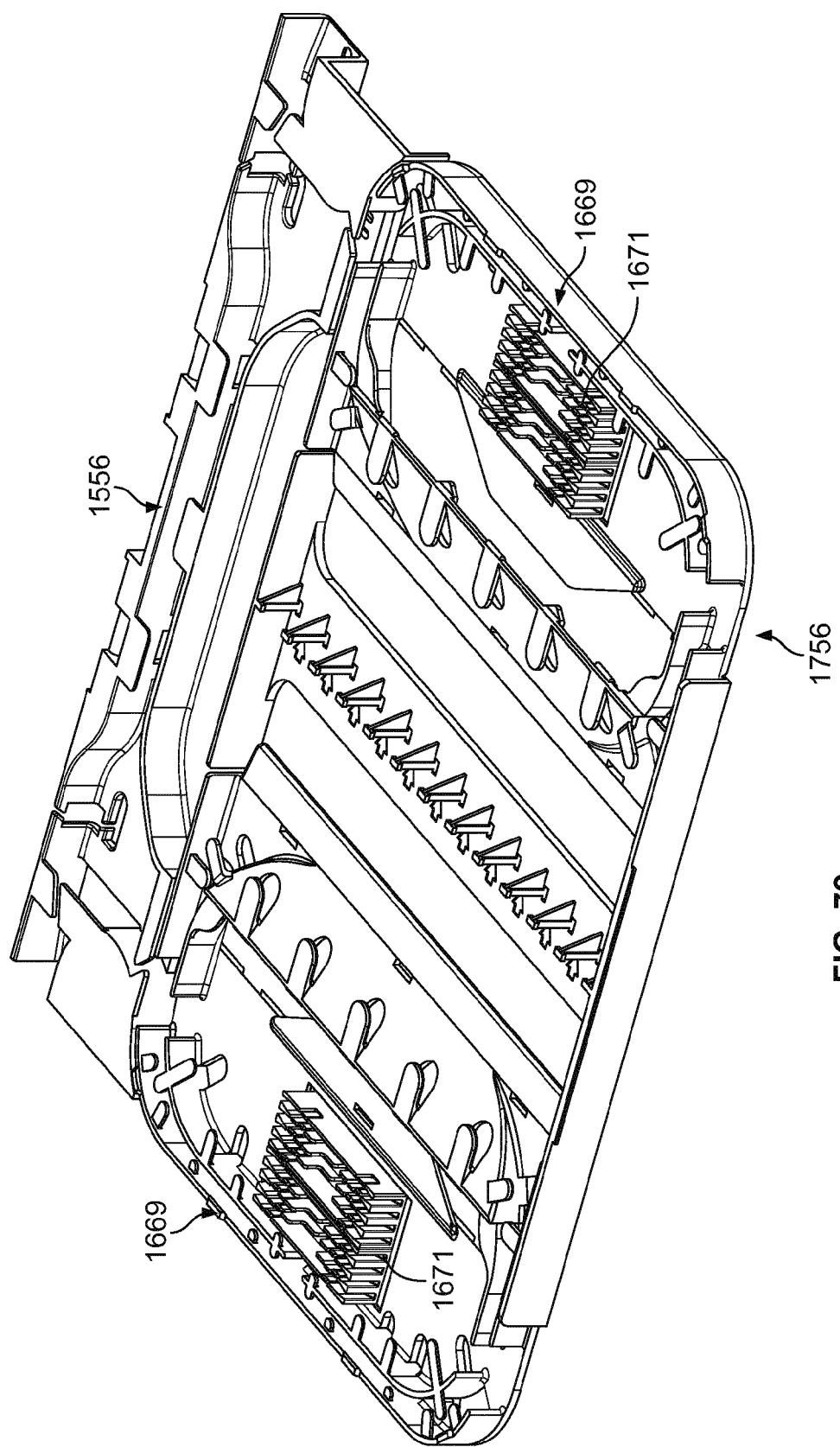

FIG. 78 illustrates an embodiment of a frame member 1656 that includes one of the modular elements 1569 of FIGS. 76-77 and another modular element 1669 defining a splice region 1671. FIG. 79 illustrates a frame member 1756 that has been formed by snap-fitting two modular elements 1669 that include splice regions 1671 to the base portion 1556. A pair of the frame members 1756 can be seen in the tray 824 of element 810 of FIG. 67 as discussed previously.

PARTS LIST 10 element
12 block
20 chassis
24 tray
30 slide mechanism
32 gears
34 rack
36 entry points
38 radius limiters
50 mounting structure
52 adapters
56 T-shaped frame member
58 hinge
62 top frame member
64 bottom frame member
70 adapter blocks
72 connectors
74 cables
76 pathway
78 upper level
80 lower level
84 portion 86 flanges
90 radius limiters
96 openings
100 cable mount
102 cable wrap
106 radius limiters
210 element
220 chassis
224 tray
230 slide mechanism
238 radius limiters
256 frame members
258 hinges
260 middle portion
262 openings
264 side portions
266 cover
268 latches
270 radius limiters
276 pathway
278 upper level
280 lower level
284 radius limiters
286 cable mounts
288 dovetail
290 opening
292 block
294 bar
296 fasteners
310 element
330 slide mechanism
332 wheels
334 wire
336 wire
340 first part
342 second part
344 third part
410 element
420 radius limiter
430 friction members
500 universal mounting mechanism
502 universal mounting bracket
504 locking spring
506 release handle
508 cover
510 element
512 latch openings
514 front portion of the mounting bracket
516 mounting tabs
518 rear portion of the mounting bracket
520 bracket channel
522 deflection ramp
524 end portion of the locking spring
526 perpendicular locking face
528 angular insertion face
530 front end
532 inner front face
534 grip portion
536 deflection tab
538 rear end of the release handle
540 positive stop
542 stop face
544 slide mechanism
545 fasteners
610 element
620 chassis
621 inner end of radius limiter
623 outer end of radius limiter
624 tray
625 divider
627 trough
629 trough
631 cable management tab
633 cable management tab
635 cable management finger
638 radius limiter
676 pathway
678 upper level
680 lower level
684 cable guide
690 top surface of an element
692 bottom surface of an element
694 right side
696 left side
700 mounting system
701 first locking feature
702 stud
703 second locking feature
704 slot
705 third locking feature
706 slide lock
708 stem portion
710 flange portion
712 receiver portion
714 retention portion
716 end
718 lower cutout
720 lower side edge
722 upper cutout
724 upper side edge
726 bottom notch of lower cutout
728 side notch of lower cutout
730 top botch of upper cutout
732 side notch of upper cutout
734 opening
736 flexible cantilever tab
810 element
811 cover
813 cover
815 rear portion
821 aperture
824 tray
825 divider
827 trough
829 trough
838 U-shaped radius limiter
858 hinge
876 S-shaped pathway
878 upper level
880 lower level
884 portion of S-shaped pathway
890 top surface of element
892 bottom surface of element
894 right side of element
896 left side of element
897 opening
900 mounting system
901 first locking feature
902 stud
903 second locking feature
904 slot
905 third locking feature
906 slide lock
908 stem portion 910 flange portion
912 receiver portion
914 retention portion
916 end surface
918 cantilever arm
920 stop surface
922 flex surface
924 lower front edge
956 frame member
957 opening
960 middle portion
962 opening
964 side portion
970 radius limiter
1056 frame member
1156 frame member
1160 middle portion
1256 frame member
1260 center portion
1261 front portion
1263 splice region
1265 cover
1356 frame member
1357 flip-tray
1359 radius limiter
1361 right side
1363 left side
1387 splitter
1456 frame member
1457 flip-tray
1458 splice region
1459 radius limiter
1460 center portion
1556 base portion
1560 middle portion
1562 opening
1564 side portion
1569 modular element
1570 radius limiter
1590 hook
1591 first side
1592 first edge
1593 catch
1594 second side
1595 second edge
1656 frame member
1669 modular element
1671 splice region
1756 frame member

What is claimed is:

1. An optical fiber distribution element comprising:
a chassis defining a top surface and a bottom surface, the chassis further defining an interior region defined between the top surface and the bottom surface, wherein the optical fiber distribution element further comprises a movable tray slidably movable from within the chassis to a position at least partially outside the chassis, the movable tray defining fiber optic connection locations, the optical fiber distribution element further comprising a slide mechanism which connects the movable tray to the chassis, wherein the slide mechanism includes a radius limiter which moves with synchronized movement relative to the chassis and the tray during slidable movement of the tray, the radius limiter configured to manage cables leading to or from the fiber optic connection locations of the movable tray; and
a first locking feature in the form of a stud extending from the top surface of the chassis, the stud defining a stem portion and a flange portion having a larger profile than the stem portion, wherein the larger flange portion is positioned on the stud such that the entirety of the flange portion is spaced apart from the top surface of the chassis and such that the stem portion of the stud is located between the top surface of the chassis and the flange portion of the stud.

2. An optical fiber distribution element according to claim 1, further comprising a lower cutout defined at a lower side edge of the optical fiber distribution element and an upper cutout defined at an upper side edge of the optical fiber distribution element that is generally vertically aligned with the lower cutout.

3. An optical fiber distribution element according to claim 2, wherein the lower cutout defines a bottom notch and the upper cutout defines a top notch such that when the lower cutout of an optical fiber distribution element is aligned with the upper cutout of a similarly configured element, an opening is defined between the top notch and the bottom notch.

4. An optical fiber distribution element according to claim 2, wherein both the lower cutout and the upper cutout define side notches that are configured to generally align when the lower cutout of an optical fiber distribution element is aligned with the upper cutout of a similarly configured element.

5. An optical fiber distribution element according to claim 1, wherein the first locking feature defines a plurality of the studs.

6. An optical fiber distribution element according to claim 1, further comprising a second locking feature in the form of a slot at the bottom surface, the optical fiber distribution element comprising a third locking feature in the form of a cantilever arm provided on the optical fiber distribution element that is configured to abut the stud of another optical fiber distribution element to prevent relative sliding between two of the optical fiber distribution elements.

7. An optical fiber distribution element according to claim 6, wherein the slot defines a receiver portion and a retention portion, wherein the receiver portion is sized to accommodate the flange portion of the stud and the retention portion is sized to accommodate the stem portion but not the flange portion of the stud.

8. An optical fiber distribution element according to claim 6, wherein the first locking feature defines a plurality of the studs and the second locking feature defines a plurality of the slots.

9. An optical fiber distribution element according to claim 1, wherein each tray includes at least one hingedly mounted frame member which hinges about an axis perpendicular to the direction of movement of the movable tray.

10. An optical fiber distribution element comprising:
a chassis defining a top surface and a bottom surface, the chassis further defining an interior region defined between the top surface and the bottom surface, wherein the optical fiber distribution element further comprises a movable tray slidably movable from within the chassis to a position at least partially outside the chassis, the movable tray defining fiber optic connection locations, the optical fiber distribution element further comprising a slide mechanism which connects the movable tray to the chassis, wherein the slide mechanism includes a radius limiter which moves with synchronized movement relative to the chassis and the tray during slidable movement of the tray, the radius limiter configured to manage cables leading to or from the fiber optic connection locations of the movable tray;

a first locking feature in the form of a stud extending from the top surface of the chassis, the stud defining a stem portion and a flange portion having a larger profile than the stem portion;

a second locking feature in the form of a slot at the bottom surface; and a third locking feature in the form of a cantilever arm provided on the optical fiber distribution element that is configured to abut the stud of another optical fiber distribution element to prevent relative sliding between two of the optical fiber distribution elements.

11. An optical fiber distribution element according to claim 10, wherein the slot defines a receiver portion and a retention portion, wherein the receiver portion is sized to accommodate the flange portion of the stud and the retention portion is sized to accommodate the stem portion but not the flange portion of the stud.

12. An optical fiber distribution element according to claim 10, wherein the first locking feature defines a plurality of the studs and the second locking feature defines a plurality of the slots.

* * * * *